(12) United States Patent
Islam et al.

(10) Patent No.: US 11,370,121 B2
(45) Date of Patent: Jun. 28, 2022

(54) METHOD AND SYSTEM FOR DETERMINING POSES FOR CAMERA CALIBRATION

(71) Applicant: MUJIN, INC., Tokyo (JP)

(72) Inventors: Russell Islam, Tokyo (JP); Puttichai Lertkultanon, Tokyo (JP)

(73) Assignee: MUJIN, INC., Tokyo (JP)

( * ) Notice: Subject to any disclaimer, the term of this patent is extended or adjusted under 35 U.S.C. 154(b) by 282 days.

(21) Appl. No.: 16/667,170

(22) Filed: Oct. 29, 2019

(65) Prior Publication Data

US 2021/0122050 A1 Apr. 29, 2021

(51) Int. Cl.
*B25J 9/16* (2006.01)

(52) U.S. Cl.
CPC .......... *B25J 9/1692* (2013.01); *B25J 9/1664* (2013.01); *B25J 9/1697* (2013.01)

(58) Field of Classification Search
CPC ...... B25J 9/1607; B25J 9/1664; B25J 9/1692; B25J 9/1697; B25J 13/089; G06T 7/74;
(Continued)

(56) References Cited

U.S. PATENT DOCUMENTS

| | | | | |
|---|---|---|---|---|
| 6,437,823 | B1 * | 8/2002 | Zhang | H04N 17/002 348/187 |
| 10,369,698 | B1 * | 8/2019 | Islam | B25J 9/1697 |

(Continued)

FOREIGN PATENT DOCUMENTS

| | | |
|---|---|---|
| CN | 103372862 A | 10/2013 |
| CN | 108645392 A | 10/2018 |

(Continued)

OTHER PUBLICATIONS

A. Datta, J. Kim and T. Kanade, "Accurate camera calibration using iterative refinement of control points," 2009 IEEE 12th International Conference on Computer Vision Workshops, ICCV Workshops, 2009, pp. 1201-1208, doi: 10.1109/ICCVW.2009.5457474. (Year: 2009).*

(Continued)

*Primary Examiner* — Abby Y Lin
*Assistant Examiner* — Dylan Brandon Mooney
(74) *Attorney, Agent, or Firm* — Medler Ferro Woodhouse & Mills PLLC

(57) ABSTRACT

A method and system for determining poses for camera calibration is presented. The system determines a range of pattern orientations for performing the camera calibration, and determines a surface region on a surface of an imaginary sphere, which represents possible pattern orientations for the calibration pattern. The system determines a plurality of poses for the calibration pattern to adopt. The plurality of poses may be defined by respective combinations of a plurality of respective locations within the camera field of view and a plurality of respective sets of pose angle values. Each set of pose angle values of the plurality of respective sets may be based on a respective surface point selected from within the surface region on the surface of the imaginary sphere. The system outputs a plurality of robot movement commands based on the plurality of poses that are determined.

19 Claims, 34 Drawing Sheets

(58) Field of Classification Search
CPC ... G06T 7/80; G06T 7/85; G05B 2219/37015;
G05B 2219/39008; G05B 2219/39014;
G05B 2219/39016; G05B 2219/39022;
G05B 2219/39024; G05B 2219/39042;
G05B 2219/39046
See application file for complete search history.

(56) References Cited

U.S. PATENT DOCUMENTS

| | | |
|---|---|---|
| 2009/0118864 A1 | 5/2009 | Eldridge et al. |
| 2011/0280472 A1 | 11/2011 | Wallack et al. |
| 2015/0269439 A1 | 9/2015 | Versace et al. |
| 2017/0287166 A1* | 10/2017 | Claveau ............... H04N 17/002 |

FOREIGN PATENT DOCUMENTS

| | | | |
|---|---|---|---|
| JP | 2013215866 A | 10/2013 | |
| JP | 2014069272 A | 4/2014 | |
| JP | 2014238687 A | 12/2014 | |
| JP | 5962394 B2 | 7/2016 | |

OTHER PUBLICATIONS

Zhang, Zhengyou: "Camera Calibration", in G. Medioni & S.B. Kang, eds., Emerging Topics in Computer Vision, Prentice Hall, Dec. 2004, pp. 18-26 (Year: 2004).*

Office Action dated Jul. 31, 2020 in Chinese Patent Application 202010126677.5 (with English language translation).

\* cited by examiner

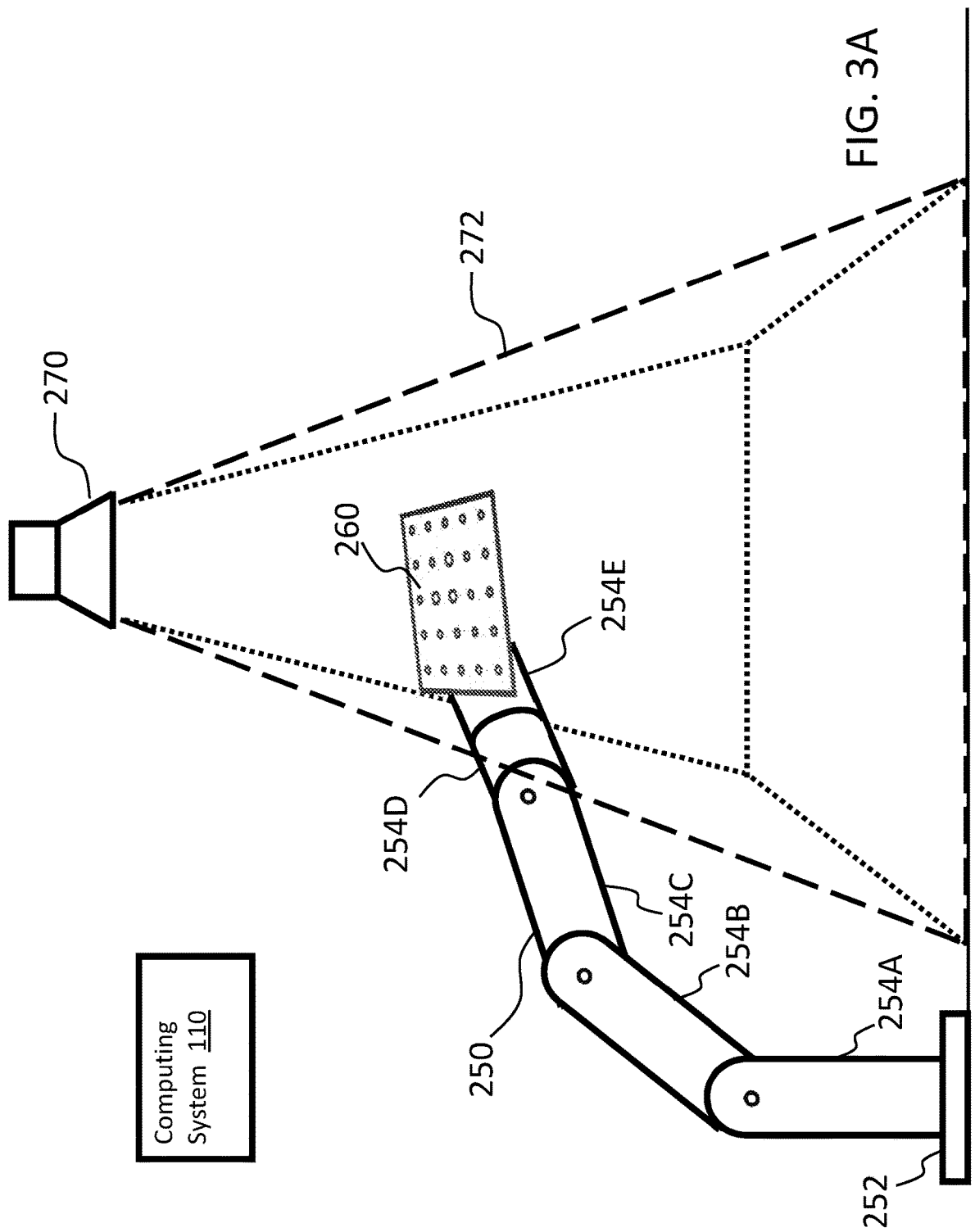

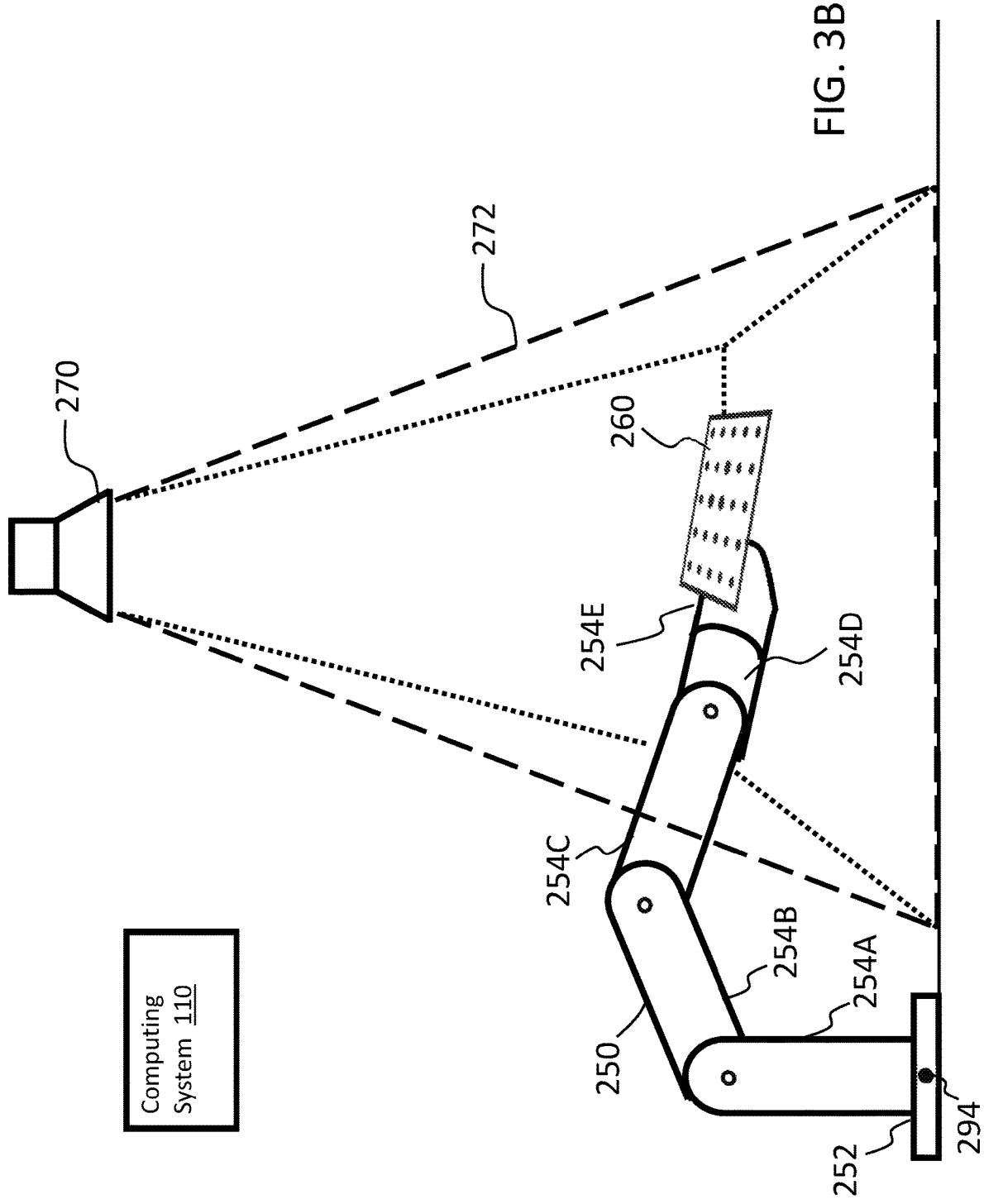

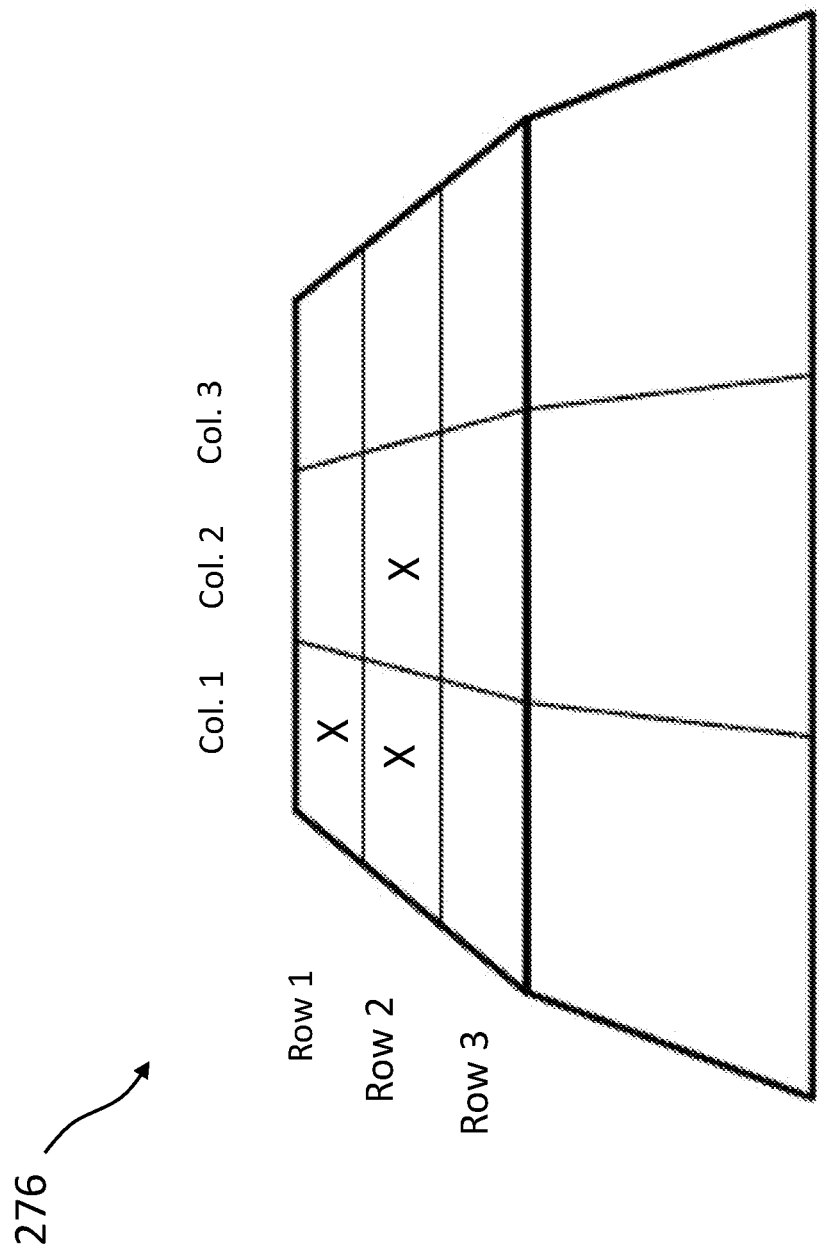

METHOD AND SYSTEM FOR DETERMINING POSES FOR CAMERA CALIBRATION

FIELD OF THE INVENTION

The present invention is directed to a method and system for determining poses for camera calibration and for robot control.

BACKGROUND

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as an image taken by a camera in the warehouse or factory. In the latter situation, calibration may be performed so as to determine a property of the camera, and to determine a relationship between the camera and an environment in which the robot is located. The calibration may be referred to as camera calibration, and may generate calibration information that is used to control the robot based on images captured by the camera. In some implementations, the camera calibration may involve manual operation by a person, who may manually control movement of the robot, or manually control the camera to capture an image of the robot.

SUMMARY

One aspect of the embodiments herein relates to a computing system or a method performed by the computing system (e.g., via instructions on a non-transitory computer-readable medium). The computing system may comprise a communication interface configured to communicate with a robot and with a camera having a camera field of view, wherein the robot has a calibration pattern disposed thereon. The computing system may further have a control circuit configured, when the computing system is in communication with the robot and with the camera, to perform camera calibration by: determining a range of pattern orientations for performing the camera calibration, wherein the range of pattern orientations is a range of orientations for the calibration pattern; determining a surface region on a surface of an imaginary sphere, wherein the surface of the imaginary sphere represents possible pattern orientations for the calibration pattern, and the surface region represents the range of pattern orientations for performing the camera calibration; determining a plurality of poses for the calibration pattern to adopt when the camera calibration is being performed, wherein the plurality of poses are defined by respective combinations of a plurality of respective locations within the camera field of view and a plurality of respective sets of pose angle values, wherein each set of pose angle values of the plurality of respective sets is based on a respective surface point selected from within the surface region on the surface of the imaginary sphere; outputting a plurality of robot movement commands for controlling placement of the calibration pattern, wherein the plurality of robot movement commands are generated based on the plurality of poses that are determined; receiving a plurality of calibration images, wherein each calibration image of the plurality of calibration images represents the calibration pattern and is generated while the calibration pattern has a respective pose of the plurality of poses; and determining an estimate of a camera calibration parameter based on the plurality of calibration images. The control circuit is further configured, after the camera calibration is performed, to receive a subsequent image from the camera via the communication interface, and to output a subsequent robot movement command that is generated based on the subsequent image and based on the estimate of the camera calibration parameter.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 3A and 3B depict a system in which camera calibration is performed, and in which a calibration pattern can adopt various poses, according to an embodiment herein.

FIGS. 14A and 14B illustrate examples of a random spatial distribution for various poses, according to an embodiment hereof.

DETAILED DESCRIPTION

Figure 1:
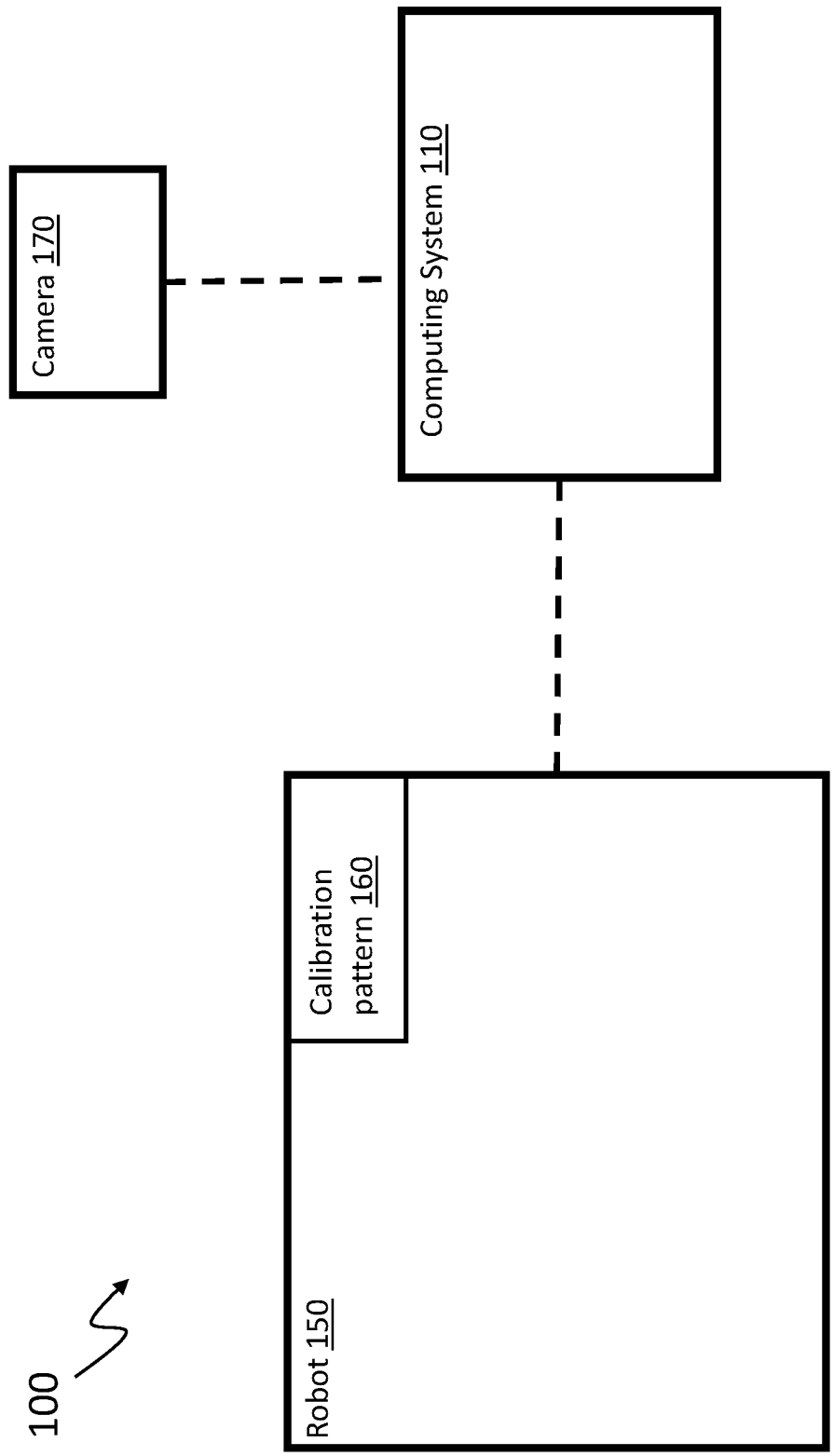
FIG. 1 depicts a block diagram of systems in which camera calibration is performed, according to an embodiment herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to determining poses for performing camera calibration. A pose may refer to, e.g., an orientation (which may be referred to as pattern orientation) at which a calibration pattern is placed, a location at which the calibration pattern is placed, or a combination thereof. A camera may photograph or otherwise image the calibration pattern while the calibration pattern has that pose, so as to generate a calibration image corresponding to the pose, and the calibration image may be used to perform the camera calibration. Performing the camera calibration may, e.g., involve estimating a property of the camera, and/or a relationship between the camera and its environment. After the camera calibration is performed, images generated by the camera may facilitate control of a robot that is used to interact with objects in the environment of the camera. For instance, the robot may be used to pick up a package in a warehouse, wherein movement of an arm or other component of the robot may be based on images of the package generated by the camera.

One aspect of the embodiments herein relates to attempting to achieve a distribution of poses in which the poses are generally spread out in terms of location of the calibration pattern and/or pattern orientation. If the poses instead have a distribution in which the poses are concentrated in certain regions, or are concentrated around certain pattern orientations in a desired range of pattern orientations, the resulting calibration images may capture certain camera behavior that are manifested when photographed objects are at those regions and/or orientations, but may miss camera behavior corresponding to photographed objects being at other regions and/or orientations. Determining the poses in a manner that instead spreads out the poses, so as to create, e.g., a more uniform distribution of the poses in terms of location and/or orientation, may cause the resulting calibration images to more completely or more accurately capture camera behavior. For instance, if the camera behavior is lens distortion that can be introduced by a lens of the camera, spreading out the poses of the calibration pattern may allow the calibration pattern to have diverse poses, and to be photographed or otherwise imaged at diverse locations and/or pattern orientations. Such diverse poses may render the resulting calibration images more likely to capture a greater number of ways in which the lens distortion is manifested. Such calibration images may allow the lens distortion, or another property of the camera, to be characterized or otherwise estimated in a more complete and accurate manner.

One aspect of the embodiments herein relate to determining pose angle values for different poses of the calibration pattern, and more specifically to doing so in a manner that achieves a desired distribution for pattern orientations of the calibration pattern. The distribution of pattern orientations may refer to a distribution of directions in which the calibration pattern is oriented. For instance, a generally uniform distribution within a desired range of pattern orientations may refer to a distribution in which the calibration pattern has directions that are within a desired range of directions, and are generally evenly distributed among the desired range of directions, wherein the desired range of pattern orientations may be defined by the desired range of directions.

In an embodiment, the pose angle value discussed above may be an angle value of a pose angle, which may be an angle between the calibration pattern and a frame of reference, such as an optical axis of the camera. The pose angle may be used to control tilting of the calibration pattern relative to, e.g., the camera (such a tilt may be referred to as a relative tilt). In an embodiment, multiple pose angles may be used to control tilting of the calibration pattern, and a set of respective pose angle values for the multiple pose angles may be used to control a direction and amount of the relative tilt of the calibration pattern. In some cases, a set of pattern orientations may be determined by determining a set of respective pose angle values for each of the multiple pose angles individually, according to a desired distribution (e.g., a uniform distribution). However, such an approach may not actually achieve the desired distribution for the set of pattern orientations. For instance, if a pattern orientation is controlled by three pose angles, determining a set of pose angle values for each of the three pose angles individually, according to a uniform distribution, may not actually lead to a uniform distribution for the resulting set of pattern orientations. Thus, one aspect of the embodiments herein relate to determining a pose angle value for a pose angle by initially determining a pattern orientation that is consistent with a desired distribution, and then determining the pose angle value based on the desired distribution.

In an embodiment, determining a pattern orientation that is consistent with a desired distribution may involve selecting a surface point that is on an imaginary sphere. The surface point may be a point on a surface of the imaginary sphere, which may represent possible pattern orientations for a calibration pattern, and more specifically may represent directions at which a normal vector of the calibration pattern can point. In some cases, a center of the imaginary sphere may be at one endpoint of the normal vector, and the imaginary sphere may have a surface that is a loci of points that can be pointed at or more generally directed towards by the other endpoint of the normal vector. In some cases, a region on the surface of the imaginary sphere (which may be referred to as a surface region) may represent a desired range of pattern orientations, and surface points within the surface region may represent respective pattern orientations within the desired range. In an embodiment, the surface point may be selected from the surface of the imaginary sphere, and more specifically from within the surface region, according to a desired distribution. For example, selecting the surface point according to a desired uniform distribution may involve sampling surface points within the surface region to select one of those surface points, wherein the sampling may be done in a manner such that each of the surface points within the surface region is equally likely to be selected. In this embodiment, a pose angle value for a pose angle may be determined based on the selected surface point. If the pattern orientation is controlled by multiple pose angles, then a respective pose angle value may be determined for each of the multiple pose angles based on the selected surface point. If a plurality of pattern orientations are determined in the above manner for a plurality of respective poses, the plurality of pattern orientations may more likely have a desired distribution, such as a uniform distribution.

One aspect of the embodiments herein relates to determining respective locations for a plurality of poses in a manner such that the plurality of poses are spread out within the camera's field of view (also referred to as a camera field of view). Each of the determined locations may, in some cases, be combined with a respective set of pose angle values to form a pose for the calibration pattern. The respective set of pose angle values may be determined using, e.g., the manner described above. In an embodiment, a space within the camera's field of view may be divided into a grid that has one or more layers and has multiple rows and multiple columns. In some cases, determining the respective locations may involve attempting to find locations that will achieve a first spatial distribution which will place the plurality of poses at diverse regions. If the first spatial distribution cannot be achieved, the determination may further involve attempting to find locations to achieve a second spatial distribution that may also attempt to place the plurality of poses at diverse regions, but may have less conditions or a more relaxed condition relative to the first spatial distribution. In some cases, if the first spatial distribution, the second spatial distribution, and/or another spatial distribution cannot be achieved, the locations for the plurality of poses may be determined to achieve a random spatial distribution.

In an embodiment, the first spatial distribution may be a distribution in which i) each row in a particular layer of the grid includes only one pose, or includes no more than one pose, and in which ii) each column in the layer includes only one pose, or includes no more than one pose. In an embodiment, the second spatial distribution may be a distribution in only one of the above criteria for the first spatial distribution have to be satisfied. More specifically, the second spatial distribution may be a distribution in which i) each row in a particular layer of the grid includes only one pose, or includes no more than one pose, or ii) each column in a particular layer includes only one pose, or no more than one pose.

FIG. 1 illustrates a block diagram of a robot operation system 100 for performing automatic camera calibration. The robot operation system 100 includes a robot 150, a computing system 110, and a camera 170. In some cases, the computing system 110 may be configured to control the robot 150, and may be referred to in those cases as a robot control system or a robot controller. In an embodiment, the robot operation system 100 may be located within a warehouse, a manufacturing plant, or other premises. The computing system 110 may be configured to perform camera calibration, such as by determining calibration information that is later used to control the robot 150. In some cases, the computing system 110 is configured both to perform the camera calibration and to control the robot 150 based on the calibration information. In some cases, the computing system 110 may be dedicated to performing the camera calibration, and may communicate the calibration information to another computing system that is dedicated to controlling the robot. The robot 150 may be positioned based on images captured by the camera 170 and on the calibration information. In some cases, the computing system 110 may be part of a vision system that acquires images of an environment in which the camera 170 is located.

In an embodiment, the computing system 110 may be configured to communicate via a wired or wireless communication with the robot 150 and the camera 170. For instance, the computing system 110 may be configured to communicate with the robot 150 and/or the camera 170 via a RS-232 interface, a universal serial bus (USB) interface, an Ethernet interface, a Bluetooth® interface, an IEEE 802.11 interface, or any combination thereof. In an embodiment, the computing system 110 may be configured to communicate with the robot 150 and/or the camera 170 via a local computer bus, such as a peripheral component interconnect (PCI) bus.

In an embodiment, the computing system 110 may be separate from the robot 150, and may communicate with the robot 150 via the wireless or wired connection discussed above. For instance, the computing system 110 may be a standalone computer that is configured to communicate with the robot 150 and the camera 170 via a wired connection or wireless connection. In an embodiment, the computing system 110 may be an integral component of the robot 150, and may communicate with other components of the robot 150 via the local computer bus discussed above. In some cases, the computing system 110 may be a dedicated control system (also referred to as a dedicated controller) that controls only the robot 150. In other cases, the computing system 110 may be configured to control multiple robots, including the robot 150. In an embodiment, the computing system 110, the robot 150, and the camera 170 are located at the same premises (e.g., warehouse). In an embodiment, the computing system 110 may be remote from the robot 150 and the camera 170, and may be configured to communicate with the robot 150 and the camera 170 via a network connection (e.g., local area network (LAN) connection).

In an embodiment, the computing system 110 may be configured to access and to process calibration images, which are images of a calibration pattern 160 that is disposed on the robot 150. The computing system 110 may access the calibration images by retrieving or, more generally receiving, the calibration images from the camera 170 or from another source, such as from a storage device or other non-transitory computer-readable medium on which the calibration images are stored. In some instances, the computing system 110 may be configured to control the camera 170 to capture such images. For example, the computing system 110 may be configured to generate a camera command that causes the camera 170 to generate an image that captures a scene in a field of view of the camera 170 (also referred to as a camera field of view), and to communicate the camera command to the camera 170 via the wired or wireless connection. The same command may cause the camera 170 to also communicate the image (as image data) back to the computing system 110, or more generally to a storage device accessible by the computing system 110. Alternatively, the computing system 110 may generate another camera command that causes the camera 170, upon receiving the camera command, to communicate an image(s) it has captured to the computing system 110. In an embodiment, the camera 170 may automatically capture an image of a scene in its camera field of view, either periodically or in response to a defined triggering condition, without needing a camera command from the computing system 110. In such an embodiment, the camera 170 may also be configured to automatically, without a camera command from the computing system 110, communicate the image to the computing system 110 or, more generally, to a storage device accessible by the computing system 110.

In an embodiment, the computing system 110 may be configured to control movement of the robot 150 via movement commands that are generated by the computing system 110 and communicated over the wired or wireless connection to the robot 150. The movement commands may cause the robot to move a calibration pattern 160 disposed on the robot. The calibration pattern 160 may be permanently disposed on the robot 150, or may be a separate component that can be attached to and detached from the robot 150.

In an embodiment, the camera 170 may be configured to generate or otherwise acquire an image that captures a scene in a camera field of view, such as by photographing the scene. The image may be formed by image data, such as an array of pixels. The camera 170 may be a color image camera, a grayscale image camera, a depth-sensing camera (e.g., a time-of-flight (TOF) or structured light camera), or any other camera. In an embodiment, the camera 170 may include one or more lenses, an image sensor, and/or any other component. The image sensor may include, e.g., a charge-coupled device (CCD) sensor, a complementary metal oxide semiconductor (CMOS) sensor, a quanta image sensor (QIS), or any other image sensor.

Figure 2:
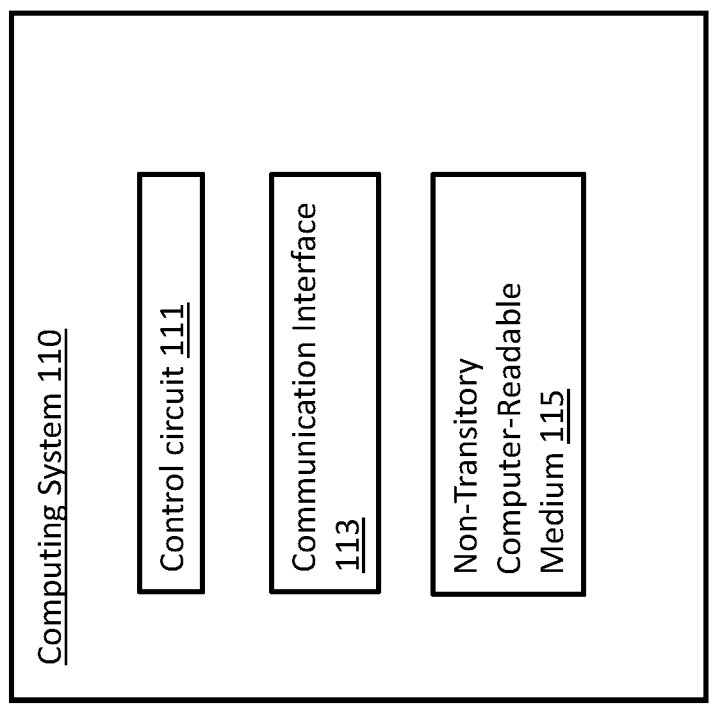
FIG. 2 depicts a block diagram of a computing system configured to determine poses for performing camera calibration, according to an embodiment herein.

FIG. 2 depicts a block diagram of the computing system 110. As illustrated in the block diagram, the computing system 110 can include a control circuit 111, a communication interface 113, and a non-transitory computer-readable medium 115 (e.g., memory). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the camera 170 and the robot 150. For instance, the communication interface 113 may include a communication circuit configured to perform communication over a wired or wireless protocol. As an example, the communication circuit may include a RS-232 port controller, a USB controller, an Ethernet controller, an IEEE 802.11 controller, a Bluetooth® controller, a PCI bus controller, any other communication circuit, or a combination thereof.

In an embodiment, the non-transitory computer-readable medium 115 may include an information storage device, such as computer memory. The computer memory may comprise, e.g., dynamic random access memory (DRAM), solid state integrated memory, and/or a hard disk drive (HDD). In some cases, the camera calibration may be implemented through computer-executable instructions (e.g., computer code) stored on the non-transitory computer-readable medium 115. In such cases, the control circuit 111 may include one or more processors configured to execute the computer-executable instructions to perform the camera calibration (e.g., the steps illustrated in FIG. 9). In an embodiment, the non-transitory computer-readable medium may be configured to store one or more calibration images that are generated by the camera 170.

As stated above, one aspect of the embodiments herein relate to determining a plurality of poses for the calibration pattern 160. Each pose may refer to a combination of a location and a pattern orientation of the calibration pattern 160. The plurality of poses may be determined so as to place the calibration pattern 160 (via the robot 150) at different locations within the camera field of view, and to tilt or otherwise move the calibration pattern 160 to have different pattern orientations relative to the camera 170. For instance, FIGS. 3A and 3B depict two different poses for a calibration pattern 260 within a robot operation system 200. The robot operation system 200 may be an embodiment of the robot operation system 100, and includes the computing system 110, a camera 270 (which may be an embodiment of the camera 170), a robot 250 (which may be an embodiment of the robot 150), and the calibration pattern 260, which may be an embodiment of the calibration pattern 260.

In the example of FIGS. 3A and 3B, the robot 250 may have a robot arm that comprises a plurality of links 254A-254E that are connected by joints. The robot arm may be configured to move the calibration pattern 260. The movement may include placing the calibration pattern 260 at different locations within a camera field of view 272 of the camera 270, and/or tilting the calibration pattern 260 to different orientations relative to the camera 270. In some cases, the robot arm may be configured to move via rotation of one or more links of the plurality of links 254A-254E about one or more of the joints connecting the plurality of links 254A-254E. In some instances, the robot arm may move in response to a movement command (also referred to as a robot movement command). For example, the robot 250 may include one or more motors (not shown) that are configured to output rotation at the plurality of joints connecting the links 254A-254E, so as to cause at least some of the links 254A-254E to rotate. In such an example, the movement command may include one or more motor commands that cause one or more of the motors to be activated. In some cases, the movement command may be generated by the computing system 110 and outputted by the computing system 110 to the robot 150. In some cases, the robot movement command may be generated by another computing system, and/or by the robot 250.

In an embodiment, the calibration pattern 260, which is an embodiment of the calibration pattern 160, may be moved by the robot arm of the robot 250 to different poses. More specifically, FIGS. 3A and 3B depict the calibration pattern 260 having a first pose and a second pose, respectively. The first pose and the second pose may be considered different poses because they have different respective combinations of a location for the calibration pattern 260 and a pattern orientation of the calibration pattern 260.

In an embodiment, the camera 270 may generate or otherwise acquire a first calibration image that captures the calibration pattern 260 while the calibration pattern 260 has the first pose depicted in FIG. 3A, and may generate or otherwise acquire a second calibration image that captures the calibration pattern 260 while the calibration pattern 260 has the second pose depicted in FIG. 3B. Because the first calibration image and the second calibration image capture the calibration pattern while the calibration pattern 260 is at the first pose and the second pose, respectively, the two poses may also be referred to as image-captured poses. The first calibration image and the second calibration image may be accessed by the computing system 110 or any other computing system to perform camera calibration.

In an embodiment, the camera calibration may determine, for instance, an estimate of one or more intrinsic camera parameters for the camera 270, and/or a relationship between the camera 270 and its environment. The one or more intrinsic camera parameters may include, e.g., a projection matrix of the camera 270, one or more distortion parameters of the camera 270, or any combination thereof. The relationship between the camera 270 and its environment may include, e.g., a matrix that describes a spatial relationship between the camera 270 and the robot 250. More specifically, the matrix may describe a spatial relationship between the camera 270 and a world point 294 (which is depicted in FIG. 3B), which may be a point that is stationary relative to the base 252 of the robot 250. The camera calibration information may subsequently be used to facilitate interaction between the robot 250 and an object, such as a package in a warehouse. For instance, the camera 270 may be configured to generate or otherwise acquire an image of the object, and the computing system 110 or some other computing system may be configured to use the image of the object and the camera calibration information to determine a spatial relationship between the robot 250 and the object. Determining the estimate of camera calibration parameters is discussed in more detail in U.S. patent application Ser. No. 16/295,940, entitled "METHOD AND SYSTEM FOR PERFORMING AUTOMATIC CAMERA CALIBRATION FOR ROBOT CONTROL," which is incorporated by reference herein in its entirety.

Figure 4A:
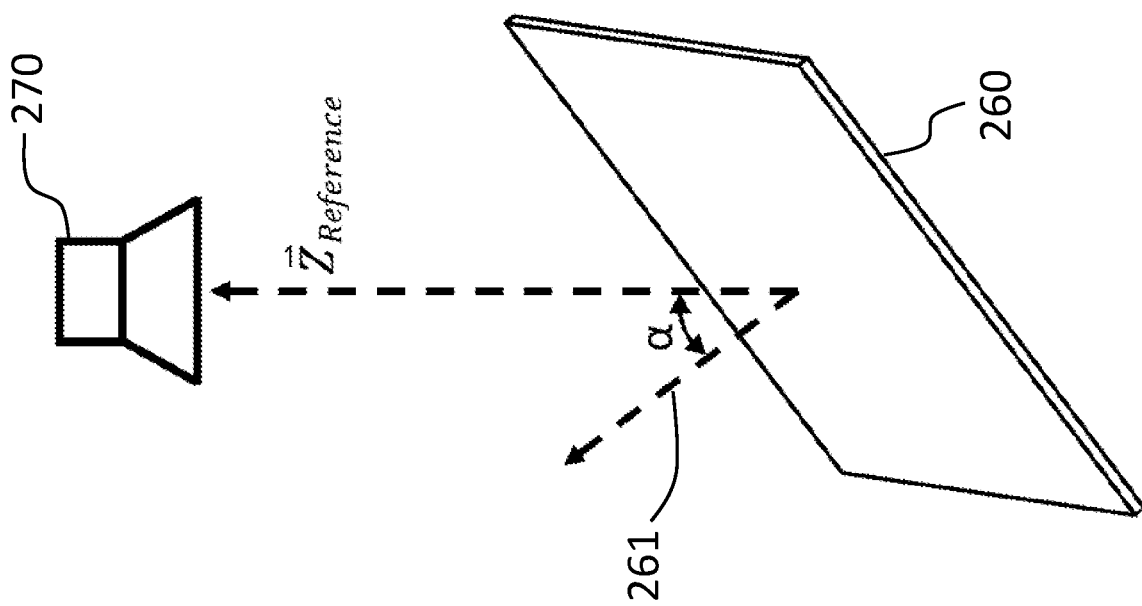
FIG. 4A illustrates an angle value of a pose angle between a calibration pattern and a camera, according to an embodiment herein.
Figure 4B:
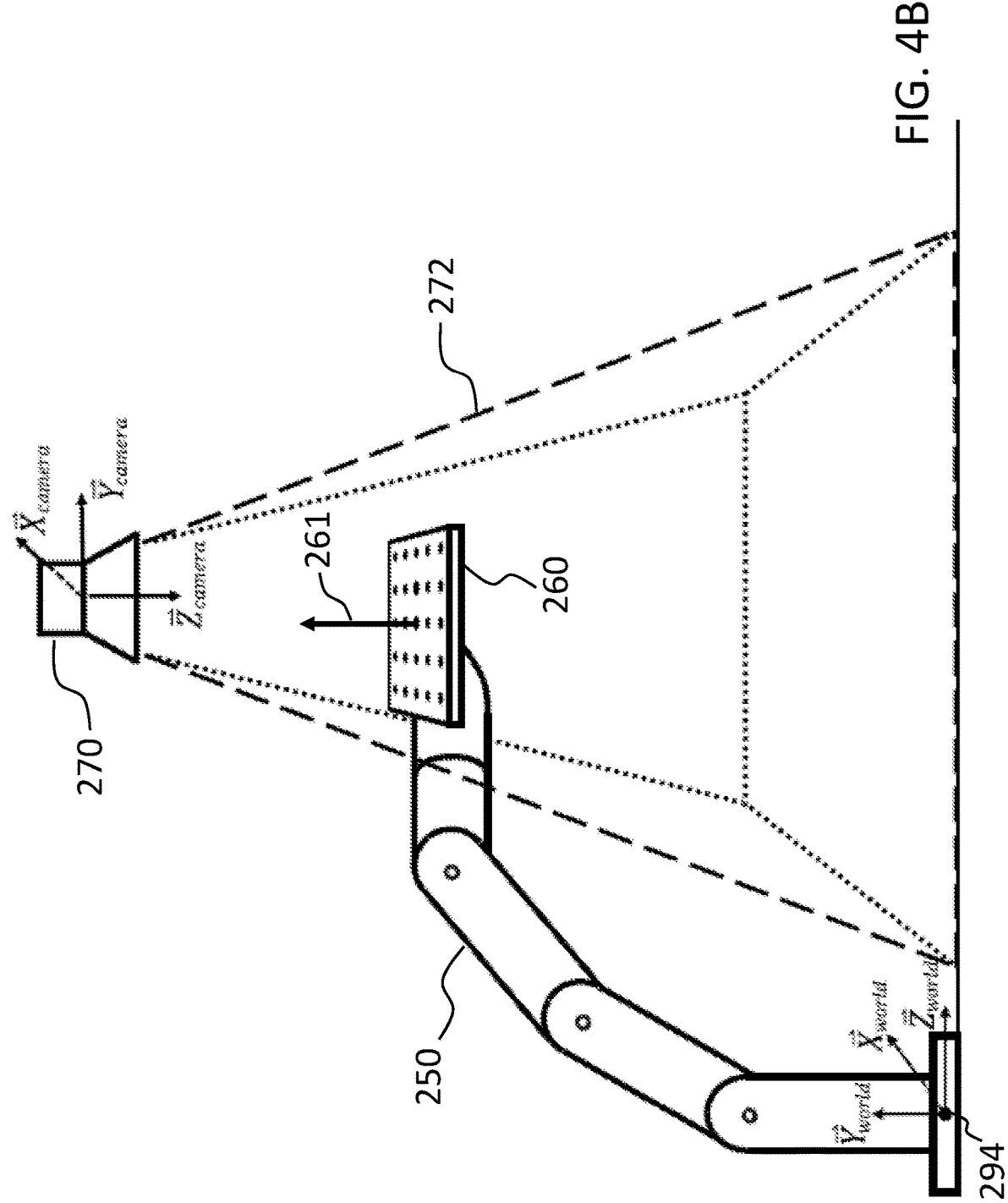
FIGS. 4B and 4C depict a normal vector of the calibration pattern, a camera coordinate system, and a pattern coordinate system, according to an embodiment herein.

In an embodiment, as also stated above, a pattern orientation of the calibration pattern 160/260 may be controlled by one or more pose angles. Generally speaking, a pose angle may be an angle between the calibration pattern 160/260 and a reference axis. For instance, FIG. 4A depicts a pose angle α that is formed between a normal vector 261 of the calibration pattern 260 and a $\vec{Z}_{Reference}$ axis. The normal vector 261 may be a vector that is orthogonal to a plane defined by the calibration pattern 260 of FIG. 4A. In some instances, the normal vector may be a vector that is coincident, or more generally aligned with, a $\vec{Z}_{Pattern}$ axis, which is discussed below in more detail. The $\vec{Z}_{Reference}$ axis may be a reference axis against which the pose angle α is measured. In the example of FIG. 4A, $\vec{Z}_{Reference}$ may parallel with and/or coincident with a Z-axis for a coordinate system of the camera 270 (also referred to as a camera coordinate system), wherein the Z-axis is labeled $\vec{Z}_{Camera}$. The camera coordinate system, along with a world coordinate system, are illustrated in FIG. 4B. In some cases, if the camera 270 has one or more lenses, $\vec{Z}_{Camera}$ for the camera coordinate system may be an optical axis of the one or more lenses. Further, if the camera 270 has an image sensor (e.g., a CCD sensor), the X-axis, or $\vec{X}_{Camera}$, of the camera coordinate system and the Y-axis, or $\vec{Y}_{Camera}$, of the camera coordinate system may define a two-dimensional (2D) image plane of the image sensor. The camera coordinate system may have an origin that is located at the one or more lenses, on a surface of the image sensor, or at any other location. FIG. 4B further illustrates a world coordinate system, which may be a coordinate system that has an origin about the world point 294. As depicted in FIG. 4B, the world coordinate system may be defined by the axes $\vec{X}_{World}$, $\vec{Y}_{World}$, $\vec{Z}_{World}$.

Figure 4C:
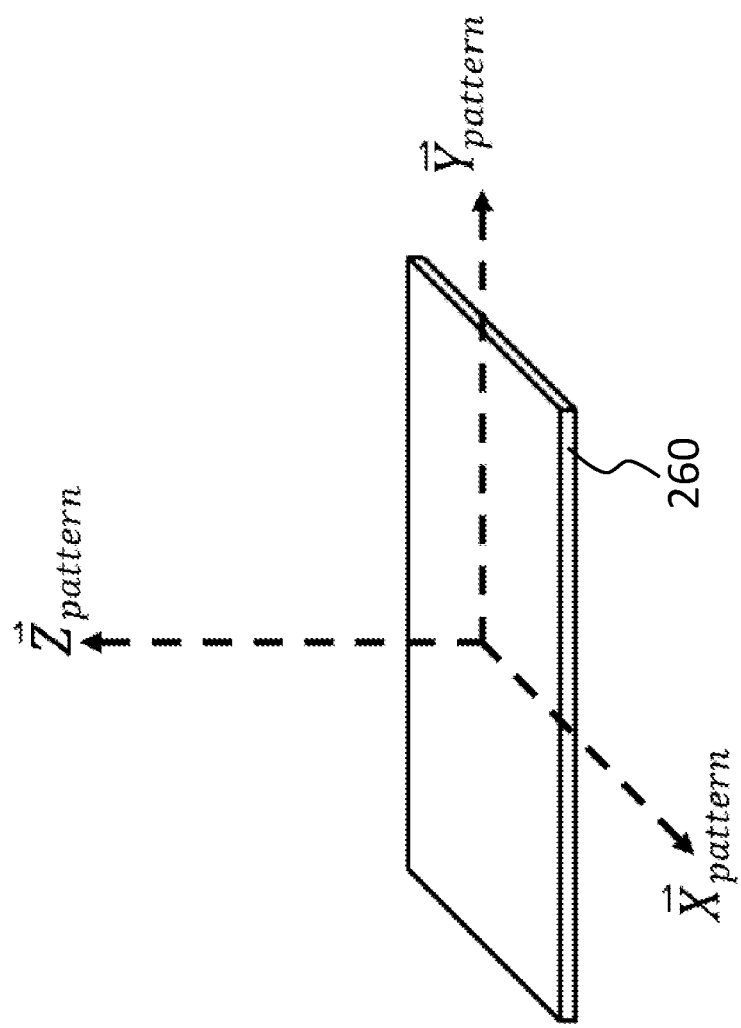

As stated above, the normal vector 261 of the calibration pattern 260 may in some cases be coincident with, or more generally parallel with, a Z-axis of a pattern coordinate system, or $\vec{Z}_{Pattern}$. FIG. 4C depicts the coordinate axes of the pattern coordinate system, namely $\vec{X}_{Pattern}$, $\vec{Y}_{Pattern}$, and $\vec{Z}_{Pattern}$. In some implementations, the calibration pattern 260 may have a plurality of pattern elements (e.g., dots) that have known locations, or more generally defined locations, in the pattern coordinate system. For instance, the plurality of pattern elements may be a grid of dots that have predefined spacing. In such implementations, an origin of the pattern coordinate system may be located at one of the pattern elements, or may be located elsewhere. Calibration patterns are discussed in more detail in U.S. patent application Ser. No. 16/295,940, entitled "METHOD AND SYSTEM FOR PERFORMING AUTOMATIC CAMERA CALIBRATION FOR ROBOT CONTROL," the content of which is incorporated by reference herein in its entirety.

Figure 5A:
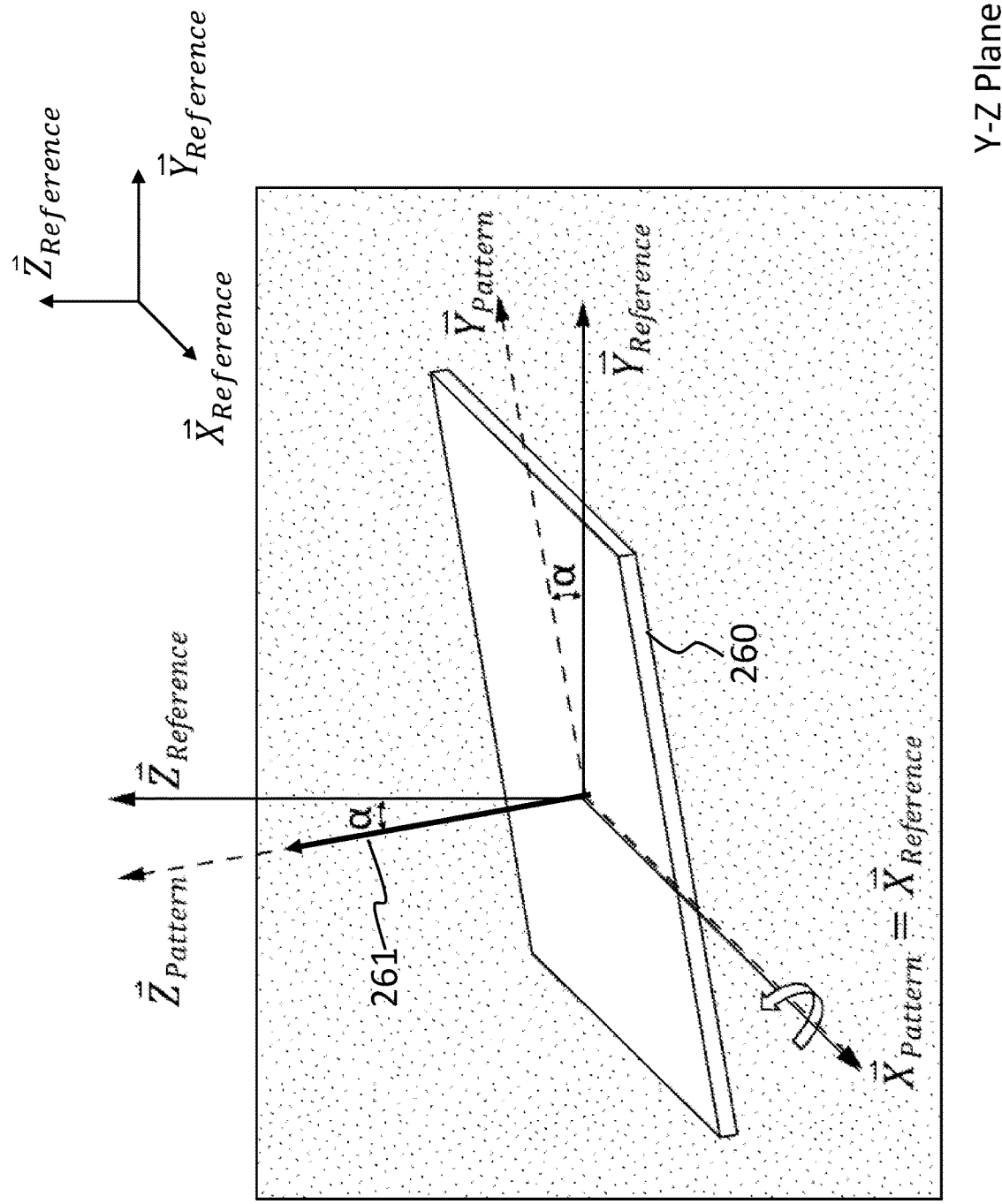
FIGS. 5A-5C depict various pose angles for a calibration pattern, according to an embodiment herein.
Figure 5B:
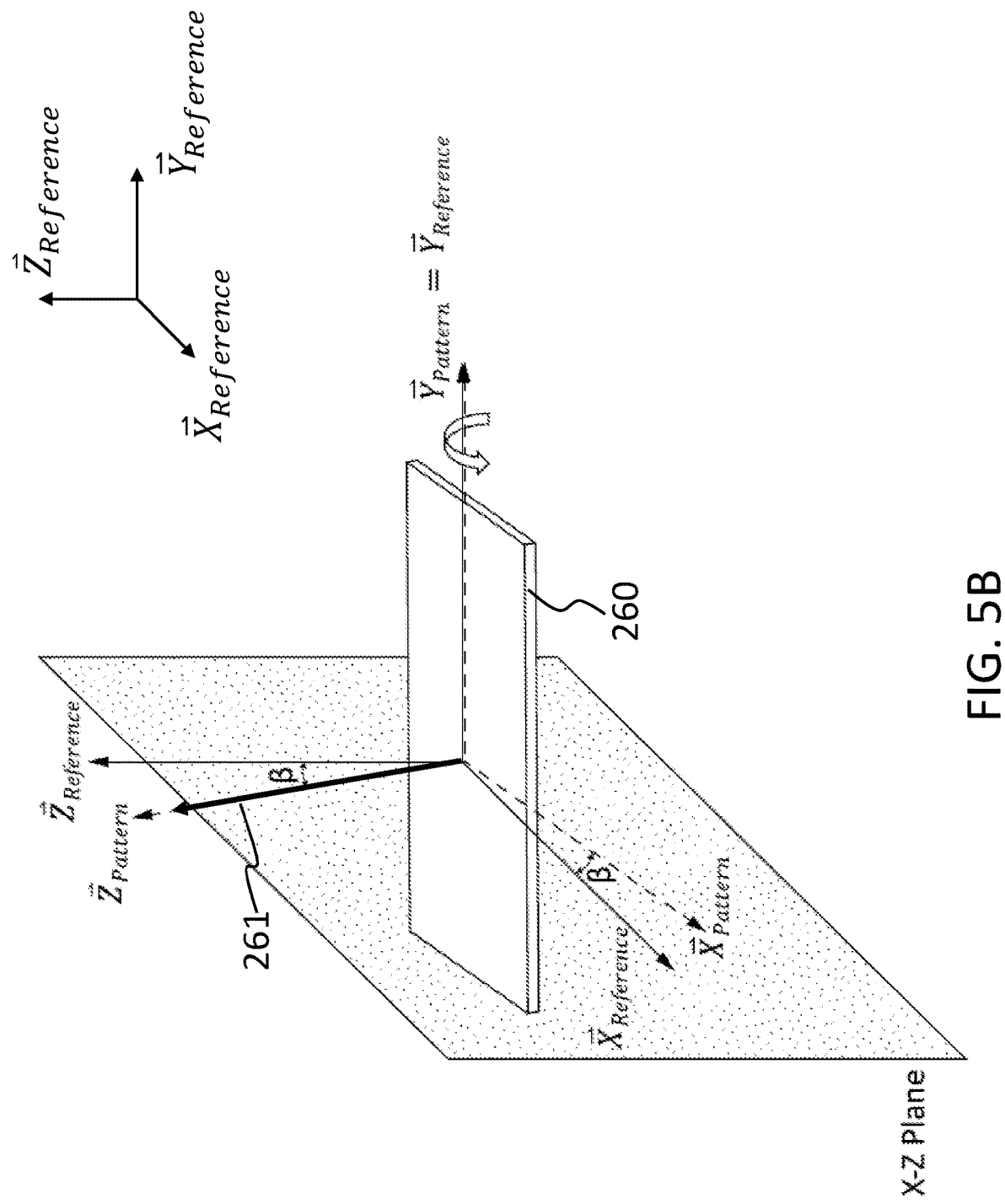
Figure 5C:
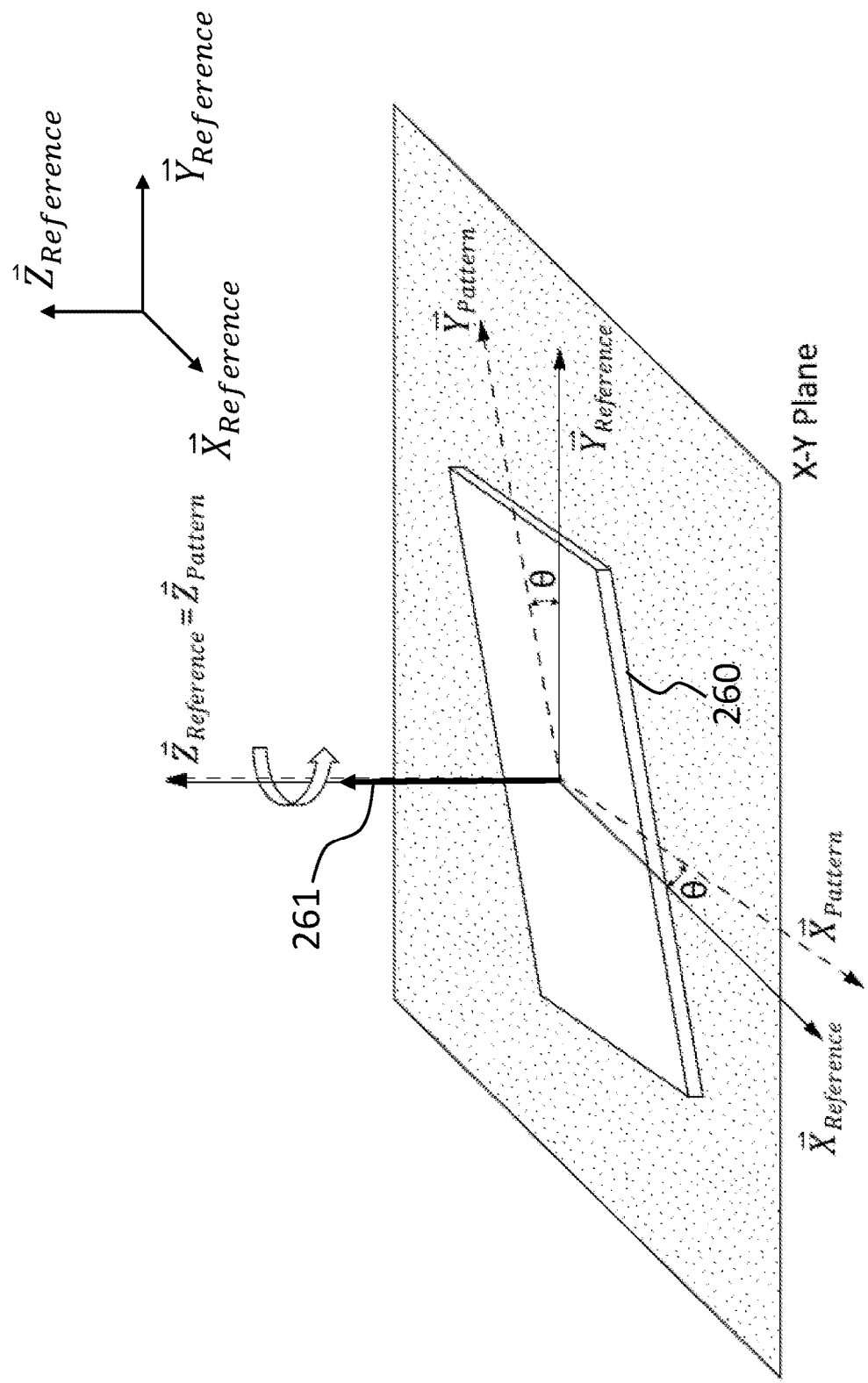

In an embodiment, a pattern orientation of the calibration pattern 160/260 may be controlled by a set of pose angles, and more specifically by a set of respective pose angle values for the pose angles. For instance, FIGS. 5A-5C depict using some or all of three pose angles α, β, θ to define a pattern orientation of the calibration pattern 260. In this example, pose angle α may be an angle that is formed between the normal vector 261 and $\vec{Z}_{Reference}$ along a Y-Z plane formed by $\vec{Z}_{Reference}$ and $\vec{Y}_{Reference}$. In this example, the normal vector 261 may be coincident with $\vec{Z}_{Pattern}$, such that the pose angle α may also be an angle between $\vec{Z}_{Pattern}$ and $\vec{Z}_{Reference}$. In some instances, the reference axis $\vec{Z}_{Reference}$ may be an axis that is coincident, or more generally parallel, with the $\vec{Z}_{Camera}$ of FIG. 4B. In some instances, the $\vec{Z}_{Reference}$ axis may be an optical axis of the camera 270. In some instances, $\vec{Y}_{Reference}$ may be an axis that is parallel with the $\vec{Y}_{Camera}$ axis of FIG. 4B, while $\vec{X}_{Reference}$ axis may be an axis that is parallel with the $\vec{X}_{Camera}$ axis of FIG. 4B. In the example depicted in FIG. 5A, the pose angle α may also be defined as an angle between $\vec{Y}_{Pattern}$ and $\vec{Y}_{Reference}$, and/or as an angle that is formed by rotating the calibration board 260 about the $\vec{X}_{Reference}$ axis, which may be an axis of rotation for the angle α.

In an embodiment, the pose angle β, which is illustrated in FIG. 5B, may be an angle that is formed between the normal vector 261 and $\vec{Z}_{Reference}$ along a X-Z plane formed by $\vec{Z}_{Reference}$ and $\vec{X}_{Reference}$. Because the normal vector 261 may be coincident with $\vec{Z}_{Pattern}$, the pose angle β may also be an angle between $\vec{Z}_{Pattern}$ and $\vec{Z}_{Reference}$. In the example depicted in FIG. 5B, the pose angle β may also be defined as an angle between $\vec{X}_{Pattern}$ and $\vec{X}_{Reference}$, and/or as an angle that is formed by rotating the calibration board 260 about the $\vec{Y}_{Reference}$ axis, which may be an axis of rotation for the angle β.

In an embodiment, the pose angle θ, which is illustrated in FIG. 5C, may be an angle that is formed between $\vec{X}_{Pattern}$ and $\vec{X}_{Reference}$, or between $\vec{Y}_{Pattern}$ and $\vec{Y}_{Reference}$, along a X-Y plane formed by $\vec{Y}_{Reference}$ and $\vec{X}_{Reference}$. In the example depicted in FIG. 5C, the pose angle θ may also be defined as an angle that is formed by rotating the calibration board 260 about the $\vec{Z}_{Reference}$ axis and/or about the normal vector 261, which may be an axis of rotation of the angle θ. Thus, in an embodiment, the pose angles α, β, θ may represent respective amounts of rotation of the calibration pattern 260 about respective axes of rotation (e.g., $\vec{X}_{Reference}$, $\vec{Y}_{Reference}$, $\vec{Z}_{Reference}$), wherein the respective axes are orthogonal to each other. In some instances, the respective axes may be parallel with or orthogonal to a camera optical axis, which may be an axis that is parallel with $\vec{Z}_{Camera}$. In other instances, they may be oblique to the camera optical axis.

Figure 6A:
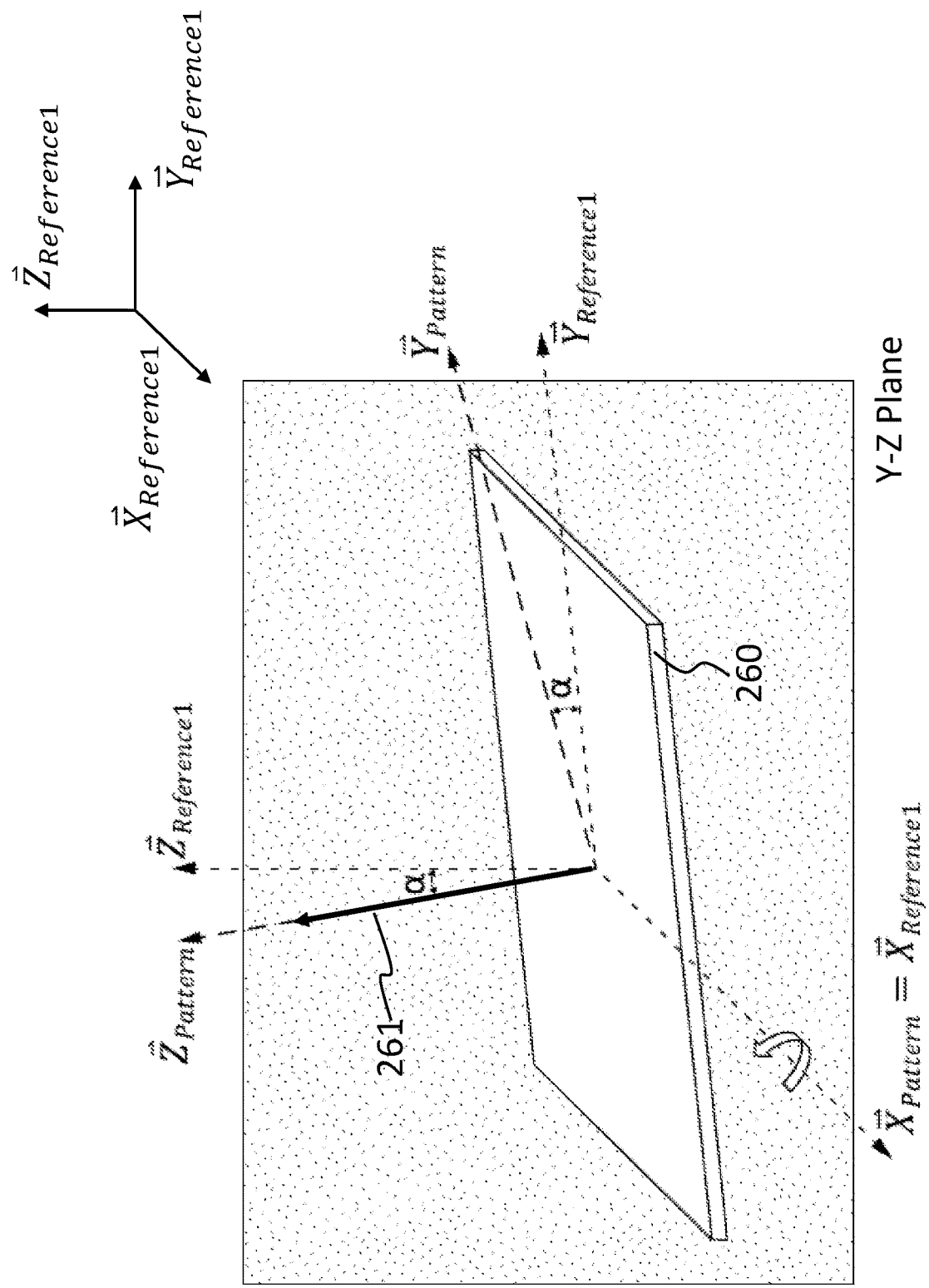
FIGS. 6A-6C depict various pose angles for a calibration pattern, according to an embodiment herein.
Figure 6B:
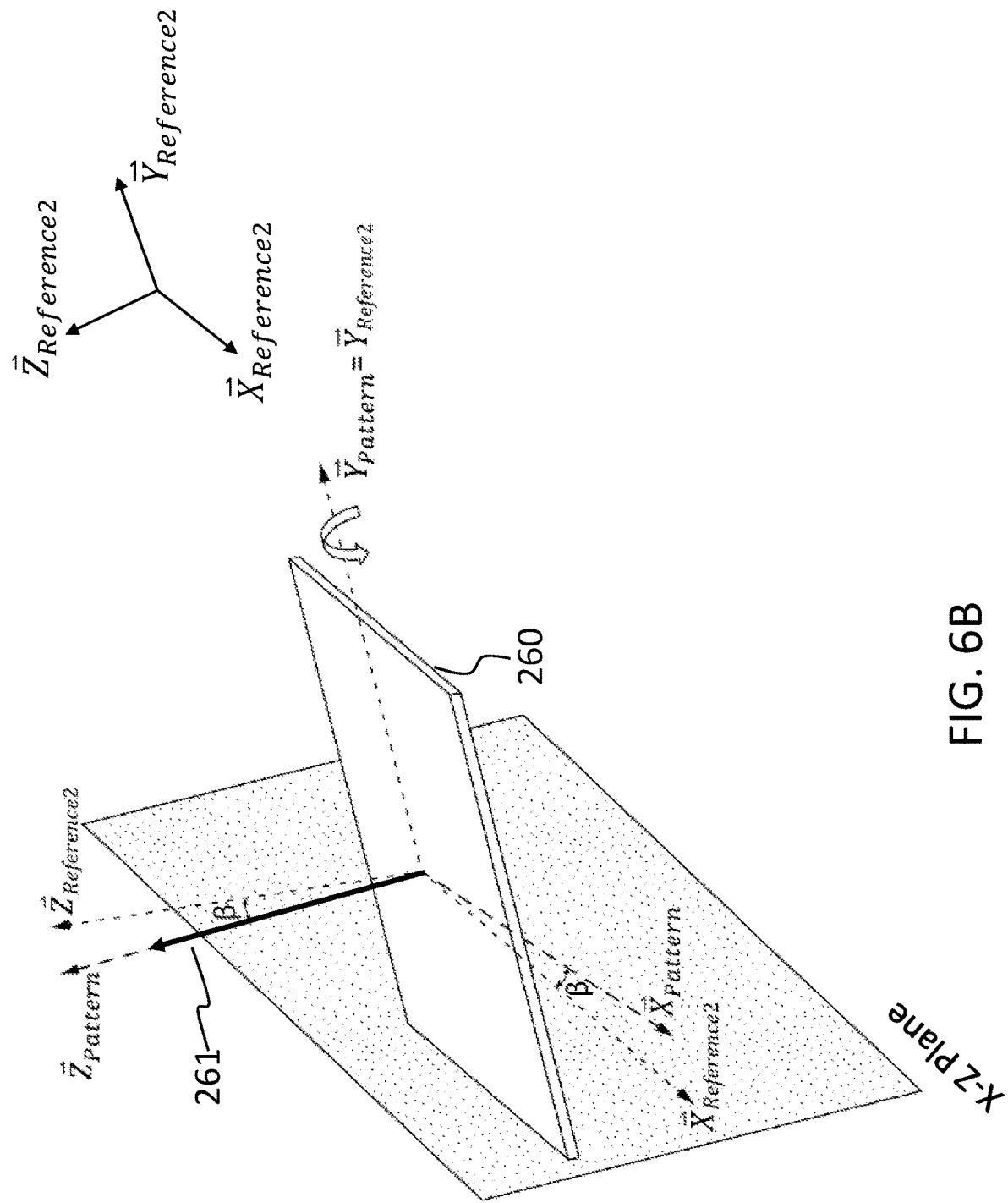
Figure 6C:
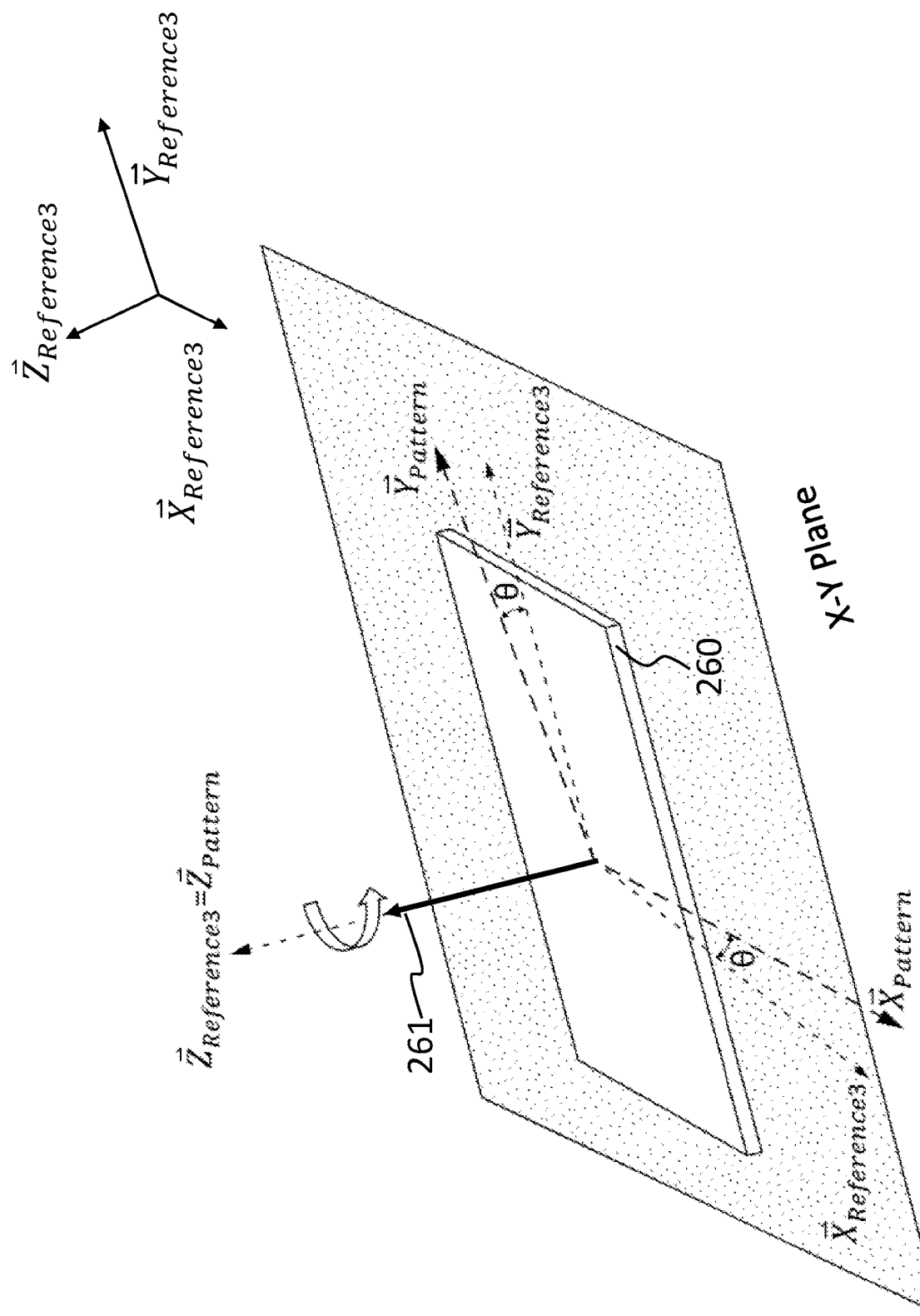

In an embodiment, the pose angles α, β, θ may be defined based on different reference coordinate systems, which may have different sets of coordinate axes. For instance, FIGS. 6A-6C depict an example in which the pose angle β is defined relative to a reference axis that is based on the pose angle α, and further depicts an example in which the pose angle θ is defined relative to another reference axis that is based on the pose angles α and β. More specifically, FIG. 6A illustrates an embodiment in which, similar to the embodiment of FIG. 5A, the pose angle α is an angle formed between the normal vector 261 and a reference axis $\vec{Z}_{Reference1}$ along a Y-Z plane formed by $\vec{Z}_{Reference1}$ and $\vec{Y}_{Reference1}$, wherein $\vec{X}_{Reference1}$, $\vec{Y}_{Reference1}$, and $\vec{Z}_{Reference1}$ may be coordinate axes of a first reference coordinate system. The normal vector 261 may be coincident with, or more generally parallel with, $\vec{Z}_{Pattern}$. The reference axis $\vec{Z}_{Reference1}$ may be an axis that is coincident, or more generally parallel, with the $\vec{Z}_{Camera}$ of FIG. 4B. In some instances, the $\vec{Z}_{Reference1}$ axis may be an optical axis of the camera 270. In some instances, $\vec{Y}_{Reference1}$ may be an axis that is parallel with the $\vec{Y}_{Camera}$ axis of FIG. 4B, while $\vec{X}_{Reference1}$ axis may be an axis that is parallel with the $\vec{X}_{Camera}$ axis of FIG. 4B. In the example depicted in FIG. 6A, the pose angle α may also be defined as an angle between $\vec{Y}_{Pattern}$ and $\vec{Y}_{Reference1}$, and/or as an angle that is formed by rotating the calibration board 260 about the $\vec{X}_{Reference1}$ axis.

In the example of FIGS. 6A-6C, the axes $\vec{X}_{Reference1}$, $\vec{Y}_{Reference1}$, $\vec{Z}_{Reference1}$ may be a first reference coordinate system, while the pose angle β may be defined relative to a second reference coordinate system. The second reference coordinate system may define a starting point for the calibration board 260 before it is rotated by the pose angle β. At such a starting point, the calibration board 260 has already been rotated by the pose angle α relative to the first reference coordinate system. Thus, the second reference coordinate system in this example may be a coordinate system that is rotated by α relative to the first reference coordinate system. The second reference coordinate system may be defined by the coordinate axes $\vec{X}_{Reference2}$, $\vec{Y}_{Reference2}$, $\vec{Z}_{Reference2}$. As depicted in FIG. 6B, the pose angle β may be an angle that is formed between the normal vector 261 and $\vec{Z}_{Reference2}$, or between $\vec{Z}_{Pattern}$ and $\vec{Z}_{Reference2}$ along a X-Z plane formed by $\vec{Z}_{Reference2}$ and $\vec{X}_{Reference2}$. In the example depicted in FIG. 6B, the pose angle β may also be defined as an angle between $\vec{X}_{Pattern}$ and $\vec{X}_{Reference2}$, and/or as an angle that is formed by rotating the calibration board 260 about the $\vec{Y}_{Reference2}$ axis.

Similarly, the pose angle θ may be defined relative to a third reference coordinate system. The third reference coordinate system may define a starting point for the calibration board 260 before it is rotated by the angle θ. This starting point may be defined by rotating the second coordinate system by the angle β, which may yield the coordinate axes $\vec{X}_{Reference3}$, $\vec{Y}_{Reference3}$, $\vec{Z}_{Reference3}$ for the third reference coordinate system. As illustrated in FIG. 6C, the pose angle θ may be an angle that is formed between $\vec{X}_{Pattern}$ and $\vec{X}_{Reference3}$ or between $\vec{Y}_{Pattern}$ and $\vec{Y}_{Reference3}$, along a X-Y plane formed by $\vec{Y}_{Reference3}$ and $\vec{X}_{Reference3}$. In the example depicted in FIG. 6C, the pose angle θ may also be defined as an angle that is formed by rotating the calibration board 260 about the $\vec{Z}_{Reference}$ axis, or about the normal vector 261.

As stated above, one aspect of the embodiments herein relate to controlling a calibration pattern 160/260 to have diverse poses, and more specifically to adopting a plurality of pattern orientations that have a desired distribution, such as a generally uniform distribution within a desired range of pattern orientations. The pattern orientations may be controlled by one or more pose angles, such as α, β, θ. However, simply generating angle values (also referred to as pose angle values) for each of the pose angles α, β, θ individually, according to a uniform distribution, may not necessarily cause resulting pattern orientations to have a uniform distribution.

Figure 7A:
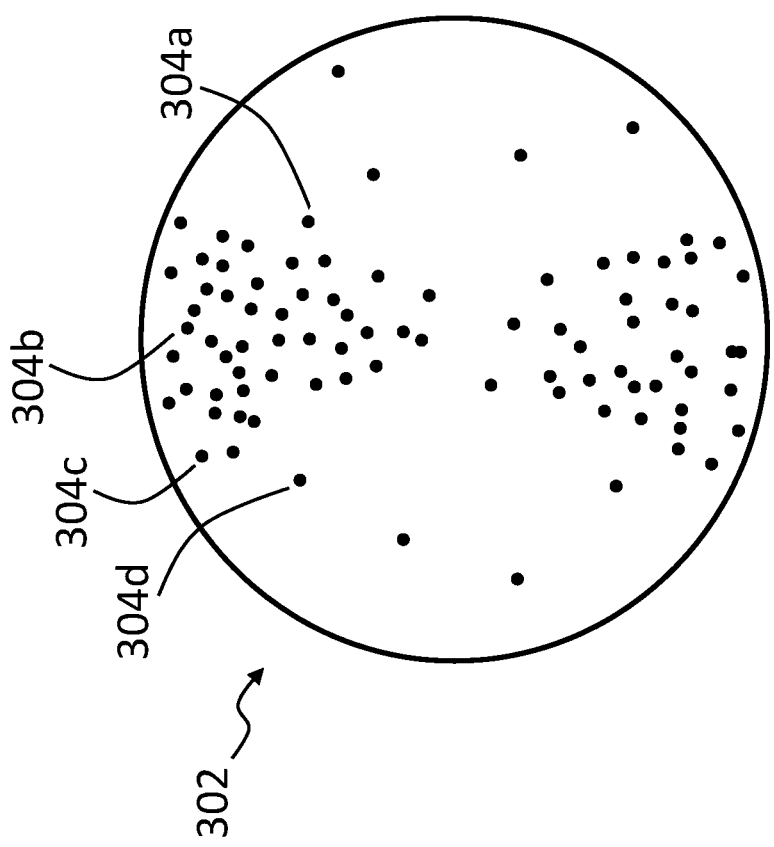
FIGS. 7A-7C illustrate an imaginary sphere that represent possible pattern orientations of a calibration pattern, and surface points on the imaginary sphere.
Figure 7B:
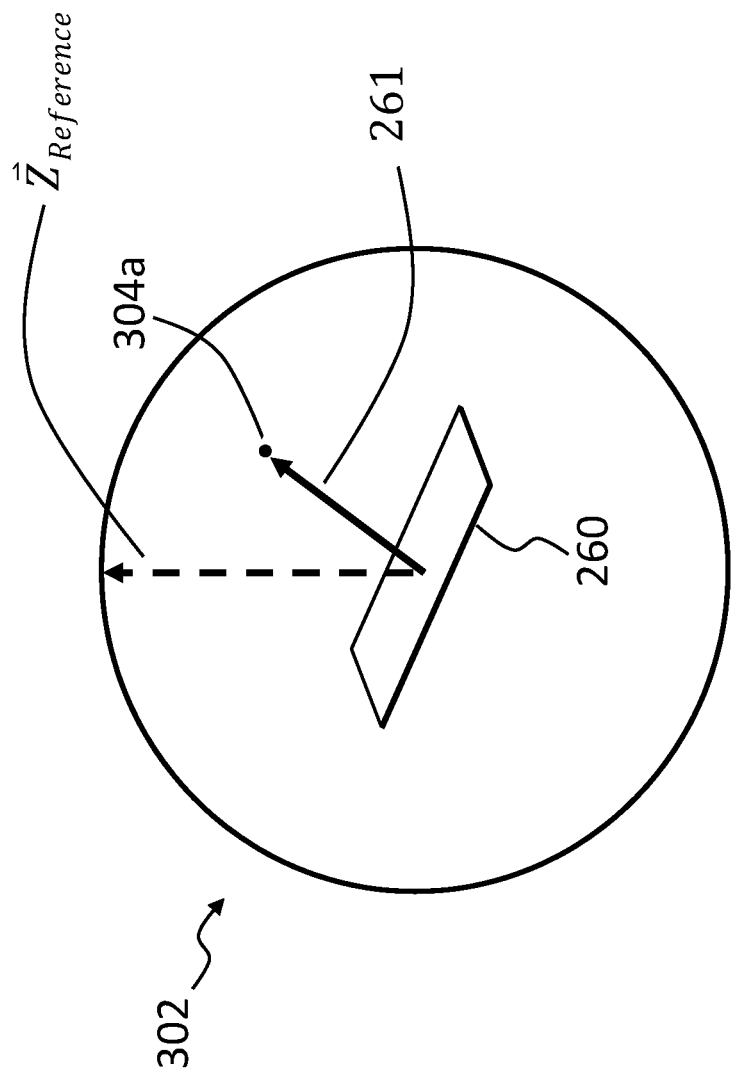

For example, FIG. 7A depicts an example that represents pattern orientations that each result from individually generating a random pose angle value for a based on a uniform probability density distribution (PDF), and generating a random pose angle value for β based on the uniform PDF. In some cases, a random pose angle value for θ may also be individually generated according to the uniform PDF. More specifically, FIG. 7A depicts an imaginary sphere 302 that may represent possible pattern orientations for the calibration pattern 160/260. A surface of the imaginary sphere may represent possible directions at which the normal vector 261 of the calibration pattern 160/260 can be pointed. More specifically, the surface of the imaginary sphere 302 may be or may represent a loci of all directions to which the normal vector 261 of the calibration pattern 260 can be pointed. If the normal vector 261 has an assigned length (e.g., 10 cm), then the imaginary sphere 302 may have a radius equal to the assigned length. An example of the normal vector 261 is depicted in FIG. 7B, and may be a vector that is orthogonal to the calibration pattern 260. In an embodiment, the normal vector 261 may have one endpoint that is on the calibration pattern 260. For instance, the endpoint may be located at an origin of the pattern coordinate system for the calibration pattern 260. In the example of FIG. 7B, a center of the imaginary sphere 302 may be at that endpoint of the normal vector 261, and a surface of the imaginary sphere 302 may be defined by the other endpoint of the normal vector 261. A specific surface point on the surface of the imaginary sphere 302 may represent a specific pattern orientation of the calibration pattern 260 that would cause the normal vector of the calibration pattern 260 to point to that surface point. For instance, when the calibration pattern 260 has the particular orientation depicted in FIG. 7B, the normal vector 261 points to surface point 304a. Thus, the surface point 304a may represent or otherwise correspond to that pattern orientation. When the calibration pattern 260 changes orientation, the normal vector 261 may point to a different surface point on the imaginary sphere 302, such as surface point 304b or 304c, which are illustrated in FIG. 7A.

As stated above, the example in FIG. 7A may generate a random pose angle value for a based on a uniform probability density distribution (PDF), and generating a random pose angle value for β based on the uniform PDF. The uniform PDF may be configured to randomly output a value that is in a desired range of angle values, wherein each angle value in the range has an equal likelihood of being outputted. In the example of FIG. 7A, the desired range may be from −180 degrees to 180 degrees. The desired range of angle values may correspond with a desired range of pattern orientations. For FIG. 7A, such a desired range of angle values (−180 degrees to 180 degrees) may correspond to all possible pattern orientations for the calibration pattern 260.

Figure 7C:
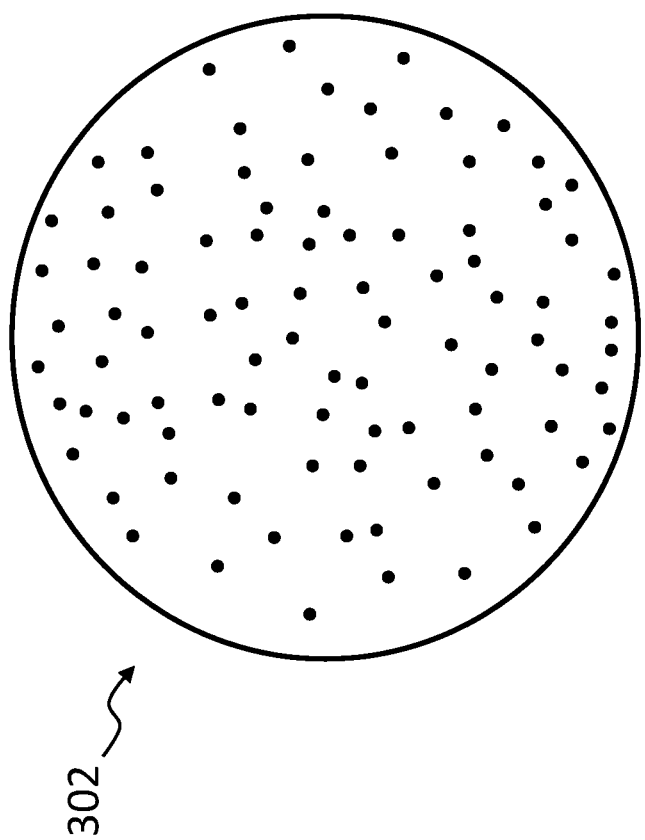

As depicted in FIG. 7A, while a uniform PDF is used to individually determine pose angle values for each of the pose angles α, β, θ, the resulting pattern orientations are not uniformly distributed within a desired range of pattern orientations. More specifically, the desired range of pattern orientations in the example of FIG. 7A may include all possible pattern orientations, and the resulting pattern orientations from determining angle values using the uniform PDF are represented as surface points (e.g., 304a-304d) on a surface of an imaginary sphere 302. The plurality of surface points in FIG. 7A are distributed more densely within certain portions of the surface of the imaginary sphere 302 than within other portions on the surface of the imaginary sphere 302. Thus, the resulting pattern orientations may be more densely distributed toward a certain range or ranges of directions relative to other directions. By contrast, FIG. 7C illustrates a scenario in which pattern orientations have a more uniform distribution, such that surface points representing the pattern orientations also have a more uniform distribution on the surface of the imaginary sphere 302.

Figure 8A:
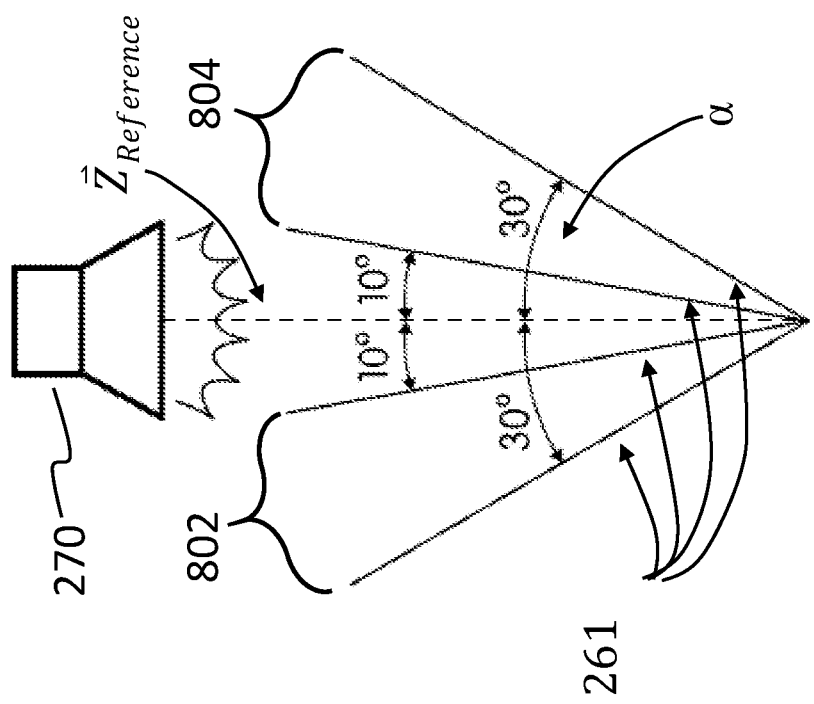
FIG. 8A depicts an example of constraints on pose angle values, according to an embodiment hereof.
Figure 8B:
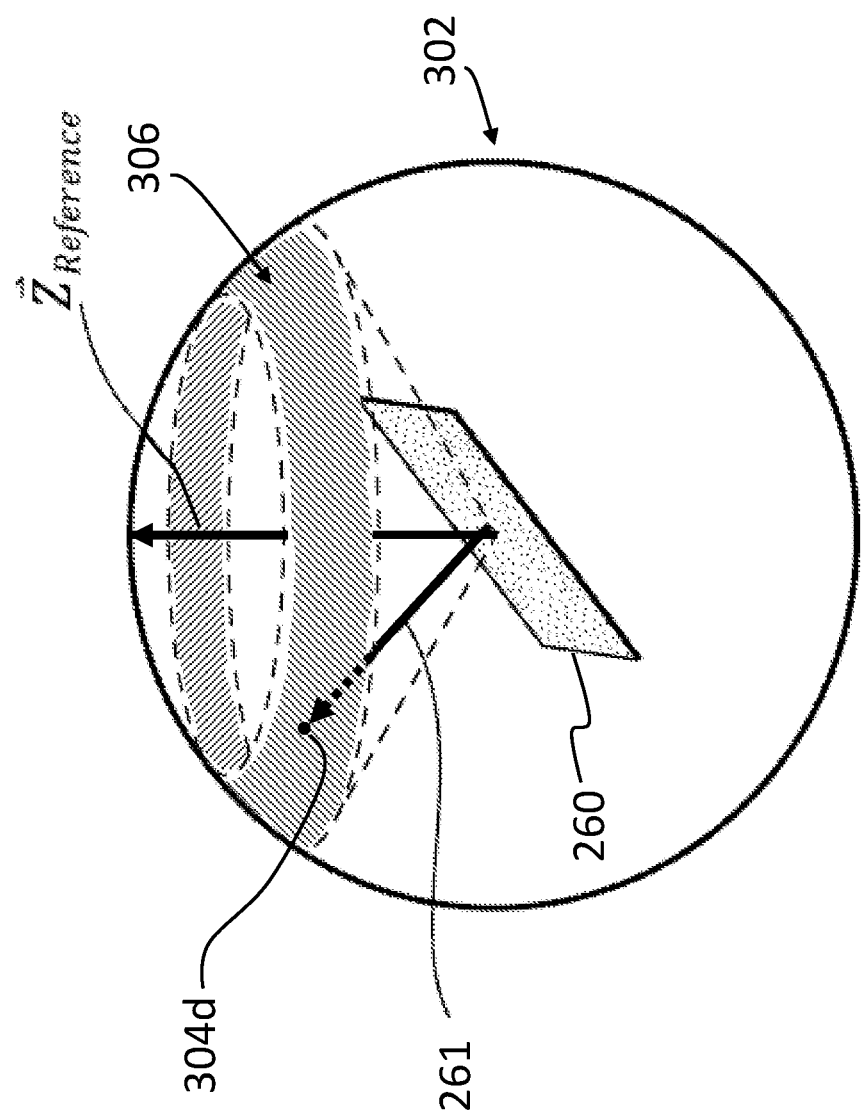
FIGS. 8B and 8C illustrate an imaginary sphere that represent possible orientations of a calibration pattern, a surface region that represents a range of pattern orientations for performing camera calibration, and surface points on the imaginary sphere, according to an embodiment hereof.
Figure 8C:
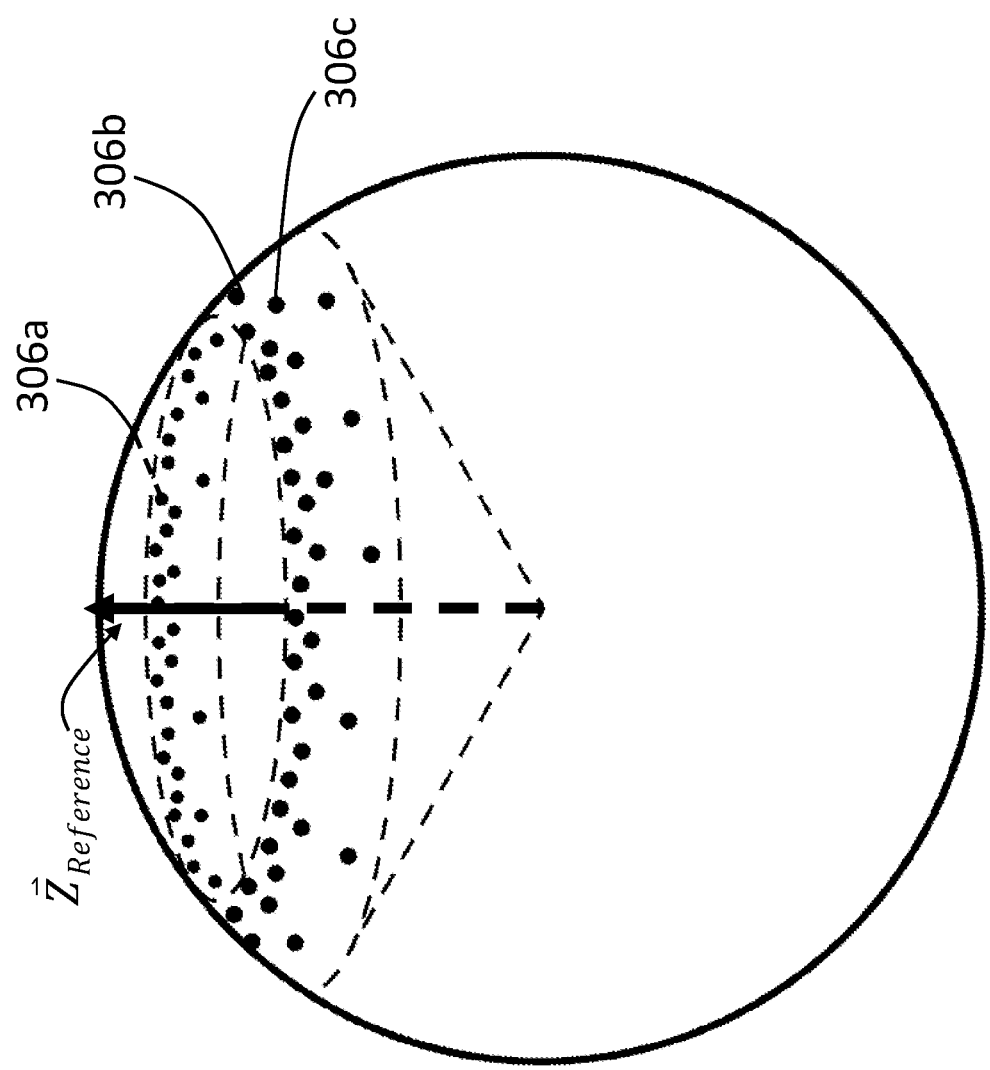

In FIG. 7A, the pattern orientations resulted from a desired range of angle values for α, β, and/or θ that is from −180 degrees to 180 degrees. FIGS. 8A-8C depict a distribution of pattern orientations based on a different desired range of angle values. More specifically, FIG. 8A depict an example in which pattern orientations result from a first desired range 802 (also referred to as the first range 802) of angle values that is from −10 degrees to −30 degrees, and a second desired range 804 (also referred to as the second range 804) of angle values that is from 10 degrees to 30 degrees. A pose angle value for the pose angle α may be constrained to the first range and the second range. The pose angle α may be constrained to the first range 802 and the second range 804 so that the calibration pattern 260 is tilted relative to the camera 270 when a calibration image is acquired, but is not too tilted. In some cases, the desired range or ranges of angles for one or more of α, β, θ may be one or more user-defined ranges.

In an embodiment, the desired range of angle values may apply to multiple pose angles, such as to α and β. In such an embodiment, the pose angle β would also be constrained to the first range 802 and the second range 804 discussed above. In an embodiment, a region on the surface of the imaginary sphere (which may also be referred to as a surface region) may represent a range or ranges of pattern orientations resulting from the desired ranges 802/804 of angle values. For instance, FIG. 8B illustrates a surface region 306 of the imaginary sphere 302. The surface region 306 may contain surface points that represent the desired range of pattern orientations. For instance, the pattern orientation of the pattern 260 in the example depicted in FIG. 8B may be represented by the surface point 304d. In an embodiment, the surface region 306 may form a circular or elliptical band on the surface of the imaginary sphere 302. In an embodiment, the circular or elliptical band may have uniform width.

In the example of FIG. 7A, a pose angle value for each of α and β may be determined based on a uniform probability distribution that randomly selects an angle value in a desired range of angle values of −180 degrees to 180 degrees. FIG. 8B depicts an example in which the pose angle value of α and β is determined in a similar way, but the desired range of angle values is the first range 802 and the second range 804 of FIG. 8A, namely −10 degrees to −30 degrees, and 10 degrees to 30 degrees. The pose angles α and β may be constrained to the first range 802 and the second range 804, which may result in a desired range of pattern orientations represented by the surface region 306. Determining α and βθ in this way, however, also results in a distribution of pattern orientations within the desired range of pattern orientations that is not generally uniform, or that more generally does not have a desired distribution. More specifically, FIG. 8C depicts a plurality of surface points, such as surface points 306a-306c, that represent a distribution of pattern orientations resulting from determining pose angle values with the above technique. As the figure illustrates, the plurality of surface points are not distributed uniformly within the surface region 306, but rather are concentrated near a top of the surface region 306. This distribution of surface points may indicate that the resulting pattern orientations may be more concentrated around directions that have closer alignment with $\vec{Z}_{Reference}$, and that tend to exhibit less tilt relative to the camera 170/270.

Figure 9:
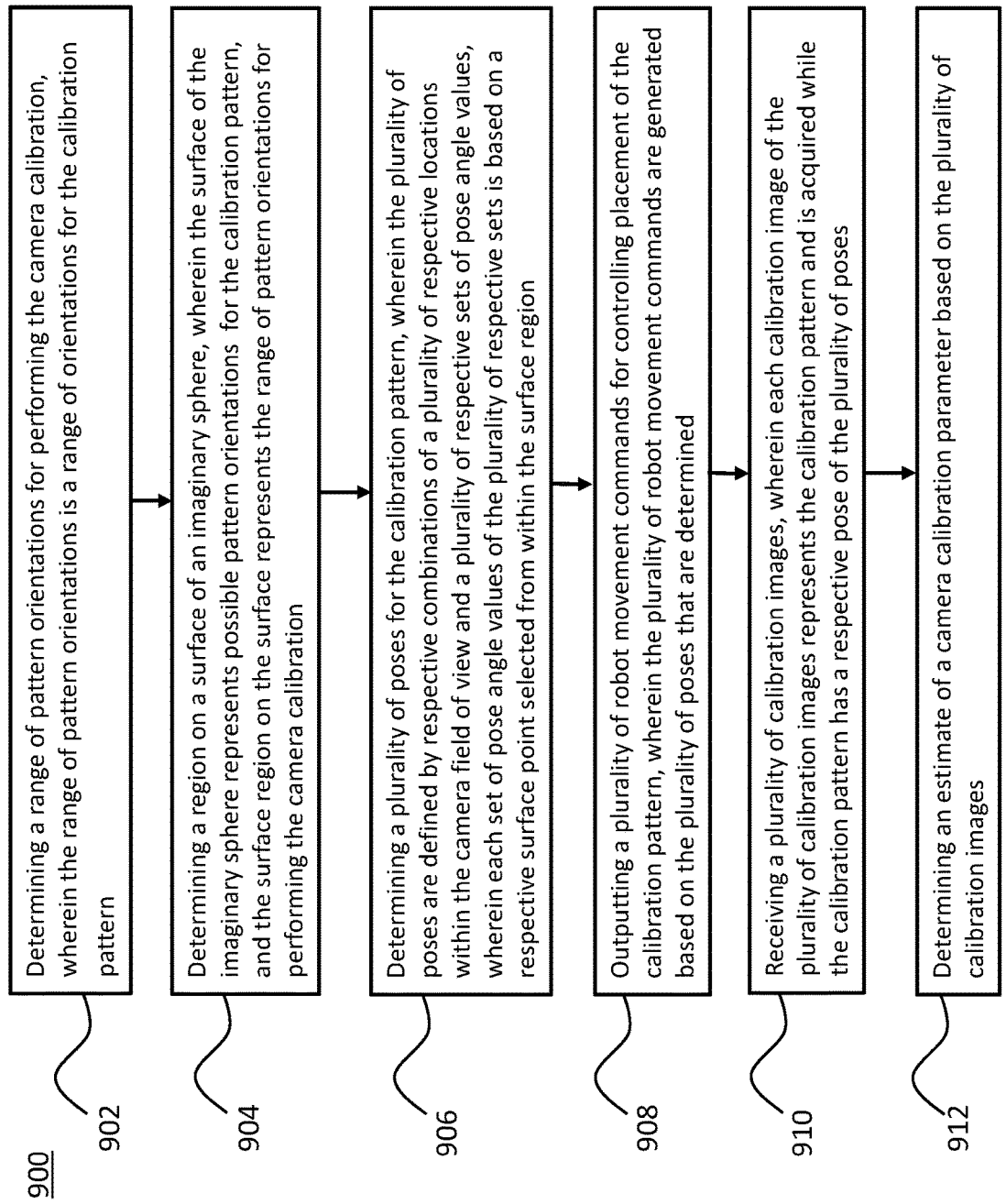
FIG. 9 depicts a flow diagram of an example method for determining poses for performing camera calibration, according to an embodiment hereof.

As stated above, one aspect of the embodiments herein relate to determining a plurality of poses that have pattern orientations which are distributed in a desired manner, such as a generally uniform manner within a desired range of pattern orientations for the calibration pattern 160/260. For instance, FIG. 9 depicts a method 900 for determining a plurality of poses that may have pattern orientations which are distributed in a desired manner. The method 900 may be performed by the control circuit 111 of the computing system 110, as part of performing camera calibration. The camera calibration can be used to, e.g., determine estimates for intrinsic camera parameters for the camera 170, and/or determine a spatial relationship between the camera 170 and its environment, such as a location and orientation of the camera 170 relative to the robot 150.

In an embodiment, the method 900 may include a step 902, in which the control circuit 111 determines a range of pattern orientations, which may be a range of pattern orientations of the calibration pattern 160/260 of FIG. 1/3A for performing camera calibration. In some instances, the range of pattern orientations may be a desired range of pattern orientations. In some instances, the range of pattern orientations may include only some of the possible pattern orientations that can be adopted by the calibration pattern 160/260, and exclude other possible pattern orientations. The excluded pattern orientations may, e.g., provide calibration images that are not optimal for performing camera calibration. For instance, a pattern orientation that exhibits no tilt relative to the camera 170/270 of FIG. 1/3A may yield a calibration image which exhibits no perspective effect and/or no lens distortion effect, which may have only limited value for determining an estimate of a lens distortion parameter or other camera calibration parameter. Such a pattern orientation may correspond to a pose angle value of zero degrees for both the pose angle of α and β. Some other pattern orientations may be excluded because they cause pattern elements or other features on the calibration pattern 160/260 to face away too much from the camera 170/270, such that photographing the calibration pattern 160/260 at those poses may yield calibration images that fail to clearly capture the pattern elements.

In an embodiment, determining the range of pattern orientations in step 902 may involve determining one or more ranges of angle values for at least one pose angle, such as the pose angles α, β, or θ discussed above. The range that is determined for the pose angle may constrain which pose angle values can be determined for that pose angle. In one example, the one or more ranges may be the first range 802 and the second range 804 depicted in FIG. 8A. More specifically, determining the range of pattern orientations in such an example may involve determining that both the pose angle α and the pose angle β are constrained to two ranges, namely the first range 802 that is between −10 degrees and −30 degrees, and the second range 804 that is between 10 degrees and 30 degrees. In some instances, the one or more ranges may exclude pose angle values that are too small in magnitude (i.e., in absolute value) and may further exclude pose angle values that are too large in magnitude. The pose angle values that are too small in magnitude may cause the calibration pattern 160/260 to exhibit no tilt or too little tilt relative to the camera 170/270, which may lead to calibration images that are not optimal for accurately estimating camera parameter values. The pose angle values that are too large in magnitude may cause the calibration pattern 160/260 to be too tilted relative to the camera 170/270, to a pattern orientation at which various pattern elements or other features on the calibration pattern 160/260 are not captured in a resulting calibration image, or appear too warped in the resulting calibration image.

In some cases, the range of pattern orientations for step 902 may be based on user-defined values. For instance, determining the range of pattern orientations may involve the control circuit 111 of FIG. 2 accessing a user-defined range or ranges of pose angle values from the non-transitory computer-readable medium 115. More specifically, the control circuit 111 may retrieve, or more generally receive, the user-defined range from the non-transitory computer-readable medium 115.

In an embodiment, method 900 includes step 904, in which the control circuit 111 of FIG. 2 determines a surface region on a surface of an imaginary sphere. As an example, the imaginary sphere may be the imaginary sphere 302 of FIGS. 7A-7C, 8B, 8C, and also of FIGS. 10A and 10B. The imaginary sphere (e.g. imaginary sphere 302) may represent possible pattern orientations for the calibration pattern 160/260. In a more specific example, the imaginary sphere may represent all possible pattern orientations for the calibration pattern 160/260. For instance, a surface of the imaginary sphere may be a loci of all points to which a normal vector (e.g., 261) of the calibration pattern 160/260 can point, and may correspond to all directions to which the normal vector can point. If the normal vector is assigned a defined length of, e.g., 10 cm, then the imaginary sphere may be a sphere having a radius of 10 cm. In an embodiment, surface points which are outside of the surface region are not used to determine pose angle values. In other words, the control circuit 111 may ignore surface points which are outside of the surface region for purposes of determining pose angle values and determining poses.

In an embodiment, the surface region (e.g. 306) on the surface of the imaginary sphere (e.g., 302) represents the range of pattern orientations for performing the camera calibration (e.g., the desired range of pattern orientations for performing camera calibration). For instance, the surface region may be the surface region 306 of FIGS. 10A and 8C. In some cases, the surface region may be a loci of points that the normal vector of the calibration pattern 160/260 can point to while staying within the desired range of pattern orientations. As an example, if the range of pattern orientations is based on one or more ranges of pose angle values for at least one pose angle (e.g., α and β), the surface region (e.g., 306) may be a loci of points to which the normal vector (e.g., normal vector 261) can point to while staying within the one or more ranges of pose angle values for the at least one pose angle. In some cases, the surface region, such as the surface region 306 of FIGS. 10A and 8C, may form a circular band (also referred to as a circular strip), on the surface of the imaginary sphere. The circular band may have uniform width, or may have varying width.

In an embodiment, the method 900 includes a step 906, in which the control circuit 111 determines a plurality of poses for the calibration pattern 160/260. In some instances, the plurality of poses may be poses at which the calibration pattern 160/260 is photographed or otherwise imaged to generate calibration images, and may be referred to as image-captured poses or imaged poses. The plurality of poses may be defined by respective combinations of a plurality of respective locations within the camera field of view and a plurality of respective sets of pose angle values. For example, the plurality of respective locations may be locations within the camera field of view 272 of FIGS. 3A, 3B, and 4B. In this example, each of the respective sets of pose angle values may be respective pose angle values for α and β, or respective pose angle values for α, β, and θ. In such an example, a particular pose may be defined by a location within the camera field of view 272, a pose angle value for α, a pose angle value for β, and a pose angle value for θ. In some cases, the pose angles used to define a pose may be angles that affect how much the calibration pattern 160/260 is tilted relative to the camera 170/270. Such angles may include the pose angles α and β. If, for instance, the pose angle θ does not affect the relative tilt of the calibration pattern 160/260, then the pose of the calibration pattern 160/260 may be defined by only the pose angles α and θ and a location within the camera field of view 272.

In an embodiment, each set of pose angle values of the plurality of sets of pose angle values in step 906 may be determined based on a respective surface point selected from within the surface region on the surface of the imaginary sphere. For instance, the set of pose angle values may include three angle values for the pose angles α, β, and θ, respectively, or include two angle values for the pose angles α and β, respectively. In this example, some or all of the pose angle values in the set of pose angle values may be based on a respective surface point, such as one of surface points 308a-308i in FIG. 10A, selected from within the surface region 306 on the surface of the imaginary sphere 302 in the figure. The surface point (e.g., surface point 308a) may represent a direction at which the normal vector 261 of the calibration pattern 160/260 is pointed. The determination of the pose angle values is discussed below in more detail.

In an embodiment, determining poses for the calibration pattern 160/260 by selecting surface points on an imaginary sphere that represents possible pattern orientations for the calibration pattern 160/260, and then determining pose angle values for at least one pose angle based on the selected surface points may better allow the resulting pattern orientations to achieve a desired distribution. For instance, the surface points on which the respective set of pose angle values are based may be randomly selected from within the surface region according to a uniform probability distribution, or some other probability distribution (e.g., a Gaussian distribution). Using a uniform probability distribution to select the surface points may ensure that the selected surface points are likely to have a uniform distribution within the surface region. In such an example, because the surface points which are selected are likely to have a uniform distribution within the surface region, the pose angle values which are determined based on the selected surface points are also likely to yield resulting pattern orientations that have a uniform distribution or some other desired distribution.

Figure 10A:
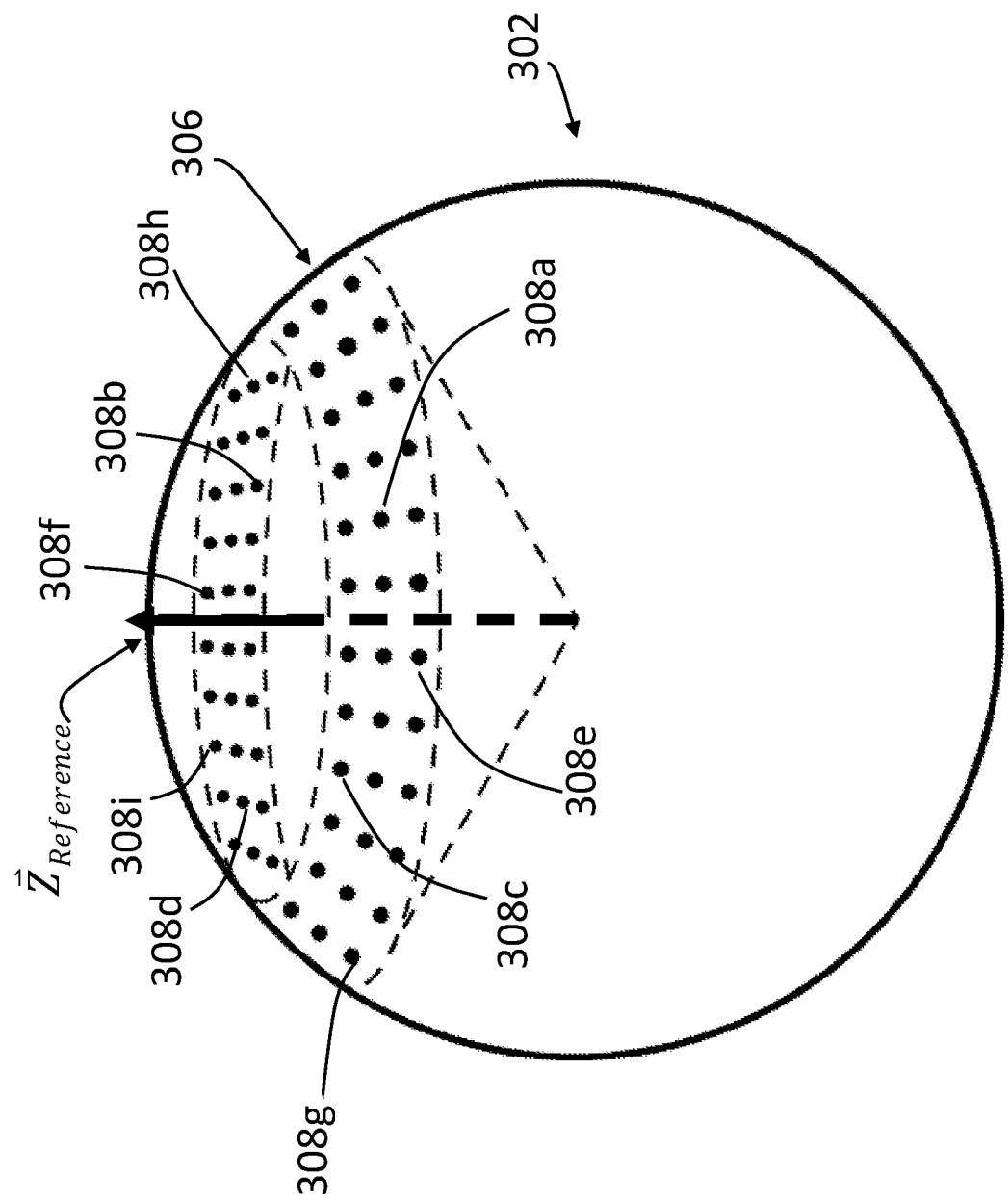
FIGS. 10A and 10B depict surface that points that are uniformly distributed within a surface region of an imaginary sphere that represents pattern orientations, according to an embodiment hereof.

FIG. 10A depicts an example of a plurality of surface points 308a-308i that are selected from within the surface region 306 of the imaginary sphere 302, and which have a substantially uniform distribution within the surface region 306. More specifically, the surface region 306 may form a circular band, and the surface points 308a-308i are distributed in a substantially uniform manner around the circular band, and along a width of the circular band. As stated above, using the surface points 308a-308i to determine the pose angle values for at least one pose angle may yield pattern orientations that have a substantially uniform distribution.

Figure 10B:
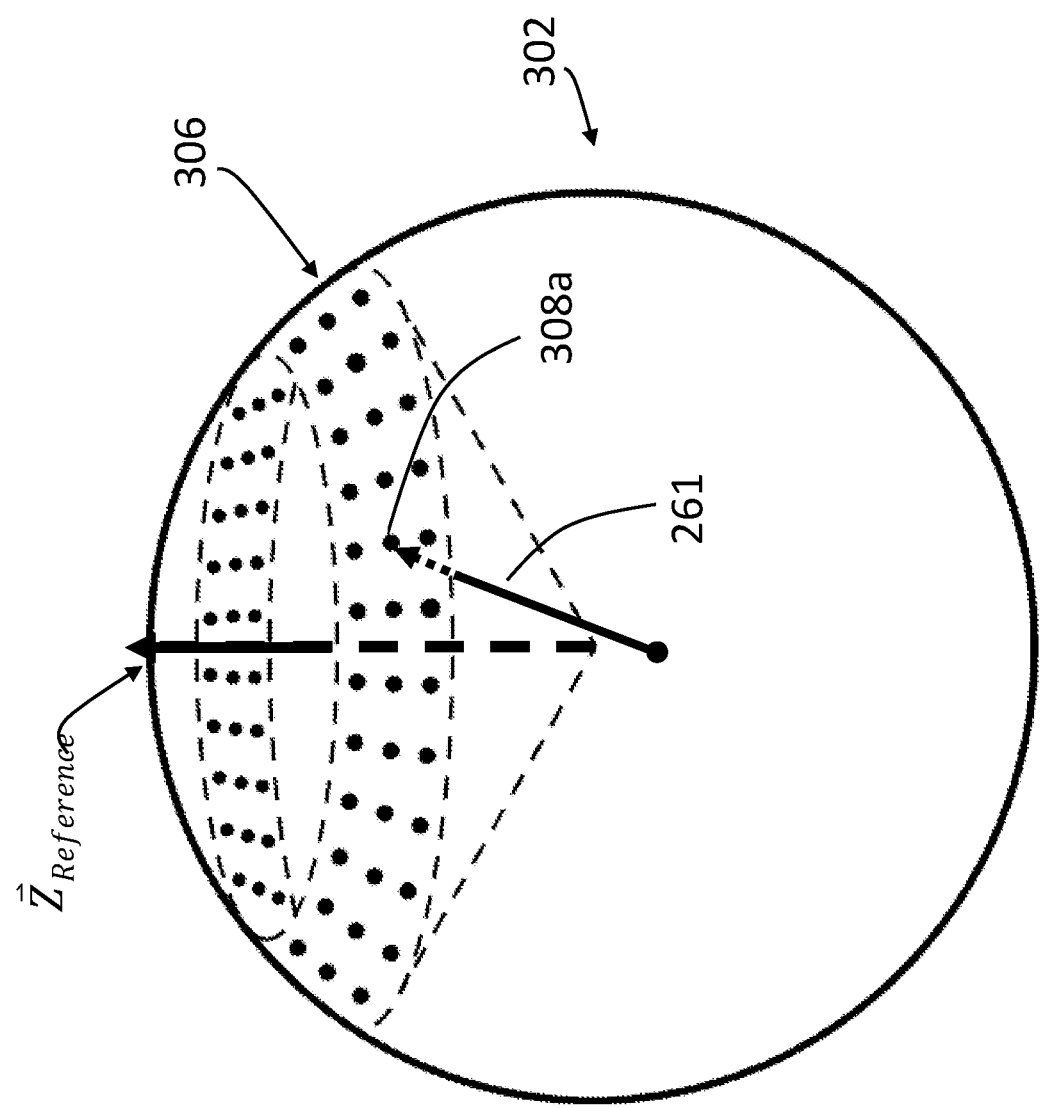

In an embodiment, the control circuit 111 may be configured, for respective surface points (e.g., 308a-308i) on which the respective sets of pose angle values are based, to randomly select each of the respective surface points from within the surface region, such as the surface region 306 in FIGS. 10A and 10B, according to a uniform probability distribution. In some cases, the random selection may rely on a pseudorandom function, such as rand( ). In some cases, the surface region may be defined in terms of a range of polar coordinates, and each surface point of the respective surface points may be selected by randomly selecting a polar coordinate from among the range of polar coordinates. The random selection may be performed according to a uniform probability distribution such that each polar coordinate in the range of polar coordinates is equally likely to be selected. In some cases, the control circuit 111 may be configured, for the respective surface points on which the respective sets of pose angle values are based, to randomly select each of the respective surface points from among only a uniform set of surface points. The uniform set of surface points may be a set of surface points that are uniformly distributed within the surface region on the surface of the imaginary sphere. For example, FIGS. 10A and 10B depict a uniform set of surface points. In such an example, the plurality of surface points 308a-308i may be surface points that are randomly selected from among the uniform set of surface points. The random selection may be performed according to a uniform probability distribution in which each of the uniform set of surface points is equally likely to be selected. By performing the selection in this manner, the surface points which are selected (e.g., 308a-308i) may tend to have a generally uniform distribution within the surface region 306.

As stated above, in some instances a surface point on the surface of the imaginary sphere (e.g., 302) may represent a respective orientation for the calibration pattern 160/260 that would cause a normal vector (e.g., 261) for the calibration pattern to point to or otherwise be directed toward the surface point. For example, FIG. 10B illustrates the surface point 308a that represents a respective orientation for the calibration pattern 160/260 that would cause the normal vector 261 to point to that surface point 308a. In such instances, determining a pose angle value based on the surface point may involve applying an arctangent to respective coordinates for the surface point 308a. In this example, the respective coordinates for the surface point 308a may also be referred to as coordinates of the normal vector 261. For instance, if the surface point 308a has a Cartesian coordinate of $[x, y, z]^T$ (in the camera coordinate system, or some other coordinate system), an angle value for one of the pose angles (e.g., $\alpha$) may be equal to or based on $\arctan(y/z)$. In some implementations, the angle values may be determined based on solving for one or more rotation matrices which would transform the normal vector from pointing in an initial direction (e.g., pointing along a camera optical axis, toward a coordinate $[0\ 0\ 10\ \text{cm}]^T$) to pointing in a direction toward the surface point 308a (e.g., toward the coordinate $[x\ y\ z]^T$). In one example, solving for the rotation matrices may involve solving the equation $[x\ y\ z]^T = R_\alpha R_\beta R_\theta [0\ 0\ 10\ \text{cm}]^T$, wherein $R_\alpha$, $R_\beta$, and $R_\theta$ are the respective rotation matrices representing rotation of the calibration pattern 160/260 with the pose angles $\alpha$, $\beta$, and $\theta$ in the manner described above with respect to FIGS. 5A-5C and 6A-6C. In some implementations, if the surface point 308a has coordinates which are polar coordinates expressed in a polar coordinate system, the pose angle values for some of the pose angles may be based on, or more specifically equal to, components of the polar coordinates.

As stated above, in an embodiment the plurality of poses that are determined in step 906 may be the poses at which the calibration pattern 160/260 is photographed or otherwise imaged by the camera 170/270 to generate the calibration images for performing camera calibration. Thus, the plurality of poses determined in step 906 may also be referred to as image-captured poses. In some implementations, determining the plurality of poses in step 906 may involve determining a set of candidate poses, determining which of the candidate poses are robot-achievable candidate poses, and selecting the plurality of poses (which are the image-captured poses) from among the robot-achievable candidate poses.

In an embodiment, a candidate pose may be a pose that the control circuit 111 has determined, but has not yet evaluated whether the pose can be achieved by the robot 150/250, as discussed below in more detail. In some cases, the candidate pose may be a pose for which the control circuit 111 has determined a location and a set of pose angle values. For example, each candidate pose of the set of candidate poses may be determined by: determining a respective location within the camera field of view for the candidate pose and determining a respective set of pose angle values for the candidate pose. The respective location may be determined, for instance, to result in robot-achievable candidate poses that are spread out in space, as discussed below in more detail. In some cases, determining the respective location may rely on a function that generates a random or pseudo-random value (e.g., a rand( ) function) for some or all components of a coordinate for the respective location. In an embodiment, the respective set of pose angle values may be determined by, e.g., selecting a respective surface point from within the surface region (e.g., 306) on the surface of the imaginary sphere (e.g., 302), and determining the respective set of pose angle values for the candidate pose based on the respective surface point, as discussed above. In another embodiment, the respective set of pose angle values may be determined in a different manner.

In an embodiment, the control circuit 111 may be configured to determine, from the set of candidate poses, a set of robot-achievable candidate poses. A robot-achievable candidate pose may be a candidate pose for the calibration pattern 160/260 that can be can be achieved by the robot 150/250. More specifically, the robot 150/250 may in some scenarios be unable to achieve some candidate poses. For example, a particular candidate pose may have a set of the pose angle values that the robot 150/250 is unable to fulfill because the robot 150/250 is unable to tilt the calibration pattern in a manner indicated by that set of the pose angle values. Additionally, the candidate pose for the calibration pattern may involve not only the set of pose angle values at which to place the calibration pattern 160/260, but also a location within the camera field of view (e.g., 272) at which to place the calibration pattern 160/260. In some instances, the robot 150/250 may be unable to place the calibration pattern 160/260 to the determined location. In some instances, the robot 150/250 may be able to fulfill either the set of pose angle values or the location of the candidate pose, but may be unable to fulfill a combination of both the set of pose angles and the location of the candidate pose, because of constraints on the movement of the robot 150/250. For example, movement of the robot 150/250 may be constrained by obstacles, which may prevent the robot 150/250 from moving the calibration pattern 160/260 to certain location in the camera field of view (e.g., 272). In some instances, a mechanical configuration of the robot 150/250 may constrain its freedom of movement. As an example, the robot 250 of FIGS. 3A and 3B may have a mechanical configuration in which various links 254A-254E of a robot arm are connected to each other, and have limited degrees of freedom relative to each other. Such a mechanical configuration may prevent the robot 250 from achieving certain combinations of location and orientation for the link 254E, to which the calibration pattern 260 is attached. Thus, the mechanical configuration of the robot 250 may prevent the robot 250 from achieving certain combinations of location and pattern orientation of the calibration pattern 260. In other words, the mechanical configuration of the robot 250 may prevent the robot 250 from achieving certain poses for the calibration pattern 260.

Thus, in an embodiment, the control circuit 111 in step 906 may determine, for each candidate pose of the set of candidate poses, whether the candidate pose is robot-achievable (i.e., whether the candidate pose is able to be achieved by the robot 150/250). The control circuit 111 may, in response to a determination that the candidate pose is robot-achievable, add the candidate pose to the set of candidate poses. The control circuit 111 further may, in response to a determination that the candidate pose is not robot-achievable, exclude the candidate pose from the set of robot-achievable candidate poses, or more generally ignore the candidate pose for purposes of performing camera calibration.

In some cases, the control circuit 111 may determine whether a particular candidate pose is robot-achievable by controlling the robot 150/250 to actually attempt to move the calibration pattern 160/260 to achieve the candidate pose, and determining whether the robot 150/250 is able to achieve the candidate pose within a defined amount of time. In some cases, the control circuit 111 may determine whether an inverse kinematics function is able output a movement command for the candidate pose. The inverse kinematics function may be a function that is designed to calculate a movement command, such as one or more motor commands, for the robot 150/250 to accomplish a particular pose. If the inverse kinematics function is able to output a movement command for the particular candidate pose, the control circuit 111 may determine that the candidate pose is a robot-achievable candidate pose. If the function is unable to output a movement command for the particular candidate pose, the control circuit 111 may determine that the candidate pose is not a robot-achievable candidate pose.

As stated above, in an embodiment the control circuit 111 in step 906 may further select the plurality of poses (which are or will be the image-captured poses) from among only the set of robot-achievable candidate poses. In some cases, the selection may involve selecting a target number of robot-achievable candidate poses as the plurality of poses. The target number may be, e.g., a user-defined value or may be determined based on some noise level, an amount of time allotted to perform camera calibration, or some other factor. For example, the set of robot-achievable candidate poses may include at least nine robot-achievable candidate poses, and the target number may be eight. In such an example, the control circuit 111 in step 906 may select, as the plurality of poses, eight robot-achievable candidate poses from among the set of nine robot-achievable candidate poses. In another example, the set of robot-achievable candidate poses may include at least 64 candidate poses, and the target number may be 15. In such an example, the control circuit 111 may select, as the plurality of poses, 15 robot-achievable candidate poses from among the set of 64 robot-achievable candidate poses. In some implementations, the control circuit 111 may perform the selection randomly. For instance, the control circuit 111 may randomly select the 15 robot-achievable candidate poses from among the set of 64 robot-achievable candidate poses according to a uniform probability distribution in which each of the robot-achievable candidate poses are equally likely to be selected. The random selection may, in some implementations, rely on a pseudorandom function.

As stated above, the control circuit 111 may in an embodiment to determine a respective set of pose angle values (e.g., for respective pose angles $\alpha$, $\beta$, $\theta$) for each of the set of candidate poses based on a surface point selected from within a surface region (e.g., 306) on a surface of an imaginary sphere (e.g., 302). Because the plurality of poses determined in step 906 (which are or will be the image-captured poses) are ultimately selected from the set of candidate poses, each of the plurality of poses may be considered to have a set of pose angle values that are also determined based on a respective surface point selected from within the surface region on the surface of the imaginary sphere.

In an embodiment, the control circuit 111 may determine respective locations for candidate poses in a random manner. For instance, the control circuit 111 may randomly select a location that is within the camera field of view (e.g., 272), and determine a set of pose angle values based on a surface point selected from within a surface region of an imaginary sphere (in the manner described above), and evaluate whether a candidate pose having the determined location and set of pose angle values is a robot-achievable candidate pose. In some cases, the set of pose angle values may be determined in some other manner that does not rely on determining surface points. In an embodiment, the control circuit 111 may determine locations for candidate poses in a manner such that the candidate poses are spread out within the camera field of view. More specifically, the control circuit 111 may determine locations for candidate poses such that those candidate poses result in robot-achievable candidate poses that are spread out within the camera field of view. Because the plurality of poses determined in step 906 may be selected from the robot-achievable candidate poses, the plurality of poses may then also be spread out within the camera field of view.

In an embodiment, to attempt to spread out the candidate poses, robot-achievable candidate poses, and/or the image-captured poses, the control circuit 111 may determine a grid of 3D regions that divide a space within the camera field of view (e.g., 272), and determine locations for the candidate poses such that they are spread out in the grid, and/or such that the robot-achievable candidate poses are spread out in the grid. In an embodiment, the grid of 3D regions may divide a space within the camera field of view into one or more layers that each has multiple rows of 3D regions and multiple columns of 3D regions.

Figure 11A:
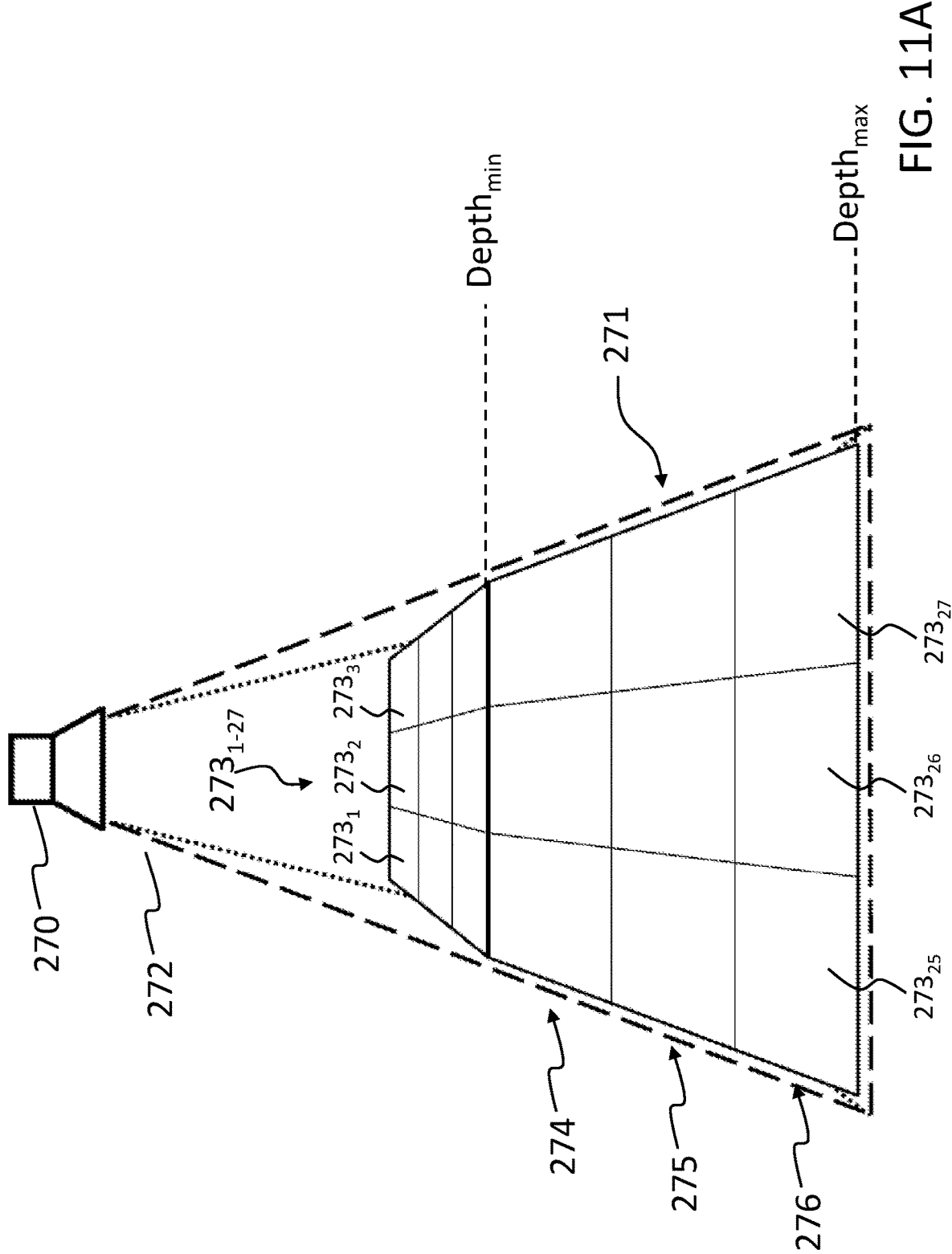
FIGS. 11A and 11B depict an example grid that divides a space in a camera field of view, according to embodiments hereof.

In an embodiment, the space within the camera field of view may be a space in which the calibration pattern 160/260 is moved by the robot 150/250 and photographed by the camera 270 to perform camera calibration. The space may be large enough to include all locations within the camera field of view (e.g., 272) to which the robot 150/250 can move the calibration pattern 160/260, or may have a size that leaves out some of those locations from the space. In some cases, the size or boundaries of the space may be based on a range of motion of the robot 150/250. For instance, the boundaries of the space may correspond to the farthest locations that the robot 150/250 (e.g., via a robot arm) is able to place the calibration pattern 160/260 relative to a base (e.g., 252) of the robot, or relative to the camera 170/270, or relative to some other location. In some instances, the boundaries of the space may be defined by a first depth value and a second depth value. For instance, FIG. 11A depicts a space 271 within the camera field of view 272 of the camera 270. In this example, the space 271 may enclose all locations (and only those locations) that are within the camera field of view 272 and that are between a first depth value $Depth_{min}$ and a second depth value $Depth_{max}$, wherein both depth values are relative to the camera 270. In some cases, the first depth value and the second depth value may be user-defined values, which are stored in the non-transitory computer-readable medium 115 of FIG. 2 or in some other device, and are accessible to the control circuit 111. In some cases, the control circuit 111 may determine the first depth value and the second depth value based on the range of motion of the robot 150/250. In an embodiment, the space 271 may form or may enclose a frustum of a pyramid or a cone. The pyramid or cone may define the camera field of view. For instance, the field of view 272 in FIG. 11A is defined by a pyramid, and the space 271 may form a frustum of the pyramid.

As stated above, the grid of 3D regions may divide the space within the camera field of view into one or more layers that each has multiple rows of 3D regions and multiple columns of 3D regions. For instance, the FIG. 11A depicts a grid of twenty-seven 3D regions $273_{1-27}$ (i.e., 3D region $273_1$, $273_2$, $273_3$, . . . $273_{25}$, $273_{26}$, $273_{27}$) that divide the space 271 into a first layer 274, a second layer 275, and a third layer 276. The grid illustrated in FIG. 11B may be a 3×3×3 grid. That is, the grid may have three layers (the first layer 274, second layer 275, and third layer 275), and each layer may have three rows of 3D regions and three columns of 3D regions. In other words, each of the layers 274, 275, and 276 may be or may be divided into a 3×3 grid of three columns and three rows. The first layer 274 may contain 3D regions $273_{1-9}$, the second layer 275 may contain 3D regions $273_{10-18}$, and the third layer 276 may contain 3D regions $273_{19-27}$.

Figure 11B:
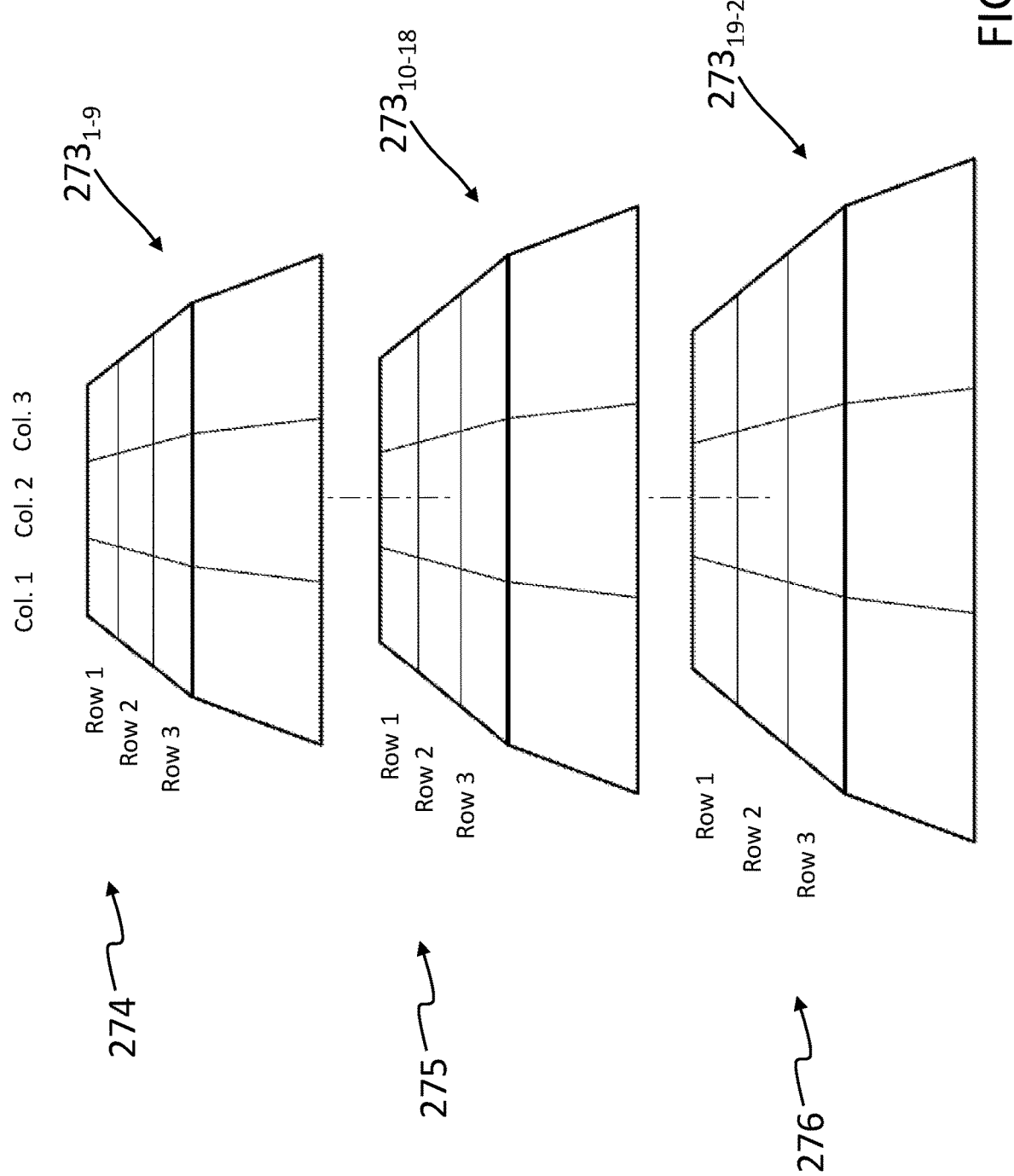

In the example of FIG. 11B, in which the field of view 272 is defined by a pyramid, each 3D region may form or be shaped as a hexahedron. In some cases, the hexahedrons may be cubes. In another example in which a camera field of view is defined by another shape, such as a cone, some or all of the 3D regions may have different shapes. In an embodiment, the 3D regions $273_{1-27}$ collectively may completely occupy all of the space 271, and may be non-overlapping regions. In an embodiment, each of the 3D regions $273_{1-27}$ may be immediately adjacent to other ones of the 3D regions, such that the 3D region shares a boundary with some of the other 3D regions. For instance, as depicted in FIG. 11A, 3D region $273_1$ shares a boundary with two other 3D regions in the first layer 274, and shares a boundary with another 3D region on the second layer 275.

In an embodiment, the control circuit 111 may be configured to determine a target number that indicates how many poses are desired for the plurality of poses in step 906, and may determine a size of the grid based on the target number. The size may indicate how many layers, rows, and/or columns are in the grid, which may affect how many 3D regions are in the grid. In some cases, the control circuit 111 may determine the grid size as a smallest integer that is greater than or equal to a square root of the target number. More specifically, the grid may have one or more layers, and have n rows per layer, and n columns per row. In some situations, the grid may be able to contain at most n robot-achievable candidate poses per layer, such as in examples in which the robot-achievable candidate poses have to satisfy a Latin square spatial distribution, or a stratified spatial distribution, as discussed below in more detail. If the grid further has n layers (i.e., the grid is a n×n×n grid), then the grid may be able to accommodate at most contain at most $n^2$ robot-achievable candidate poses in the above situations. Because the plurality of poses in step 906 may be selected from among the set of robot-achievable candidate poses, the $n^2$ robot-achievable candidate poses need to be greater in quantity than the target number, which indicates how many poses are to be determined for the plurality of poses in step 906. Thus, the control circuit 111 may be configured to determine, as the size of the grid, a value of n as a smallest integer which is greater than or equal to a square root of the target number of poses. Such a value for n may ensure that the number of robot-achievable candidate poses in the above situation, which is equal to $n^2$, is greater than the target number determined for step 906. The size n that is determined may indicate how many rows are in the grid, how many columns are in the grid, how many layers in the grid, any combination thereof, or may indicate some other information.

As stated above, the control circuit 111 may determine respective locations for candidate poses such that the candidate poses, or more specifically a subset of the candidate poses that are robot-achievable candidate poses, are spread out within the grid of 3D regions. Because the plurality of poses determined in step 906 (which may be referred to as image-captured poses) are selected from among the robot-achievable candidate poses, the poses determined in step 906 may also be spread out within the grid of 3D regions. In an embodiment, the candidate poses/robot-achievable candidate poses/image-captured poses may be spread out within each layer of the 3D grid. For instance, they may be spread out within the first layer 274 of the grid of FIG. 11B, spread out within the second layer 275 of the grid, and spread out within the third layer 276 of the grid.

In some implementations, as discussed below in more detail, the control circuit 111 may attempt to find candidate poses to fill every 3D region of the grid of 3D regions with exactly one candidate pose that is a robot-achievable candidate pose (or, more generally, to fill every 3D region with an equal number of candidate poses that are also robot-achievable candidate poses). In some implementations, as also discussed below in more detail, the control circuit 111 may determine locations for the candidate poses in an attempt to fill only a subset of 3D regions with candidate poses, or more specifically with candidate poses that are robot-achievable candidate poses. In these implementations, the control circuit 111 may determine the locations such that the robot-achievable candidate poses in a particular layer have a particular spatial distribution, such as a Latin hypercube spatial distribution (also referred to as a Latin square spatial distribution), a stratified spatial distribution, or some other distribution, as discussed below in more detail.

As stated above, in an embodiment the control circuit 111 may determine respective locations for candidate poses in an attempt to fill every 3D region of the grid of 3D regions (e.g., $273_{1-27}$) with an equal number of candidate poses (e.g., with exactly one pose), or more specifically with an equal number of candidate poses that are also robot-achievable candidate poses. In such an embodiment, the robot-achievable candidate poses may thus have a spatial distribution that is generally uniform. In some cases, the plurality of poses determined in step 906 (the image-captured poses) may include all of those robot-achievable candidate poses, or may be a randomly selected subset of all of the robot-achievable candidate poses. However, it may be difficult find, for every 3D region of the grid of 3D regions, a candidate poses that is also a robot-achievable candidate pose. For instance, as discussed above, some 3D regions may have obstacles that impede movement of the robot 150/250 and of the calibration pattern 160/260 into that 3D region. In some instances, each candidate pose may include not only a location that is within a particular 3D region, but also a set of pose angle values. The pose angle values may be determined based on a surface point of an imaginary sphere, as discussed above, or in some other manner. The robot 150/250 may be able to place the calibration pattern 160/260 at that location, but may be unable to also tilt the calibration pattern 160/260 to fulfill the set of pose angle values, and thus may be unable to achieve that candidate pose.

Thus, in some cases, the control circuit 111 may determine respective locations for candidate poses so as to fill only a subset of 3D regions of a grid layer with robot-achievable candidate poses. In some instances, the control circuit 111 may determine these locations to fill only the subset of 3D regions in response to a determination that it is unable to find robot-achievable candidate poses to fill every 3D region of the layer, or more specifically that it is unable to find such robot-achievable candidate poses within a defined amount of time. In some instances, the control circuit 111 may determine the locations to fill only the subset of 3D regions without attempting to find, beforehand, robot-achievable candidate poses to fill every 3D region of the layer.

In an embodiment, the control circuit 111 may determine respective locations for the candidate poses so as to attempt to identify robot-achievable candidate poses with a spatial distribution that is spread out within a layer of the grid. In some cases, the control circuit 111 may determine locations for candidate poses such that they result in robot-achievable candidate poses having a Latin square spatial distribution (also referred to as a Latin hypercube spatial distribution). A Latin square spatial distribution or Latin hypercube spatial distribution for robot-achievable candidate poses may be a spatial distribution in which each row of the multiple rows within the layer includes exactly one robot-achievable candidate pose, and each column of the multiple columns within the layer includes exactly one robot-achievable candidate pose. In a more specific example, if the grid discussed above has one or more layers that each has n rows of 3D regions and n columns of 3D regions, the control circuit 111 may determine a set of robot-achievable candidate poses by determining, for each layer of the one or more layers, a respective subset of n robot-achievable candidate poses based on an initial condition that the n robot-achievable candidate poses have n locations with a first spatial distribution in which each row (of the n rows of the layer) includes only one robot-achievable candidate pose, and each column (of the n columns of the layer) includes only one robot-achievable candidate pose. In some cases, the respective subset of robot-achievable candidate poses may further have n sets of pose angle values that are based on n respective surface points selected from the surface region (e.g., 306) on the surface of the imaginary sphere (e.g., 302).

Figure 12A:
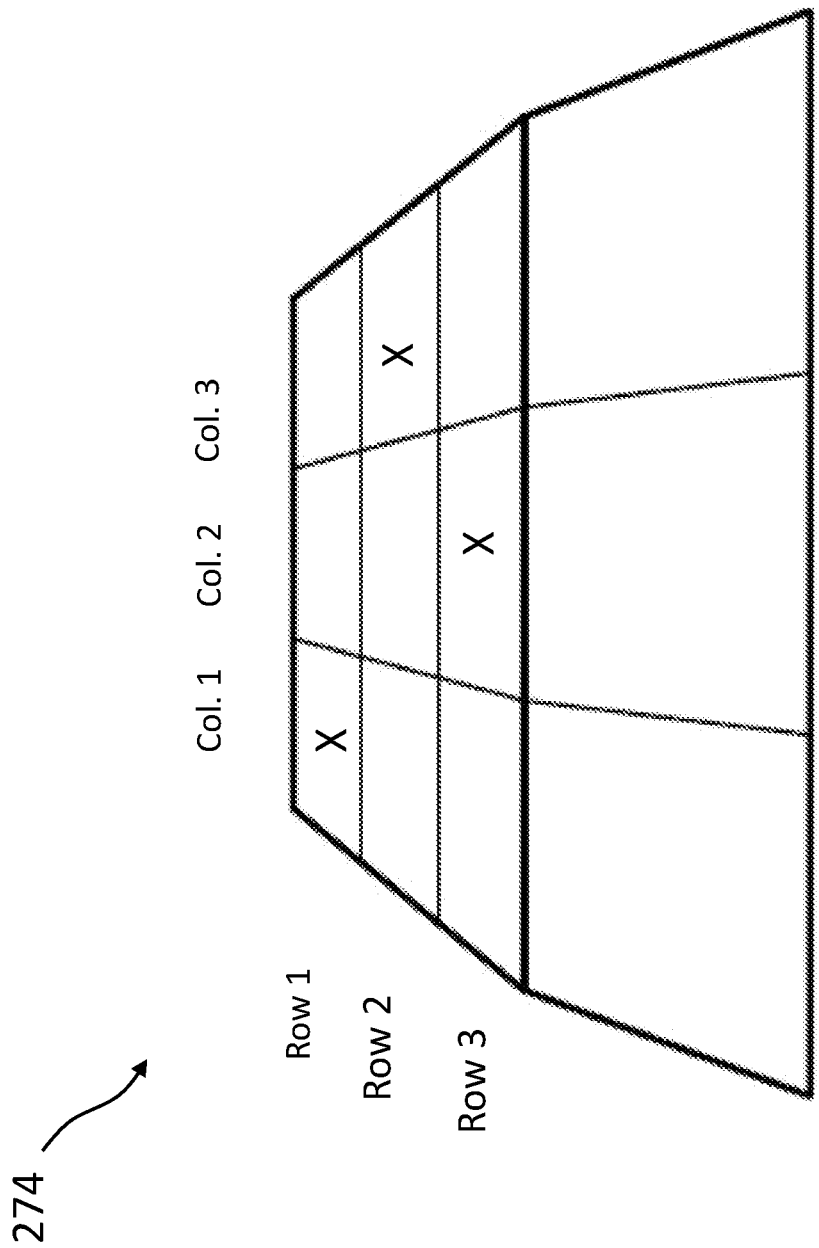
FIGS. 12A-12C illustrate examples of a Latin square spatial distribution for various poses, according to embodiments hereof.

For instance, FIG. 12A depicts an example of a Latin square spatial distribution for three robot-achievable candidate poses in layer 274 of the grid depicted in FIGS. 11A and 11B. In FIG. 12A, the three robot-achievable candidate poses are represented by X's. More specifically, the three robot-achievable candidate poses include a first pose that is at a location which occupies row 1, column 1 (or, more specifically, within a 3D region that occupies row 1, column 1); include a second pose that is at a location which occupies row 3, column 2; and include a third pose which occupies row 2, column 3. In the example of FIG. 12A, each row of the multiple rows of 3D regions within the layer 274 includes exactly one robot-achievable candidate pose, and each column of the multiple columns of 3D regions within the layer 274 includes exactly one robot-achievable candidate pose. This spatial distribution may cause the robot-achievable candidate poses to be spread out within the camera field of view 272.

Figure 12B:
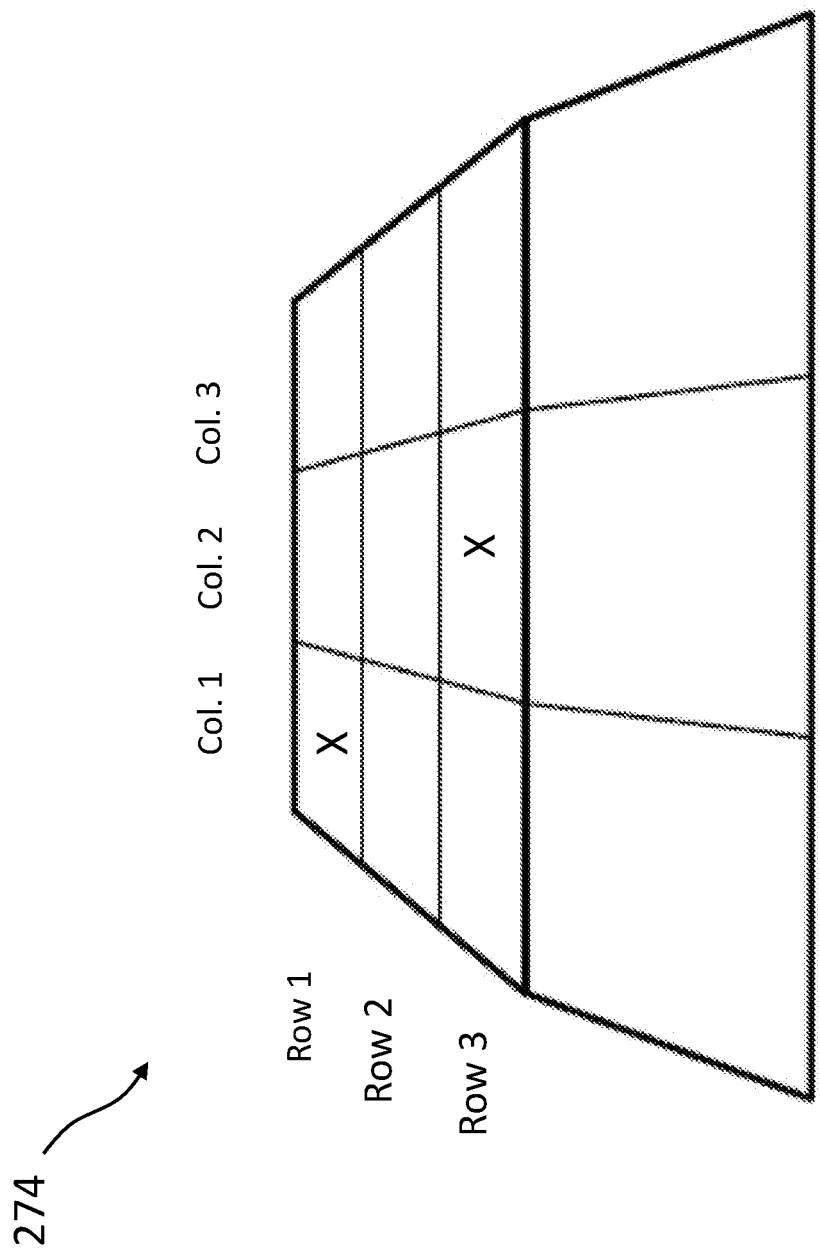

As stated above, the poses that are determined in step 906 (i.e., the image-captured poses) may be selected from the robot-achievable candidate poses. Thus, in an embodiment, if the robot-achievable candidate poses have a Latin square spatial distribution, then the plurality of poses may have a spatial distribution in which each row of the multiple rows within the layer includes no more than one pose of the plurality of poses, and each column of the multiple columns within the layer includes no more than one pose of the plurality of poses. For example, FIG. 12B depicts an example in which the plurality of poses determined in step 906 include the first robot-achievable candidate pose of FIG. 12A (in the 3D region occupying row 1, column 1), and the third robot-achievable candidate pose of FIG. 12A (in the 3D region occupying row 3, column 2). In this example, row 1 and row 3 of the grid includes exactly one pose of the plurality of poses, while row 2 includes no pose of the plurality of poses. Additionally, column 1 and column 2 of the grid includes exactly one pose of the plurality of poses, while column 3 includes no pose of the plurality of poses.

In an embodiment, the control circuit may 111 may attempt to achieve a Latin square spatial distribution by controlling how respective locations are determined for the candidate poses. Generally speaking, when the control circuit 111 is determining a location for a particular candidate pose, it may avoid placing the candidate pose in a 3D region that already contains a previously identified robot-achievable candidate pose, and avoid placing the candidate pose in a 3D region that shares a row or column with a previously identified robot-achievable candidate pose. More specifically, the control circuit 111 may be configured to determine a respective location for each candidate pose of the set of candidate poses to be a location which is in a layer of the one or more layers of the grid and which i) does not share a row with any robot-achievable candidate pose of the set of robot-achievable candidate poses in that layer, and ii) does not share a column with any robot-achievable candidate pose of the set of robot-achievable candidate poses in that layer.

Figure 12C:
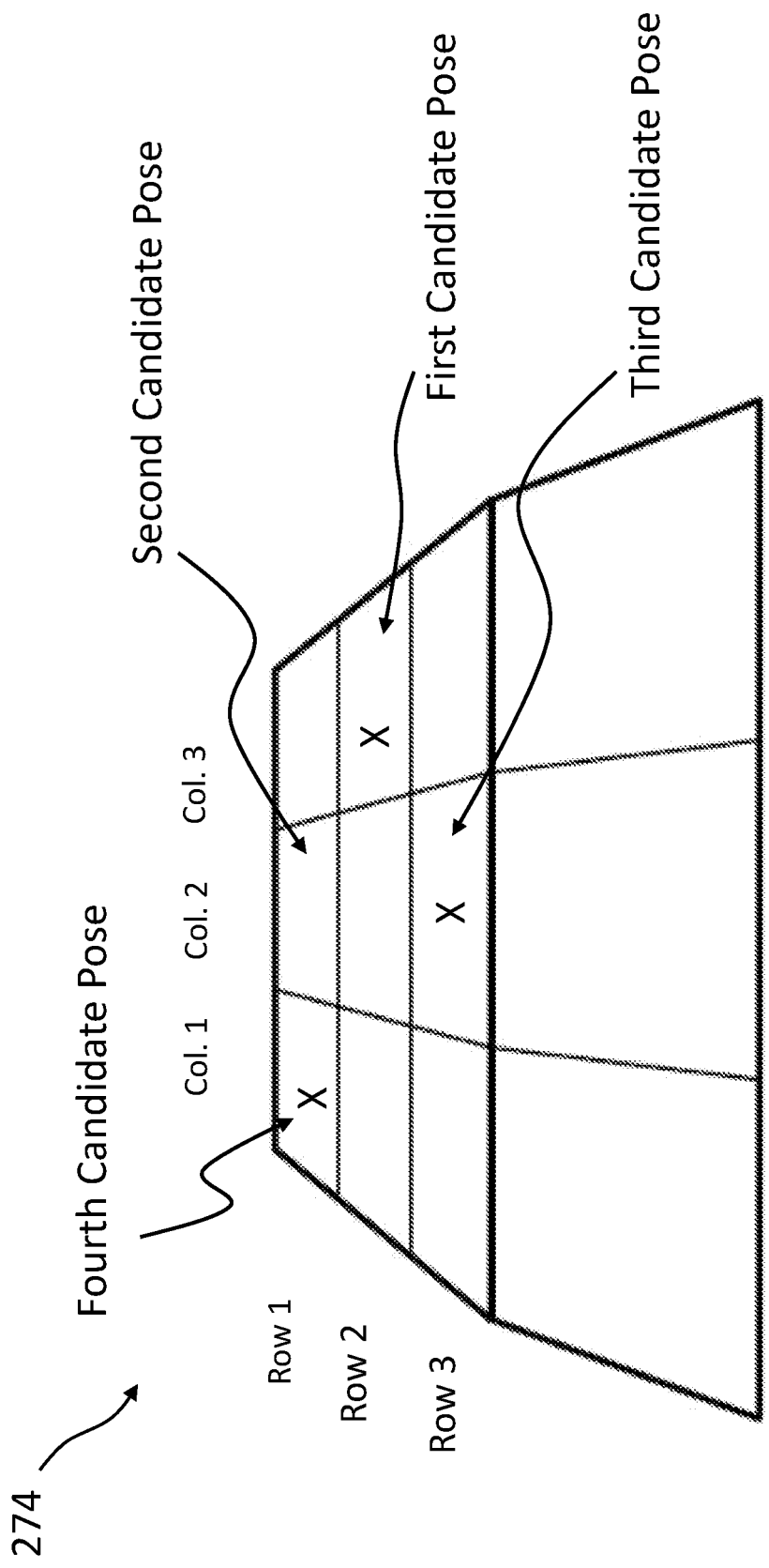

For instance, FIG. 12C depicts an example in the control circuit 111 may determine a first candidate pose by determining a first location and a first set of pose angle values for the first candidate pose. In this example, the control circuit 111 may have not yet identified any robot-achievable candidate pose in the first layer 274 when it is determining the first candidate pose. Thus, the first candidate pose can be placed in any 3D region in the first layer 274. In some cases, the control circuit 111 may determine the first location in a random manner using, e.g., a pseudorandom function. In the example of FIG. 12C, the first location may be in row 2, column 3. Further in this example, the first candidate pose may be determined as a robot-achievable candidate pose.

Further in FIG. 12C, the control circuit 111 may further determine a second candidate pose by determining a second location and a second set of pose angle values for the second candidate pose. In this example, because there is a robot-achievable candidate pose in the 3D region at row 2, column 3, the control circuit may select, for the second location, a 3D region that is in not in row 2, and not in column 3. In the example of FIG. 12C, the control circuit 111 may select a 3D region that is in row 1, column 2. In some cases, the control circuit 111 may determine the second location by randomly selecting a location within the 3D region occupying row 1, column 3. The control circuit 111 may further determine, however, that the second candidate pose is not a robot-achievable candidate pose. The control circuit 111 in this example may similarly determine a third candidate pose by determining a third location and a third set of pose angle values for the third candidate pose. For instance, the control circuit 111 may select a 3D region occupying row 3, column 2 of the grid, and determine the third location by randomly selecting a location within that 3D region. The third candidate pose in this example may be determined as a robot-achievable candidate pose. Further, the control circuit 111 may then determine a fourth candidate pose by determining a fourth location and a fourth set of pose angle values. Because a first 3D region at row 2, column 3 has a robot-achievable candidate pose, and because another 3D region at row 3, column 2 has another robot-achievable candidate pose, the control circuit 111 may be limited to determining the fourth location as a location within the 3D region at row 1, column 1.

In an embodiment, when the set of robot-achievable candidate poses already includes one or more robot-achievable candidate poses, if the control circuit 111 is unable to identify another robot-achievable candidate poses to satisfy the Latin square spatial distribution, either generally or within a defined amount of time, it may delete some or all of the set robot-achievable candidate poses. The control circuit 111 may then retry attempting to identify robot-achievable candidate poses that can satisfy the Latin square spatial distribution. For instance, if the control circuit 111 in the example of FIG. 12C determines that the fourth candidate pose is not a robot-achievable candidate pose, and is further unable to identify a robot-achievable candidate pose in the 3D region at row 1, column 1, then the control circuit 111 may remove the robot-achievable candidate pose at row 2, column 3, and/or remove the robot-achievable candidate pose at row 3, column 2 from the set of robot-achievable candidate poses. The control circuit 111 may then generate additional candidate poses in an attempt to find robot-achievable candidate poses to satisfy the Latin square spatial distribution. In some cases, if the control circuit 111 is still unable to identify robot-achievable candidate poses that satisfy the Latin square spatial distribution, either generally or within a defined amount of time, it may attempt to identify robot-achievable candidate poses that satisfy a stratified spatial distribution, as discussed below in more detail.

In an embodiment, the control circuit 111 may determine locations for the candidate poses such that they result in robot-achievable candidate poses with a stratified spatial distribution. In some cases, the control circuit 111 may use the stratified spatial distribution in response to a determination that the initial condition discussed above, which describes the Latin square distribution, cannot be satisfied. For instance, in the above example involving a n×n×n grid, the control circuit may determine, for each layer of the n layers of the grid, whether n robot-achievable candidate poses for the layer are determinable if the n robot-achievable candidate poses have to satisfy the initial condition. For instance, the control circuit may determine whether, before a defined time limit expires or other constraint, it has successfully found n robot-achievable candidate poses that satisfy the initial condition. In some cases, as discussed above, the robot-achievable candidate poses may have respective orientations that are determined based on surface points selected from a surface region of an imaginary sphere (e.g., a selection that is based on a uniform probability distribution). In such cases, the control circuit would be determining whether it can successfully find n robot-achievable candidate poses having both a spatial distribution of the initial condition and respective orientations determined using the surface points of the imaginary sphere. In some circumstances, the control circuit may determine that, for a particular layer of the grid, that n robot-achievable candidate poses are not determinable if they have to satisfy the initial condition (e.g., that n robot-achievable candidate poses has not been successfully found that satisfy the initial condition for the layer before a defined time limit expired, or before some other defined constraint). In some cases, the control circuit 111 may use the stratified spatial distribution without attempting beforehand to find candidate poses to satisfy a Latin square spatial distribution, and without determining whether it can find robot-achievable candidate poses that satisfy the Latin square spatial distribution. The stratified spatial distribution for robot-achievable candidate poses may be a spatial distribution in which, for a particular layer of the grid of 3D regions, (i) each row of the multiple rows of 3D regions within the layer includes exactly one robot-achievable candidate pose, or (ii) each column of the multiple columns within the layer includes exactly one robot-achievable candidate pose (wherein "or" generally is used herein to refer to "and/or"). In the above example involving the n×n×n grid, the control circuit 111 may attempt to achieve a stratified spatial distribution by determining, for each layer of the grid, a respective subset of n robot-achieve candidate poses based on a second condition in which the n robot-achievable poses have n locations in which each row (of the multiple rows of the layer) includes only one robot-achievable candidate pose, or each column (of the multiple columns of the layer) includes only one robot-achievable candidate pose. In some cases, the n robot-achievable candidate poses may have n sets of pose angles that are based on respective surface points selected from the surface region on the surface of the imaginary sphere.

Figure 13A:
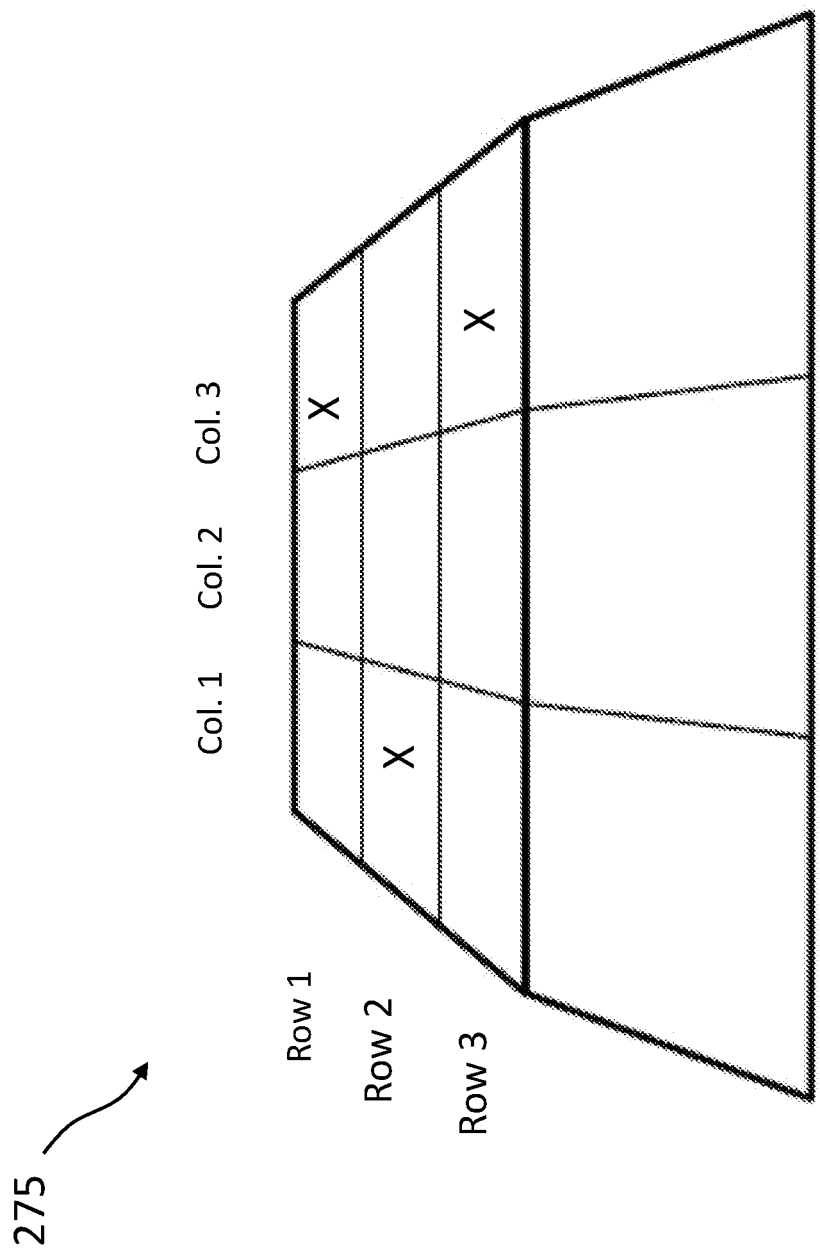
FIGS. 13A and 13B illustrate examples of a stratified spatial distribution for various poses, according to embodiments hereof.

For instance, FIG. 13A depicts an example of a stratified spatial distribution for three robot-achievable candidate poses in layer 275 of the grid depicted in FIGS. 11A and 11B. In the example of FIG. 13A, the three robot-achievable candidate poses are represented by X's. More specifically, the three robot-achievable candidate poses include a first pose that is at a location which occupies row 1, column 3 (or, more specifically, within a 3D region that occupies row 1, column 1); a second pose that is at a location which occupies row 2, column 1; and a third pose which occupies row 3, column 3. Although each column does not contain exactly one robot-achievable candidate pose (column 3 includes two robot-achievable candidate poses occupying two respective 3D regions in the column), this example still satisfies the stratified spatial distribution, because each row contains includes exactly one robot-achievable candidate pose.

Figure 13B:
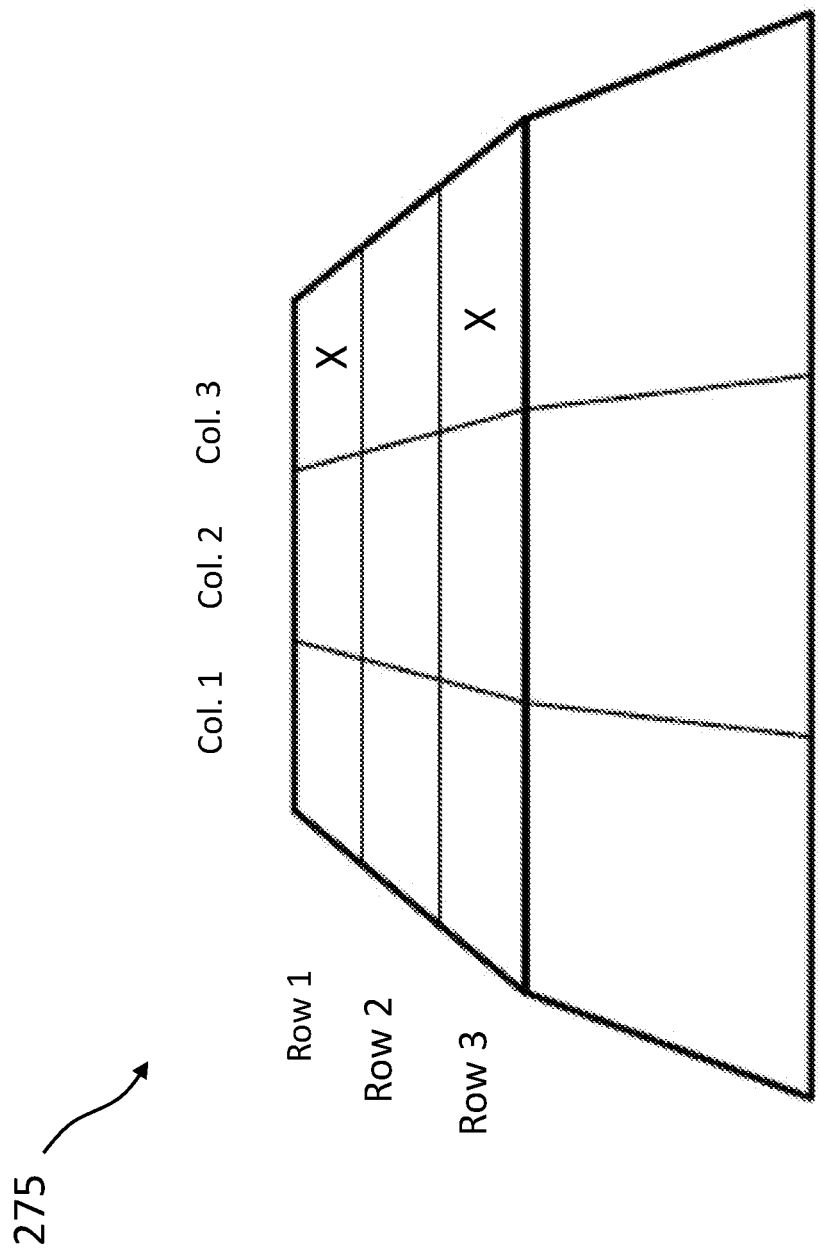

In an embodiment, if the robot-achievable candidate poses have a stratified spatial distribution, then the plurality of poses determined in step 906 may have a spatial distribution in which each row of the multiple rows within the layer includes no more than one pose of the plurality of poses, or each column of the multiple columns within the layer includes no more than one pose of the plurality of poses. For example, FIG. 13B depicts an example in which the plurality of poses determined in step 906 (the image-captured poses) include the first robot-achievable candidate pose of FIG. 13A (in the 3D region occupying row 1, column 3), and the third robot-achievable candidate pose of FIG. 13A (in the 3D region occupying row 3, column 3). In this example, while column 3 of the grid includes two poses of the plurality of poses, row 1 and row 3 of the grid includes exactly one pose of the plurality of poses, while row 2 includes no pose of the plurality of poses.

In an embodiment, the control circuit 111 may attempt to achieve the stratified spatial distribution by controlling locations of the candidate poses. For instance, the control circuit 111 may be configured to determine a respective location for each candidate pose of the set of candidate poses to be a location which is in a layer of the one or more layers of the grid and which i) does not share a row with any robot-achievable candidate pose of the set of robot-achievable candidate poses in that layer, or ii) does not share a column with any robot-achievable candidate pose of the set of robot-achievable candidate poses in that layer.

In an embodiment, the control circuit 111 may determine locations for the candidate poses such that they result in robot-achievable candidate poses with any random spatial distribution. In some cases, the control circuit 111 may use any random spatial distribution for the robot-achievable candidate poses in response to a determination that it cannot find enough robot-achievable candidate poses to satisfy a Latin square spatial distribution, and cannot find enough robot-achievable candidate poses to satisfy a stratified spatial distribution. In some cases, the control circuit 111 may use any random spatial distribution for the robot-achievable candidate poses without attempting to find, beforehand, robot-achievable candidate poses to satisfy a Latin square spatial distribution, and/or without attempting to find, beforehand, robot-achievable candidate poses to satisfy a stratified spatial distribution. In the above example involving the n×n×n grid, the control circuit 111 may be configured to determine that n robot-achievable candidate poses are not determinable if they have to satisfy the initial condition, and/or that n robot-achievable candidate poses are not determinable if they have to satisfy the second condition. For instance, the control circuit may determine that it has not successfully found, within a defined time limit, n robot-achievable candidate poses that satisfy the initial condition for a layer of the grid, and/or has determined that it has not successfully found, within the defined time limit, n robot-achievable candidate poses that satisfy the second condition for the layer. The initial condition is associated with a Latin square spatial distribution, and the second condition is associated with a stratified spatial distribution. In other words, the control circuit 111 may be unable to find n robot-achievable candidate poses that satisfy the Latin square spatial distribution and the stratified spatial distribution. In such a situation, the control circuit 111 may perform the following for that layer of the grid: determining the respective subset of n robot-achievable candidate poses for that layer based on a third condition in which the n robot-achievable candidate poses have: (a) n locations that are randomly distributed within n respective 3D regions of the layer. In some cases, the n robot-achievable candidate poses may have n sets of pose angle values that are based on n respective surface points selected from the surface region non the surface of the imaginary sphere.

Figure 14B:
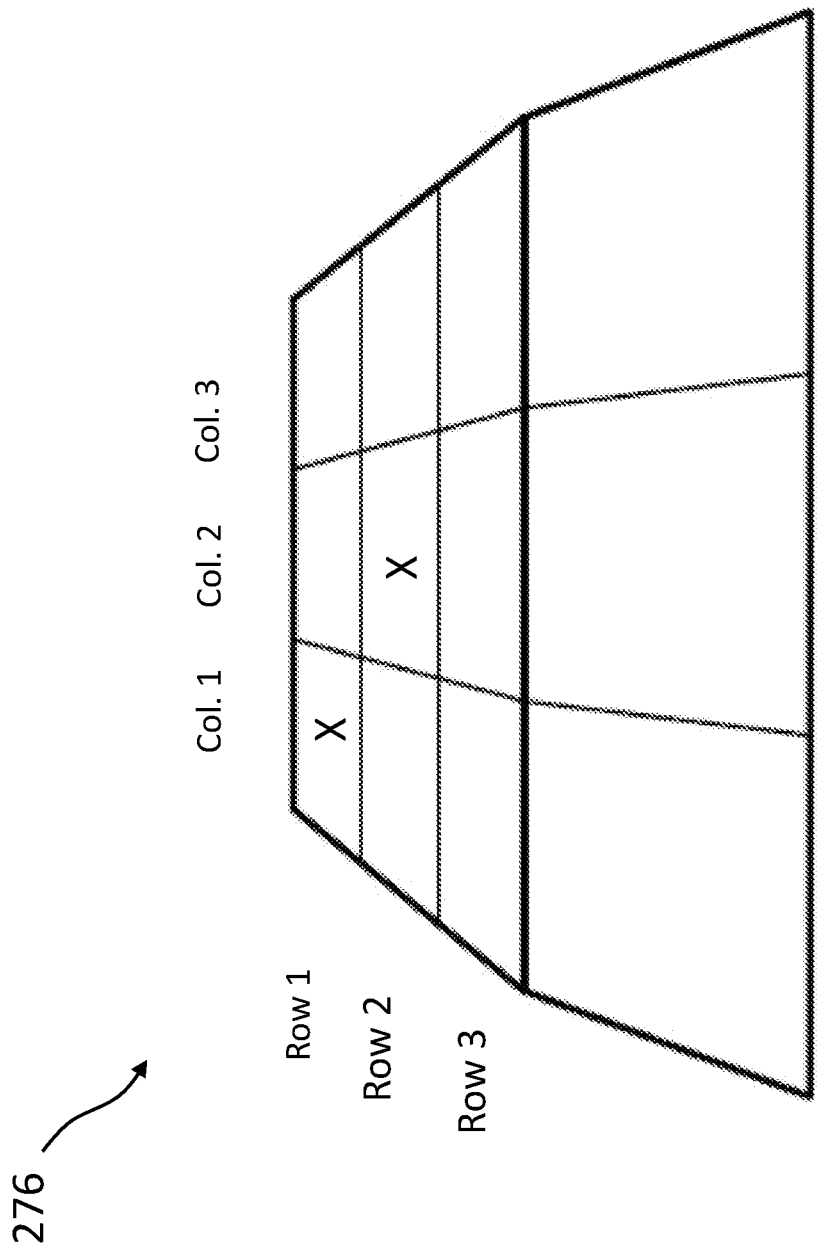

FIG. 14A depicts an example of three robot-achievable candidate poses whose locations were randomly determined to occupy three different 3D regions of the layer 276 of the grid depicted in FIGS. 11A and 11B. FIG. 14B depicts an example of two image-captured poses that are selected from among the robot-achievable candidate poses of FIG. 14A.

The above discussion of the Latin square spatial distribution and the stratified spatial distribution involve a grid having layers with multiple rows and multiple columns, and each row containing exactly one robot-achievable candidate pose, and/or each column containing exactly one robot-achievable candidate pose. In an embodiment, the Latin square spatial distribution and the stratified spatial distribution may more generally involve each row having an equal number of robot-achievable candidate poses as the other rows, and/or each column having an equal number of robot-achievable candidate poses as the other columns. For example, the control circuit 111 may in some situations identify robot-achievable candidate poses such that each row within a particular layer of a grid has exactly two robot-achievable candidate poses, and each column within the layer has exactly two robot-achievable candidate poses.

Figure 15A:
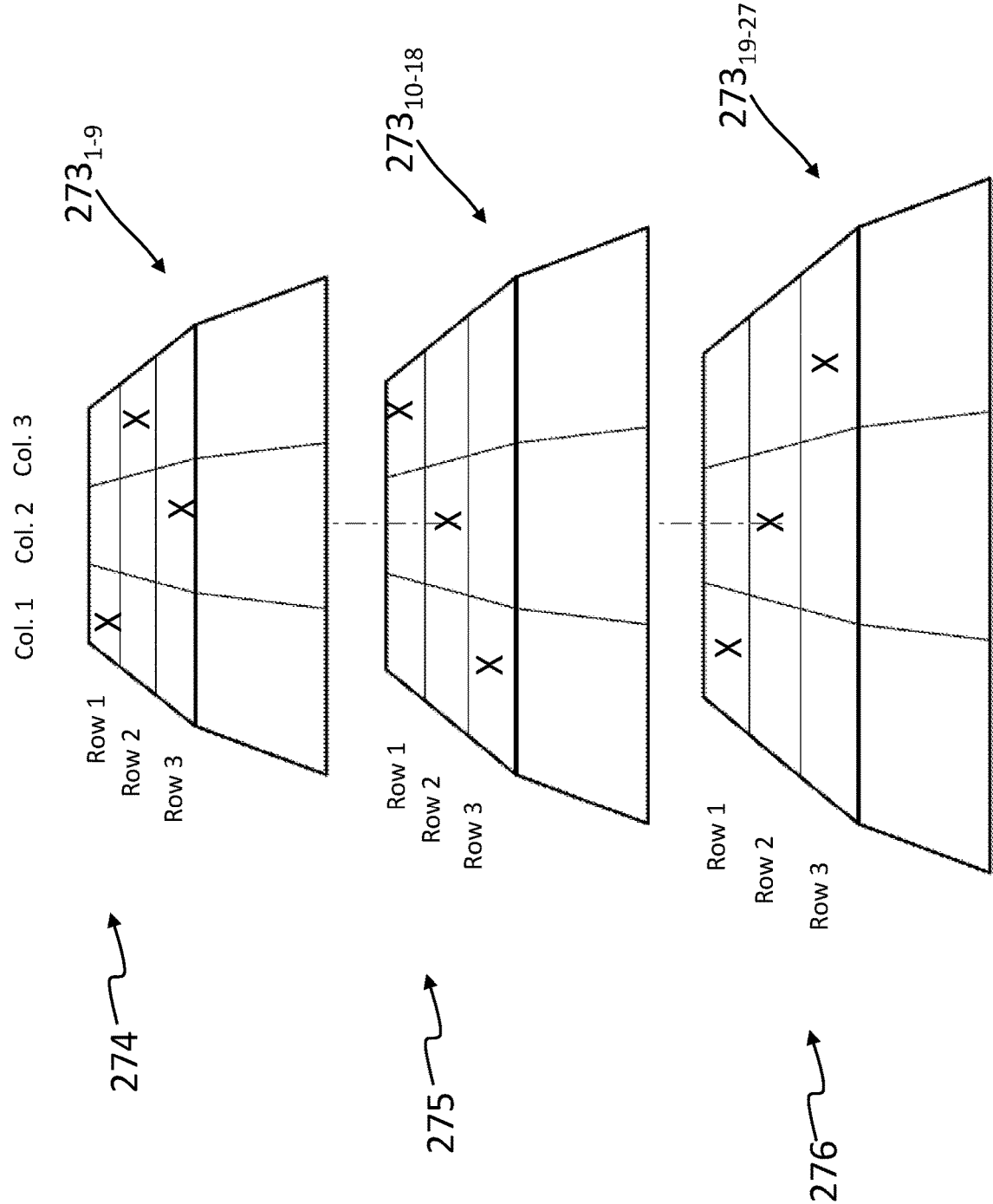
FIGS. 15A-15C illustrate various spatial distributions for robot-achievable candidate poses, according to embodiments hereof.

In an embodiment, the control circuit 111 may be configured to perform the determination of whether a particular spatial distribution is being satisfied on a layer-by-layer basis. For instance, when the control circuit 111 determines a location for a particular candidate pose, wherein the location is within a particular 3D region within a particular layer of a grid (e.g., the grid in FIGS. 11A and 11B), the control circuit 111 may evaluate whether the Latin square spatial distribution or the stratified spatial distribution is being satisfied by comparing the location of the candidate pose with locations of existing robot-achievable candidate poses to evaluate whether the candidate pose is in the same row or is in the same column as one of the robot-achievable candidate poses. However, the control circuit 111 may more specifically compare the location of the candidate pose with respective locations of only those robot-achievable candidate poses that are in the same layer of the grid, so as to determine whether the candidate pose will be in the same row or the same column as robot-achievable candidate poses in that layer. An example of the layer-by-layer determination is illustrated in FIG. 15A, which depicts a grid having robot-achievable candidate poses that satisfy a Latin square spatial distribution for each layer of a first layer 274, a second layer 275, and a third layer 276. The control circuit 111 may determine the spatial distribution depicted in FIG. 15A even though a first pair of robot-achievable candidate poses are in respective 3D regions that have the same row and the same column. More specifically, one of the robot-achievable candidate poses is in a 3D region that is at row 1, column 1 in the layer 274, and another one of the robot-achievable candidate poses is in another 3D region that is also at row 1, column 1, but in layer 276. However, because the control circuit 111 in this example performs the evaluation of whether a particular spatial distribution is satisfied on a layer-by-layer basis, the robot-achievable candidate poses in FIG. 15A may still be considered to satisfy a Latin square spatial distribution for each of the layers 274, 275, 276.

Figure 15B:
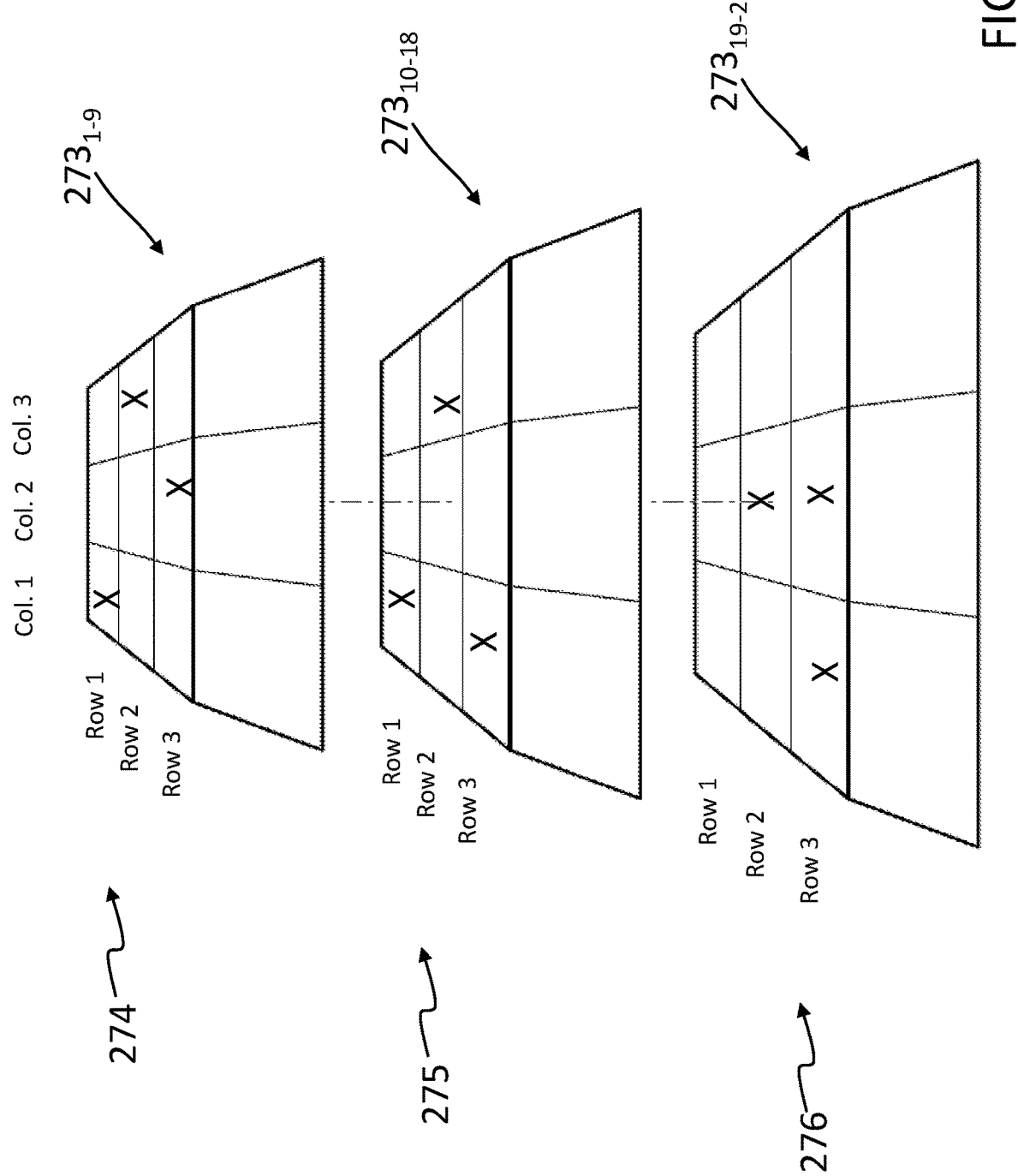

In an embodiment, the control circuit 111 may be configured to allow different layers of the grid to have different spatial distributions. For instance, FIG. 15B depicts an example in which the control circuit 111 has identified three robot-achievable candidate poses that have a Latin square spatial distribution for a first layer 274 of the grid, has identified another three robot-achievable candidate poses that satisfy a stratified spatial distribution for a second layer 275 of the grid, and has identified yet another three robot-achievable candidate poses that satisfy a random spatial distribution for a third layer 276 of the grid. In some cases, the control circuit 111 may have determined locations to satisfy a stratified spatial distribution for the robot-achievable candidate poses in the second layer 275 after being unable to successfully find three robot-achievable candidate poses that can satisfy the Latin square spatial distribution in the second layer 275.

Figure 15C:
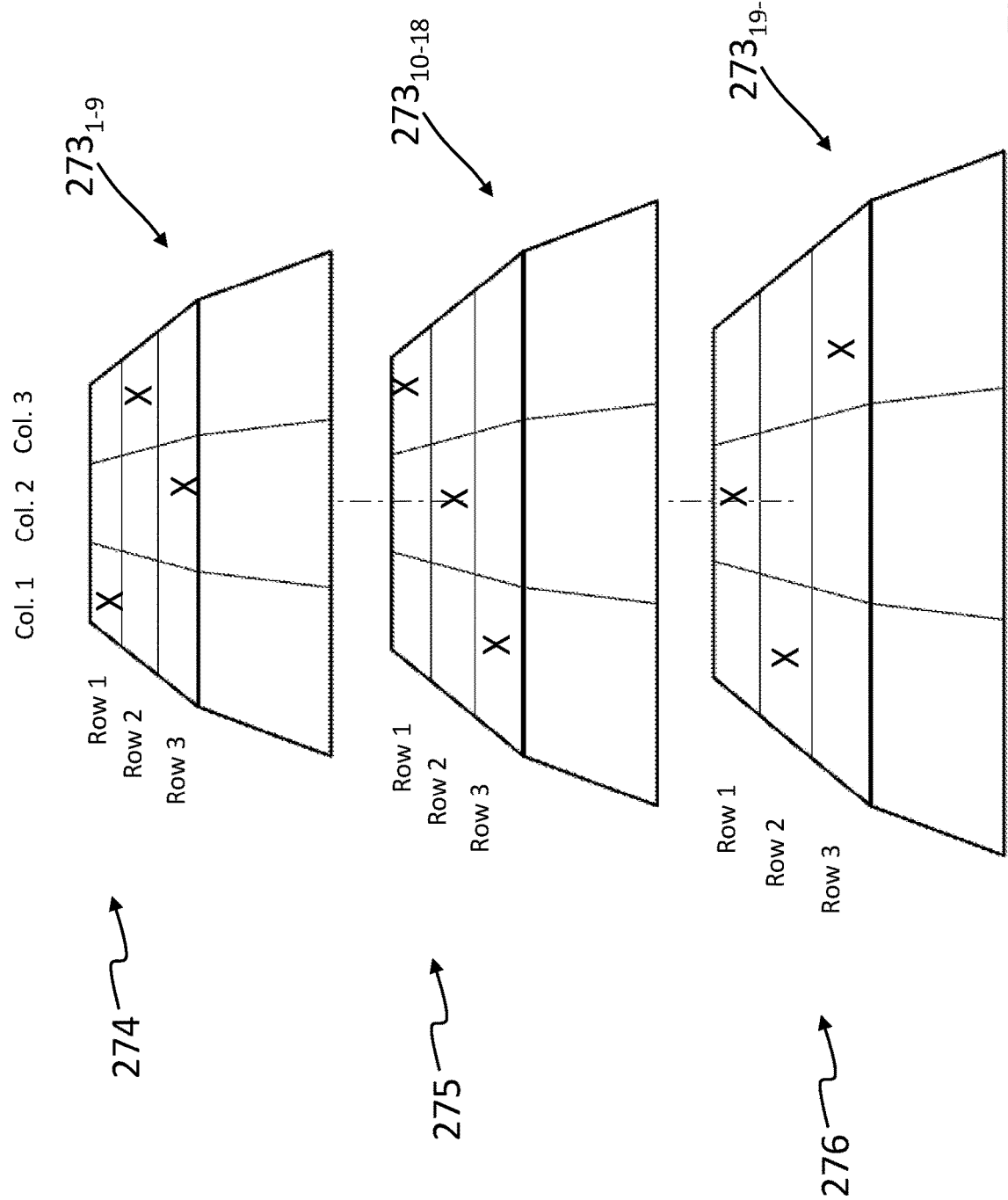

In an embodiment, the control circuit 111 may apply a more stringent condition for satisfying a Latin square spatial distribution. The more stringent condition may involve a space which is divided into a grid having m layers, wherein each layer has n rows and n columns. The number of layers may be the same as the number of rows or columns, or may be different as the number of rows or columns. For each layer of the m layers, each row may have only one robot-achievable candidate pose, and each column may have only one robot-achievable candidate pose. Under this more stringent condition, each stack in the grid may have only robot-achievable candidate pose. A stack may refer to m 3D regions of the grid that are on different respective layers of the grid and that have occupy the same row and the same column within the respective layers. FIG. 15C depicts an example of nine robot-achievable candidate poses that satisfy the more stringent condition discussed above.

As stated above, the plurality of poses that are determined in step 906 may be selected from robot-achievable candidate poses that are distributed within a grid of 3D regions that divide a space within a camera field of view (e.g., 272). A total number of robot-achievable candidate poses that are selected may be equal to the target number discussed above. The plurality of poses may be used to generate a plurality of calibration images, wherein a total number of calibration images is also equal to the target number discussed above. As an example, FIGS. 15A-15C illustrate situations in which the control circuit 111 has identified nine robot-achievable candidate poses that are distributed within a camera field of view. In this example, if the target number is equal to, e.g., eight, then step 906 may involve selecting eight poses from among the nine robot-achievable candidate poses. In an embodiment, the selection may be done in a random manner, such as through the use of a pseudorandom function.

As the above discussion indicates, step 906 may involve determining a plurality of poses by determining a plurality of respective sets of pose angle values, wherein each set of pose angle values is determined based on a respective surface point selected from within a surface region on a surface of an imaginary sphere. In some cases, step 906 may further involve determining locations for the plurality of poses to attempt to satisfy a desired spatial distribution, such as the Latin square spatial distribution or the stratified spatial distribution. In an embodiment, step 906 may be modified so as to omit determining the plurality of respective sets of pose angle values, or may be modified so that determining the plurality of respective sets of pose angle values is performed in some other manner that does not involve selecting a surface point from within a surface region on an imaginary sphere. For instance, for such a modified step 906, each of the pose angle values in a respective set of pose angle values may be determined randomly based on a uniform probability distribution function, as discussed above. In this embodiment, steps 902 and 904 may be omitted, or may still be included, and step 906 may still involve determining a plurality of poses. The plurality of poses may be determined by determining respective locations for the plurality of poses, wherein the respective locations may be determined so as to satisfy a desired spatial distribution, such as the Latin square spatial distribution or the stratified spatial distribution. For instance, such a modified step 906 may involve determining a grid that divides a space within a camera field of view into one or more layers of multiple rows of 3D regions and multiple columns of 3D regions, and determining respective locations for candidate poses such that the candidate poses will result in robot-achievable candidate poses which satisfy the Latin square spatial distribution or the stratified spatial distribution, as discussed above. Such a modified step 906 may further result in a plurality of poses in which, for each layer of the grid, each of the rows includes no more than one pose of the plurality of poses, and each column includes no more than one pose of the plurality of poses.

Returning to FIG. 9, the method 900 may further include a step 908, in which the control circuit 111 outputs a plurality of movement commands (also referred to as robot movement commands) for controlling placement of the calibration pattern. For instance, the robot movement commands may include a plurality of motor commands for controlling the robot 150/250 to place the calibration pattern 160/260 to a particular pose, which may involve moving the calibration pattern 160/260 to a particular location of the pose, and/or tilting the calibration pattern 160/260 to a particular pattern orientation of the pose. In some instances, the robot movement commands may be based on the respective sets of pose angle values determined for the poses that were determined in step 906. In some instances, the robot movement commands may be determined based on an inverse kinematic function that determines a robot movement command based on a desired pose.

In an embodiment, the method 900 may include a step 910, in which the control circuit further receive a plurality of calibration images, wherein each calibration image of the plurality of calibration images represents (e.g., captures) the calibration pattern and is generated while the calibration pattern has a respective pose of the plurality of poses. For instance, if eight poses are determined in step 906, then the control circuit 111 in step 910 may receive eight calibration images. In some cases, the camera 170/270 may have photographed or otherwise imaged the calibration pattern 160/260 while the calibration pattern 160/260 is at each of the eight poses, so as to generate the eight poses. In some implementations, the control circuit 111 in step 910 may generate camera commands which cause the camera 170/270 to photograph the calibration pattern 160/260, and may output the camera commands (e.g., via the communication interface 113) to the camera 170/270. In an embodiment, the control circuit 111 may receive the plurality of calibration images from the camera 170/270, such as via the communication interface 113. In an embodiment, the control circuit 111 may receive the plurality of calibration images from a storage device on which the calibration images are stored, such as the non-transitory computer-readable medium 115, or from some other non-transitory computer-readable medium.

In an embodiment, the method 900 may further include a step 912, in which the control circuit 111 determines an estimate of a camera calibration parameter based on the plurality of calibration images. As stated above, the camera calibration parameter may be an intrinsic camera calibration parameter, such as a projection matrix or a lens distortion parameter of the camera 170/270, or may be a parameter which describes a spatial relationship between the camera 170/270 and its environment, such as a location and orientation of the camera 170/270 relative to the robot 150/250. In an embodiment, the control circuit 111 may determine the estimate of the camera calibration parameter based on equations which describe a relationship between defined locations of pattern elements (e.g., dots) on the calibration pattern 160/260 in a pattern coordinate system and locations at which the pattern elements appear in the calibration images. Determining an estimate of a camera calibration parameter is described in more detail in U.S. patent application Ser. No. 16/295,940, entitled "METHOD AND SYSTEM FOR PERFORMING AUTOMATIC CAMERA CALIBRATION FOR ROBOT CONTROL," the content of which is incorporated by reference herein in its entirety.

In an embodiment, the control circuit may be configured, after the camera calibration is performed, to receive a subsequent image from the camera via the communication interface, and to output a subsequent robot movement command that is generated based on the subsequent image and based on the estimate of the camera calibration parameter. For instance, the subsequent image may be that of a package or stack of packages in a warehouse that are to be de-palletized by the robot 150/250. In some instances, the control circuit 111 may be configured to determine a spatial relationship between the robot 150/250 and the package, and/or a spatial relationship between the camera 170/270 and the package, based on the image of the package and based on the estimate of the camera calibration parameter determined in step 912, as also described in more detail in U.S. patent application Ser. No. 16/295,940, entitled "METHOD AND SYSTEM FOR PERFORMING AUTOMATIC CAMERA CALIBRATION FOR ROBOT CONTROL," the content of which is incorporated by reference herein in its entirety. The control circuit 111 may then be configured to generate a robot movement command based on the determined spatial relationship between the package and the robot 150/250 or the camera 170/270, and output the robot movement command to the robot 150/250.

Concise Description of Various Embodiments

Embodiment 1 relates to a computing system comprising a communication interface and a control circuit. The communication interface is configured to communicate with a robot and with a camera having a camera field of view, wherein the robot has a calibration pattern disposed thereon. The control circuit is configured, when the computing system is in communication with the robot and with the camera, to perform camera calibration by: determining a range of pattern orientations for performing the camera calibration, wherein the range of pattern orientations is a range of orientations for the calibration pattern; determining a surface region on a surface of an imaginary sphere, wherein the surface of the imaginary sphere represents possible pattern orientations for the calibration pattern, and the surface region represents the range of pattern orientations for performing the camera calibration; determining a plurality of poses for the calibration pattern to adopt when the camera calibration is being performed, wherein the plurality of poses are defined by respective combinations of a plurality of respective locations within the camera field of view and a plurality of respective sets of pose angle values, wherein each set of pose angle values of the plurality of respective sets is based on a respective surface point selected from within the surface region on the surface of the imaginary sphere; outputting a plurality of robot movement commands for controlling placement of the calibration pattern, wherein the plurality of robot movement commands are generated based on the plurality of poses that are determined; receiving a plurality of calibration images, wherein each calibration image of the plurality of calibration images represents the calibration pattern and is generated while the calibration pattern has a respective pose of the plurality of poses; and determining an estimate of a camera calibration parameter based on the plurality of calibration images. The control circuit is further configured, after the camera calibration is performed, to receive a subsequent image from the camera via the communication interface, and to output a subsequent robot movement command that is generated based on the subsequent image and based on the estimate of the camera calibration parameter.

Embodiment 2 includes the computing system of embodiment 1. In this embodiment, the control circuit is configured, for respective surface points on which the respective sets of pose angle values are based, to randomly select each of the respective surface points from within the surface region according to a uniform probability distribution.

Embodiment 3 includes the computing system of embodiment 2. In this embodiment, the control circuit is configured, for the respective surface points on which the respective sets of pose angle values are based, to randomly select each of the respective surface points from among only a uniform set of surface points, wherein the uniform set of surface points is a set of surface points that are uniformly distributed within the surface region on the surface of the imaginary sphere.

Embodiment 4 includes the computing system of any one of embodiments 1-3. In this embodiment, the surface region on the surface of the imaginary sphere forms a circular band of uniform width.

Embodiment 5 includes the computing system of any one of embodiments 1-4. In this embodiment, each set of the pose angle values of the plurality of sets of pose angle values is a set of angle values that represent respective amounts of rotation of the calibration pattern about respective axes of rotation, wherein the respective axes are orthogonal to each other, and wherein each of the respective axes is parallel with or orthogonal to a camera optical axis.

Embodiment 6 includes the computing system of embodiment 5. In this embodiment, each surface point on the surface of the imaginary sphere represents a respective pattern orientation for the calibration pattern that would cause a normal vector of the calibration pattern to point to the surface point. Further, the control circuit is configured to determine each set of pose angle values for the plurality of sets based on a respective surface point by applying an arctangent function to a respective coordinate for the respective surface point.

Embodiment 7 includes the computing system of any one of embodiments 1-6. In this embodiment, the control circuit is configured to determine the plurality of poses by: determining a grid of 3D regions that divide a space within the camera field of view into one or more layers that each has multiple rows of 3D regions and multiple columns of 3D regions; determining the plurality of locations for the plurality of poses such that the plurality of poses have a spatial distribution within the grid in which, for each layer of the one or more layers: (i) each row of the multiple rows within the layer includes no more than one pose of the plurality of poses and (ii) each column of the multiple columns within the layer includes no more than one pose of the plurality of poses.

Embodiment 8 includes the computing system of any one of embodiments 1-6. In this embodiment, the control circuit is configured to determine the plurality of poses by: determining a grid of 3D regions that divide a space within the camera field of view into one or more layers that each has multiple rows of 3D regions and multiple columns of 3D regions; determining the plurality of locations for the plurality of poses such that the plurality of poses have a spatial distribution within the grid in which, for each layer of the one or more layers: (i) each row of the multiple rows within the layer includes no more than one pose of the plurality of poses, or (ii) each column of the multiple columns within the layer includes no more than one pose of the plurality of poses.

Embodiment 9 includes the computing system of any one of embodiments 1-6. In this embodiment, the control circuit is configured to determine the plurality of poses by: (a) determining a set of candidate poses, wherein each candidate pose of the set of candidate poses is determined by: determining a respective location within the camera field of view for the candidate pose, selecting a respective surface point from within the surface region on the surface of the imaginary sphere, and determining a respective set of pose angle values for the candidate pose based on the surface point that is selected; (b) determining a set of robot-achievable candidate poses by: determining, for each candidate pose of the set of candidate poses, whether the candidate pose is robot-achievable, and adding the candidate pose to the set of robot-achievable candidate poses in response to a determination that the candidate pose is robot-achievable; and selecting the plurality of poses from among only the set of robot-achievable candidate poses.

Embodiment 10 includes the computing system of embodiment 9. In this embodiment, the control circuit is configured to determine a grid of 3D regions that divide a space within the camera field of view into one or more layers that each has multiple rows of 3D regions and multiple columns of 3D regions. Further, the control circuit is configured to determine a respective location for each candidate pose of the set of candidate poses to be a location which is in a layer of the one or more layers of the grid and which i) does not share a row with any robot-achievable candidate pose of the set of robot-achievable candidate poses in that layer, and ii) does not share a column with any robot-achievable candidate pose of the set of robot-achievable candidate poses in that layer.

Embodiment 11 includes the computing system of embodiment 9. In this embodiment, the control circuit is configured to: determine a target number that indicates how many poses are desired for the plurality of poses; determine a grid size of n based on the target number of poses; determine a grid of 3D regions that divide a space within the camera field of view into one or more layers that each has n rows of 3D regions and n columns of 3D regions; determine, for each layer of the one or more layers and as part of the set of robot-achievable candidate poses, a respective subset of n robot-achievable candidate poses based on an initial condition that the n robot-achievable candidate poses have n locations with a first spatial distribution in which i) each row of the n rows of the layer includes only one robot-achievable candidate pose, and ii) each column of the n columns of the layer includes only one robot-achievable candidate pose.

Embodiment 12 includes the computing system of embodiment 11. In this embodiment, the control circuit is further configured to determine the set of robot-achievable candidate poses by performing the following for each layer of the one or more layers of the grid: (a) determining whether the respective subset of n robot-achievable candidate poses for the layer are determinable if the respective subset of n robot-achievable candidate poses have to satisfy the initial condition, wherein the initial condition is a first condition, and (b) in response to a determination that the respective subset of n robot-achievable candidate poses are not determinable if the respective subset of n robot-achievable candidate poses have to satisfy the initial condition, determining the respective subset of n robot-achievable candidate poses based on a second condition in which the n robot-achievable candidate poses have n locations with a second spatial distribution in which i) each row of the multiple rows of the layer includes only one robot-achievable candidate pose, or ii) each column of the multiple columns of the layer includes only one robot-achievable candidate pose.

Embodiment 13 includes the computing system of embodiment 12. In this embodiment, the control circuit is further configured to determine the set of robot-achievable candidate poses by further performing the following for each layer of the one or more layers of the grid: (a) determining whether the respective subset of n robot-achievable candidate poses for the layer are determinable if the respective subset of n robot-achievable candidate poses have to satisfy the second condition, and (b) in response to a determination that the respective subset of n robot-achievable candidate poses are not determinable if the respective subset of n robot-achievable candidate poses have to satisfy the second condition, determining the respective subset of n robot-achievable candidate poses based on a third condition in which the n robot-achievable candidate poses have n locations that are randomly distributed within n respective 3D regions of the layer.

Embodiment 14 includes the computing system of embodiment 12 or 13. In this embodiment, the grid has n layers, and wherein the grid size of n is determined by: determining a square root of the target number of poses for the plurality of poses, and determining the grid size of n as a smallest integer that is greater than or equal to the square root of the target number of poses.

Embodiment 15 relates to a computing system comprising a communication interface and a control circuit. The communication interface is configured to communicate with a robot and with a camera having a camera field of view, wherein the robot has a calibration pattern disposed thereon. The control circuit is configured, when the computing system is in communication with the robot and with the camera, to perform camera calibration by: determining a plurality of poses for the calibration pattern to adopt when the camera calibration is being performed, wherein the plurality of poses are defined by respective combinations of a plurality of respective locations within the camera field of view and a plurality of pattern orientations; outputting a plurality of robot movement commands for controlling placement of the calibration pattern, wherein the plurality of robot movement commands are generated based on the plurality of poses that are determined; receiving a plurality of calibration images, wherein each calibration image of the plurality of calibration images represents the calibration pattern and is generated while the calibration pattern has a respective pose of the plurality of poses; and determining an estimate of a camera calibration parameter based on the plurality of calibration images. The control circuit is further configured, after the camera calibration is performed, to receive a subsequent image from the camera via the communication interface, and to output a subsequent robot movement command that is generated based on the subsequent image and based on the estimate of the camera calibration parameter.

Embodiment 16 includes the computing system of embodiment 15. In this embodiment, the control circuit is configured to determine the plurality of poses by: (a) determining a grid of 3D regions that divide a space within the camera field of view into one or more layers that each has multiple rows of 3D regions and multiple columns of 3D regions; (b) determining the plurality of locations for the plurality of poses such that the plurality of poses have a spatial distribution within the grid in which, for each layer of the one or more layers: (i) each row of the multiple rows within the layer includes no more than one pose of the plurality of poses and (ii) each column of the multiple columns within the layer includes no more than one pose of the plurality of poses.

Embodiment 17 includes the computing system of embodiment 15. In this embodiment, the computing system is configured to determine the plurality of poses by: (a) determining a grid of 3D regions that divide a space within the camera field of view into one or more layers that each has multiple rows of 3D regions and multiple columns of 3D regions; (b) determining the plurality of locations for the plurality of poses such that the plurality of poses have a spatial distribution within the grid in which, for each layer of the one or more layers: (i) each row of the multiple rows within the layer includes no more than one pose of the plurality of poses, or (ii) each column of the multiple columns within the layer includes no more than one pose of the plurality of poses.

Embodiment 18 includes the computing system of embodiment 15. In this embodiment, the computing system is configured to determine the plurality of poses by: (a) determining a set of candidate poses, wherein each candidate pose of the set of candidate poses is determined by: determining a respective location within the camera field of view for the candidate pose, (b) determining a set of robot-achievable candidate poses by: determining, for each candidate pose of the set of candidate poses, whether the candidate pose is robot-achievable, and adding the candidate pose to the set of robot-achievable candidate poses in response to a determination that the candidate pose is robot-achievable; and (c) selecting the plurality of poses from among only the set of robot-achievable candidate poses.

Embodiment 19 includes the computing system of embodiment 18. In this embodiment, the control circuit is configured to determine a grid of 3D regions that divide a space within the camera field of view into one or more layers that each has multiple rows of 3D regions and multiple columns of 3D regions, and wherein the control circuit is configured to determine a respective location for each candidate pose of the set of candidate poses to be a location which is in a layer of the one or more layers of the grid and which i) does not share a row with any robot-achievable candidate pose of the set of robot-achievable candidate poses in that layer, and ii) does not share a column with any robot-achievable candidate pose of the set of robot-achievable candidate poses in that layer.

Embodiment 20 includes the computing system of embodiment 18. In this embodiment, the control circuit is configured to: determine a target number that indicates how many poses are desired for the plurality of poses; determine a grid size of n based on the target number of poses; determine a grid of 3D regions that divide a space within the camera field of view into one or more layers that each has n rows of 3D regions and n columns of 3D regions; determine, for each layer of the one or more layers and as part of the set of robot-achievable candidate poses, a respective subset of n robot-achievable candidate poses based on an initial condition that the n robot-achievable candidate poses have n locations with a first spatial distribution in which i) each row of the n rows of the layer includes only one robot-achievable candidate pose, and ii) each column of the n columns of the layer includes only one robot-achievable candidate pose.

Embodiment 21 includes the computing system of embodiment 20. In this embodiment, the control circuit is further configured to determine the set of robot-achievable candidate poses by performing the following for each layer of the one or more layers of the grid: (a) determining whether the respective subset of n robot-achievable candidate poses for the layer are determinable if the respective subset of n robot-achievable candidate poses have to satisfy the initial condition, wherein the initial condition is a first condition, and (b) in response to a determination that the respective subset of n robot-achievable candidate poses are not determinable if the respective subset of n robot-achievable candidate poses have to satisfy the initial condition, determining the respective subset of n robot-achievable candidate poses based on a second condition in which the n robot-achievable candidate poses have n locations with a second spatial distribution in which i) each row of the multiple rows of the layer includes only one robot-achievable candidate pose, or ii) each column of the multiple columns of the layer includes only one robot-achievable candidate pose.

Embodiment 22 includes the computing system of embodiment 21. In this embodiment, the control circuit is further configured to determine the set of robot-achievable candidate poses by further performing the following for each layer of the one or more layers of the grid: (a) determining whether the respective subset of n robot-achievable candidate poses for the layer are determinable if the respective subset of n robot-achievable candidate poses have to satisfy the second condition, and (b) in response to a determination that the respective subset of n robot-achievable candidate poses are not determinable if the respective subset of n robot-achievable candidate poses have to satisfy the second condition, determining the respective subset of n robot-achievable candidate poses based on a third condition in which the n robot-achievable candidate poses have n locations that are randomly distributed within n respective 3D regions of the layer.

Embodiment 23 includes the computing system of any one of embodiments 20-22, wherein the grid has n layers, and wherein the grid size of n is determined by: (a) determining a square root of the target number of poses for the plurality of poses, and (b) determining the grid size of n as a smallest integer that is greater than or equal to the square root of the target number of poses.

Embodiment 24 includes the computing system of any one of embodiments 15-23, wherein the plurality of respective pattern orientations are defined by a plurality of respective sets of pose angle values, and wherein the control circuit is configured to: determine a range of pattern orientations for performing the camera calibration, wherein the range of pattern orientations is a range of orientations for the calibration pattern; determine a surface region on a surface of an imaginary sphere, wherein the surface of the imaginary sphere represents possible pattern orientations for the calibration pattern, and the surface region represents the range of pattern orientations for performing the camera calibration; determine each set of pose angle values of the plurality of respective sets based on a respective surface point selected from within the surface region on the surface of the imaginary sphere (e.g., selected based on a uniform probability distribution). For instance, the above technique for embodiment 24 may be used in embodiment 18. In such an instance, the control circuit is configured to determine the plurality of poses by: (a) determining a set of candidate poses, wherein each candidate pose of the set of candidate poses is determined by: determining a respective location within the camera field of view for the candidate pose, selecting a respective surface point from within the surface region on the surface of the imaginary sphere, and determining a respective set of pose angle values for the candidate pose based on the surface point that is selected; (b) determining a set of robot-achievable candidate poses by: determining, for each candidate pose of the set of candidate poses, whether the candidate pose is robot-achievable, and adding the candidate pose to the set of robot-achievable candidate poses in response to a determination that the candidate pose is robot-achievable; and selecting the plurality of poses from among only the set of robot-achievable candidate poses.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A computing system comprising:
   a communication interface configured to communicate with a robot and with a camera having a camera field of view, wherein the robot has a calibration pattern disposed thereon; and
   a control circuit configured, when the computing system is in communication with the robot and with the camera, to perform camera calibration by:
      determining a range of pattern orientations for performing the camera calibration, wherein the range of pattern orientations is a range of orientations for the calibration pattern;
      determining a surface region on a surface of an imaginary sphere, wherein the surface of the imaginary sphere represents possible pattern orientations for the calibration pattern, the surface region represents the range of pattern orientations for performing the camera calibration, and the surface region on the surface of the imaginary sphere forms a circular band of uniform width;
      determining a plurality of poses for the calibration pattern to adopt when the camera calibration is being performed, wherein the plurality of poses are defined by respective combinations of a plurality of respective locations within the camera field of view and a plurality of respective sets of pose angle values, wherein each set of pose angle values of the plurality of respective sets is based on a respective surface point selected from within the surface region on the surface of the imaginary sphere;
      outputting a plurality of robot movement commands for controlling placement of the calibration pattern, wherein the plurality of robot movement commands are generated based on the plurality of poses that are determined;
      receiving a plurality of calibration images, wherein each calibration image of the plurality of calibration images represents the calibration pattern and is generated while the calibration pattern has a respective pose of the plurality of poses; and
      determining an estimate of a camera calibration parameter based on the plurality of calibration images,
   wherein the control circuit is further configured, after the camera calibration is performed, to receive a subsequent image from the camera via the communication interface, and to output a subsequent robot movement command that is generated based on the subsequent image and based on the estimate of the camera calibration parameter.

2. The computing system of claim 1, wherein the control circuit is configured, for respective surface points on which the respective sets of pose angle values are based, to randomly select each of the respective surface points from within the surface region according to a uniform probability distribution.

3. The computing system of claim 2, wherein the control circuit is configured, for the respective surface points on which the respective sets of pose angle values are based, to randomly select each of the respective surface points from among only a uniform set of surface points, wherein the uniform set of surface points is a set of surface points that are uniformly distributed within the surface region on the surface of the imaginary sphere.

4. The computing system of claim 1, wherein each set of the pose angle values of the plurality of sets of pose angle values is a set of angle values that represent respective amounts of rotation of the calibration pattern about respective axes of rotation, wherein the respective axes are orthogonal to each other, and wherein each of the respective axes is parallel with or orthogonal to a camera optical axis.

5. The computing system of claim 4, wherein each surface point on the surface of the imaginary sphere represents a respective pattern orientation for the calibration pattern that would cause a normal vector of the calibration pattern to point to the surface point, and
   wherein the control circuit is configured to determine each set of pose angle values for the plurality of sets based on a respective surface point by applying an arctangent function to a respective coordinate for the respective surface point.

6. The computing system of claim 1, wherein the control circuit is configured to determine the plurality of poses by:
   determining a grid of 3D regions that divide a space within the camera field of view into one or more layers that each has multiple rows of 3D regions and multiple columns of 3D regions;

determining the plurality of locations for the plurality of poses such that the plurality of poses have a spatial distribution within the grid in which, for each layer of the one or more layers: (i) each row of the multiple rows within the layer includes no more than one pose of the plurality of poses and (ii) each column of the multiple columns within the layer includes no more than one pose of the plurality of poses.

7. The computing system of claim 1, wherein the control circuit is configured to determine the plurality of poses by:
determining a grid of 3D regions that divide a space within the camera field of view into one or more layers that each has multiple rows of 3D regions and multiple columns of 3D regions;
determining the plurality of locations for the plurality of poses such that the plurality of poses have a spatial distribution within the grid in which, for each layer of the one or more layers: (i) each row of the multiple rows within the layer includes no more than one pose of the plurality of poses, or (ii) each column of the multiple columns within the layer includes no more than one pose of the plurality of poses.

8. The computing system of claim 1, wherein the control circuit is configured to determine the plurality of poses by:
determining a set of candidate poses, wherein each candidate pose of the set of candidate poses is determined by: determining a respective location within the camera field of view for the candidate pose, selecting a respective surface point from within the surface region on the surface of the imaginary sphere, and determining a respective set of pose angle values for the candidate pose based on the surface point that is selected;
determining a set of robot-achievable candidate poses by: determining, for each candidate pose of the set of candidate poses, whether the candidate pose is robot-achievable, and adding the candidate pose to the set of robot-achievable candidate poses in response to a determination that the candidate pose is robot-achievable; and
selecting the plurality of poses from among only the set of robot-achievable candidate poses.

9. The computing system of claim 8, wherein the control circuit is configured to determine a grid of 3D regions that divide a space within the camera field of view into one or more layers that each has multiple rows of 3D regions and multiple columns of 3D regions, and
wherein the control circuit is configured to determine a respective location for each candidate pose of the set of candidate poses to be a location which is in a layer of the one or more layers of the grid and which i) does not share a row with any robot-achievable candidate pose of the set of robot-achievable candidate poses in that layer, and ii) does not share a column with any robot-achievable candidate pose of the set of robot-achievable candidate poses in that layer.

10. The computing system of claim 8, wherein the control circuit is configured to:
determine a target number that indicates how many poses are desired for the plurality of poses;
determine a grid size of n based on the target number of poses;
determine a grid of 3D regions that divide a space within the camera field of view into one or more layers that each has n rows of 3D regions and n columns of 3D regions;
determine, for each layer of the one or more layers and as part of the set of robot-achievable candidate poses, a respective subset of n robot-achievable candidate poses based on an initial condition that the n robot-achievable candidate poses have n locations with a first spatial distribution in which i) each row of the n rows of the layer includes only one robot-achievable candidate pose, and ii) each column of the n columns of the layer includes only one robot-achievable candidate pose.

11. The computing system of claim 10, wherein the control circuit is further configured to determine the set of robot-achievable candidate poses by performing the following for each layer of the one or more layers of the grid:
determining whether the respective subset of n robot-achievable candidate poses for the layer are determinable if the respective subset of n robot-achievable candidate poses have to satisfy the initial condition, wherein the initial condition is a first condition, and
in response to a determination that the respective subset of n robot-achievable candidate poses are not determinable if the respective subset of n robot-achievable candidate poses have to satisfy the initial condition, determining the respective subset of n robot-achievable candidate poses based on a second condition in which the n robot-achievable candidate poses have n locations with a second spatial distribution in which i) each row of the multiple rows of the layer includes only one robot-achievable candidate pose, or ii) each column of the multiple columns of the layer includes only one robot-achievable candidate pose.

12. The computing system of claim 11, wherein the control circuit is further configured to determine the set of robot-achievable candidate poses by further performing the following for each layer of the one or more layers of the grid:
determining whether the respective subset of n robot-achievable candidate poses for the layer are determinable if the respective subset of n robot-achievable candidate poses have to satisfy the second condition, and
in response to a determination that the respective subset of n robot-achievable candidate poses are not determinable if the respective subset of n robot-achievable candidate poses have to satisfy the second condition, determining the respective subset of n robot-achievable candidate poses based on a third condition in which the n robot-achievable candidate poses have n locations that are randomly distributed within n respective 3D regions of the layer.

13. The computing system of claim 11, wherein the grid has n layers, and wherein the grid size of n is determined by:
determining a square root of the target number of poses for the plurality of poses, and
determining the grid size of n as a smallest integer that is greater than or equal to the square root of the target number of poses.

14. A non-transitory computer-readable medium having instructions stored thereon that, when executed by a control circuit of a computing system, causes the control circuit
to perform camera calibration when the computing system is in communication with a camera having a camera field of view and with a robot having a calibration pattern disposed thereon, by:
determining a range of pattern orientations for performing the camera calibration, wherein the computing system includes a communication interface configured to communicate with the robot and with the camera, wherein the range of pattern orientations is a range of orientations for the calibration pattern;

determining a surface region on a surface of an imaginary sphere, wherein the surface of the imaginary sphere represents possible pattern orientations for the calibration pattern, the region on the surface represents the range of pattern orientations for performing the camera calibration, and the surface region on the surface of the imaginary sphere forms a circular band of uniform width;

determining a plurality of poses for the calibration pattern to adopt when the camera calibration is being performed, wherein the plurality of poses are defined by respective combinations of a plurality of respective locations within the camera field of view and a plurality of respective sets of pose angle values, wherein each set of pose angle values of the plurality of respective sets is based on a respective surface point selected from within the surface region on the surface of the imaginary sphere;

outputting a plurality of robot movement commands for controlling placement of the calibration pattern, wherein the plurality of robot movement commands are generated based on the plurality of poses that are determined;

receiving a plurality of calibration images, wherein each calibration image of the plurality of calibration images represents the calibration pattern and is generated while the calibration pattern has a respective pose of the plurality of poses; and determining an estimate of a camera calibration parameter based on the plurality of calibration images, wherein the instructions, when executed by the control circuit after the camera calibration is performed, further cause the control circuit to receive a subsequent image from the camera via the communication interface, and to output a subsequent robot movement command that is generated based on the subsequent image and based on the estimate of the camera calibration parameter.

15. The non-transitory computer-readable medium of claim 14, wherein the instructions, when executed by the control circuit, further cause the control circuit to perform the determining of the plurality of poses by: randomly selecting surface points from among only a uniform set of surface points, wherein the uniform set of surface points is a set of surface points that are uniformly distributed within the surface region on the surface of the imaginary sphere, wherein the respective sets of pose angle values are based on the set of surface points that are selected.

16. The non-transitory computer-readable medium of claim 14, wherein the instructions, when executed by the control circuit and when the computing system is in communication with the robot and the camera, further cause the control circuit to determine the plurality of poses by:

determining a grid of 3D regions that divide a space within the camera field of view into one or more layers that each has multiple rows of 3D regions and multiple columns of 3D regions;

determining the plurality of locations for the plurality of poses such that the plurality of poses have a spatial distribution within the grid in which, for each layer of the one or more layers: (i) each row of the multiple rows within the layer includes no more than one pose of the plurality of poses and (ii) each column of the multiple columns within the layer includes no more than one pose of the plurality of poses.

17. The non-transitory computer-readable medium of claim 14, wherein the instructions, when executed by the control circuit and when the computing system is in communication with the robot and the camera, further cause the control circuit to determine the plurality of poses by:

determining a set of candidate poses, wherein each candidate pose of the set of candidate poses is determined by: determining a respective location within the camera field of view for the candidate pose, selecting a respective surface point from within the surface region on the surface of the imaginary sphere, and determining a respective set of pose angle values for the candidate pose based on the surface point that is selected;

determining a set of robot-achievable candidate poses by: determining, for each candidate pose of the set of candidate poses, whether the candidate pose is robot-achievable, and adding the candidate pose to the set of robot-achievable candidate poses in response to a determination that the candidate pose is robot-achievable; and selecting the plurality of poses from among only the set of robot-achievable candidate poses.

18. A method for performing robot control, wherein the method comprises:

determining, by a computing system, a range of pattern orientations for performing camera calibration, wherein the computing system includes a communication interface configured to communicate with a robot having a calibration pattern disposed thereon and with a camera;

determining, by the computing system, a surface region on a surface of an imaginary sphere, wherein the surface of the imaginary sphere represents possible pattern orientations for the calibration pattern, the surface region on the surface represents the range of pattern orientations for performing the camera calibration, and the surface region on the surface of the imaginary sphere forms a circular band of uniform width;

determining, by the computing system, a plurality of poses for the calibration pattern to adopt when the camera calibration is being performed, wherein the plurality of poses are defined by respective combinations of a plurality of respective locations within the camera field of view and a plurality of respective sets of pose angle values, wherein each set of pose angle values of the plurality of respective sets is based on a respective surface point selected from within the surface region on the surface of the imaginary sphere;

outputting, by the computing system, a plurality of robot movement commands for controlling placement of the calibration pattern, wherein the plurality of robot movement commands are generated based on the plurality of poses that are determined;

receiving, by the computing system, a plurality of calibration images, wherein each calibration image of the plurality of calibration images represents the calibration pattern and is generated while the calibration pattern has a respective pose of the plurality of poses;

determining, by the computing system, an estimate of a camera calibration parameter based on the plurality of calibration images;

receiving, by the computing system after the estimate of the camera calibration parameter is determined, a subsequent image via the communication interface; and outputting, by the computing system, a subsequent robot movement command that is generated based on the subsequent image and based on the estimate of the camera calibration parameter.

19. The method of claim 18, wherein determining the plurality of poses comprises randomly selecting surface points from among only a uniform set of surface points, wherein the uniform set of surface points is a set of surface points that are uniformly distributed within the surface region on the surface of the imaginary sphere, wherein the respective sets of pose angle values are based on the set of surface points that are selected.

\* \* \* \* \*